(12) United States Patent
Ryoo et al.

(10) Patent No.: US 12,078,861 B2
(45) Date of Patent: Sep. 3, 2024

(54) OPTICAL SYSTEM

(71) Applicant: TDK TAIWAN CORP., Taoyuan (TW)

(72) Inventors: Jungsuck Ryoo, Taoyuan (TW); Chao-Chang Hu, Taoyuan (TW); Shu-Shan Chen, Taoyuan (TW); Min-Hsiu Tsai, Taoyuan (TW); Chieh-An Chang, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 0 days.

(21) Appl. No.: 18/077,009

(22) Filed: Dec. 7, 2022

(65) Prior Publication Data

US 2023/0266557 A1 Aug. 24, 2023

Related U.S. Application Data

(63) Continuation of application No. 17/085,772, filed on Oct. 30, 2020, now Pat. No. 11,550,112.

(Continued)

(51) Int. Cl.
*G02B 7/00* (2021.01)
*G02B 23/08* (2006.01)
(Continued)

(52) U.S. Cl.
CPC ............ *G02B 7/005* (2013.01); *G02B 23/08* (2013.01); *G03B 5/04* (2013.01); *H04N 23/60* (2023.01);
(Continued)

(58) Field of Classification Search
None
See application file for complete search history.

(56) References Cited

U.S. PATENT DOCUMENTS 7,057,829 B2 * 6/2006 Tanigawa ............... H05K 1/189
                                                    348/E5.025
9,635,264 B2 * 4/2017 Nomura ................. H04N 23/55
(Continued)

FOREIGN PATENT DOCUMENTS

CN     209486373 U    10/2019
JP     2009093001 A    4/2009
JP     2016090616 A    5/2016

OTHER PUBLICATIONS

A Chinese Office Action cited in counterpart application No. CN202021090074.6, dated Dec. 9, 2020, 2 pages.

(Continued)

*Primary Examiner* — Robert E. Tallman
(74) *Attorney, Agent, or Firm* — Muncy, Geissler, Olds & Lowe, P.C.

(57) ABSTRACT

An optical system is provided. The optical system includes a second optical module for driving a second optical element. The second optical module includes a second immovable part, a second movable part, a second driving assembly, and a second guiding assembly. The second movable part is used for connected to the second optical element. The second movable part is movable relative to the second immovable part. The second driving assembly is used for driving the second movable part to move relative to the second immovable part. The second guiding assembly is used for guiding the second movable part to move relative to the second immovable part in a first dimension.

19 Claims, 42 Drawing Sheets

Related U.S. Application Data

(60) Provisional application No. 62/929,280, filed on Nov. 1, 2019.

(51) Int. Cl.
    *G03B 5/04*         (2021.01)
    *H04N 23/60*      (2023.01)
    *G02B 27/10*      (2006.01)
    *G02B 27/64*      (2006.01)

(52) U.S. Cl.
    CPC ............ *G02B 27/10* (2013.01); *G02B 27/646* (2013.01); *G03B 2205/0053* (2013.01)

(56) References Cited

U.S. PATENT DOCUMENTS

| | | |
|---|---|---|
| 2004/0141065 A1 | 7/2004 | Hara et al. |
| 2009/0122406 A1 | 5/2009 | Rouvinen et al. |
| 2015/0215542 A1 | 7/2015 | Nomura et al. |
| 2018/0203328 A1 | 6/2018 | Kang et al. |
| 2018/0188523 A1 | 7/2018 | Singh et al. |
| 2019/0098182 A1 | 3/2019 | Byon et al. |
| 2019/0243112 A1 | 8/2019 | Yao et al. |
| 2019/0361260 A1* | 11/2019 | Jeong .................... G02B 27/64 |
| 2021/0132319 A1 | 5/2021 | Hu et al. |

OTHER PUBLICATIONS

Search Report issued on Mar. 24, 2021 for the corresponding Application No. 20204881.5 in Europe.

\* cited by examiner

OPTICAL SYSTEM

CROSS REFERENCE TO RELATED APPLICATIONS

This application is a Continuation Application of U.S. patent application Ser. No. 17/085,772, filed on Oct. 30, 2020, which claims the benefit of U.S. Provisional Application No. 62/929,280, filed on Nov. 1, 2019, the entirety of which is incorporated by reference herein.

BACKGROUND OF THE INVENTION

Field of the Invention

The present invention relates to an optical module, and, in particular, to a periscope optical module.

Description of the Related Art

To satisfy different demands on the quality of images and videos (such as range for capturing images and videos, depth of field, and the like), an electronic device used for capturing images and videos may be provided with multiple lenses or a group of lenses with different focal lengths. Meanwhile, miniaturization of the electronic device still has to be taken into account. Therefore, a periscope optical module has been developed.

BRIEF SUMMARY OF THE INVENTION

According to some embodiments, an optical system is provided. The optical system includes a second optical module for driving a second optical element. The second optical module includes a second immovable part, a second movable part, a second driving assembly, and a second guiding assembly. The second movable part is used for connected to the second optical element. The second movable part is movable relative to the second immovable part. The second driving assembly is used for driving the second movable part to move relative to the second immovable part. The second guiding assembly is used for guiding the second movable part to move relative to the second immovable part in a first dimension.

BRIEF DESCRIPTION OF THE DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

DETAILED DESCRIPTION OF THE INVENTION

The following disclosure provides many different embodiments, or examples, for implementing different features of the provided subject matter. Specific examples of assemblys and arrangements are described below to simplify this disclosure. These are, of course, merely examples and are not intended to be limiting. For example, the formation of a first feature "on" or "above" a second feature in the description that follows may include embodiments in which the first and second features are formed on direct contact, and may also include embodiments in which additional features may be formed between the first and second features, so that the first and second features may not be in direct contact. Ordinal terms such as "first", "second", etc., used in the description and in claims do not by themselves connote any priority, precedence, or order of one element over another, but are used merely as labels to distinguish one element from another element having the same name. In addition, in different examples of this disclosure, symbols or letters may be used repeatedly.

Furthermore, spatially relative terms, such as "above" and the like, may be used herein for ease of description to describe one element or feature's relationship to another element or feature as illustrated in figures. The spatially relative terms are intended to encompass different orientations of the device in use or operation in addition to the orientation depicted in figures. The apparatus may be otherwise oriented (rotated 90 degrees or at other orientations) and the spatially relative descriptors used herein may likewise be interpreted accordingly.

The first group of embodiments.

Figure 1:
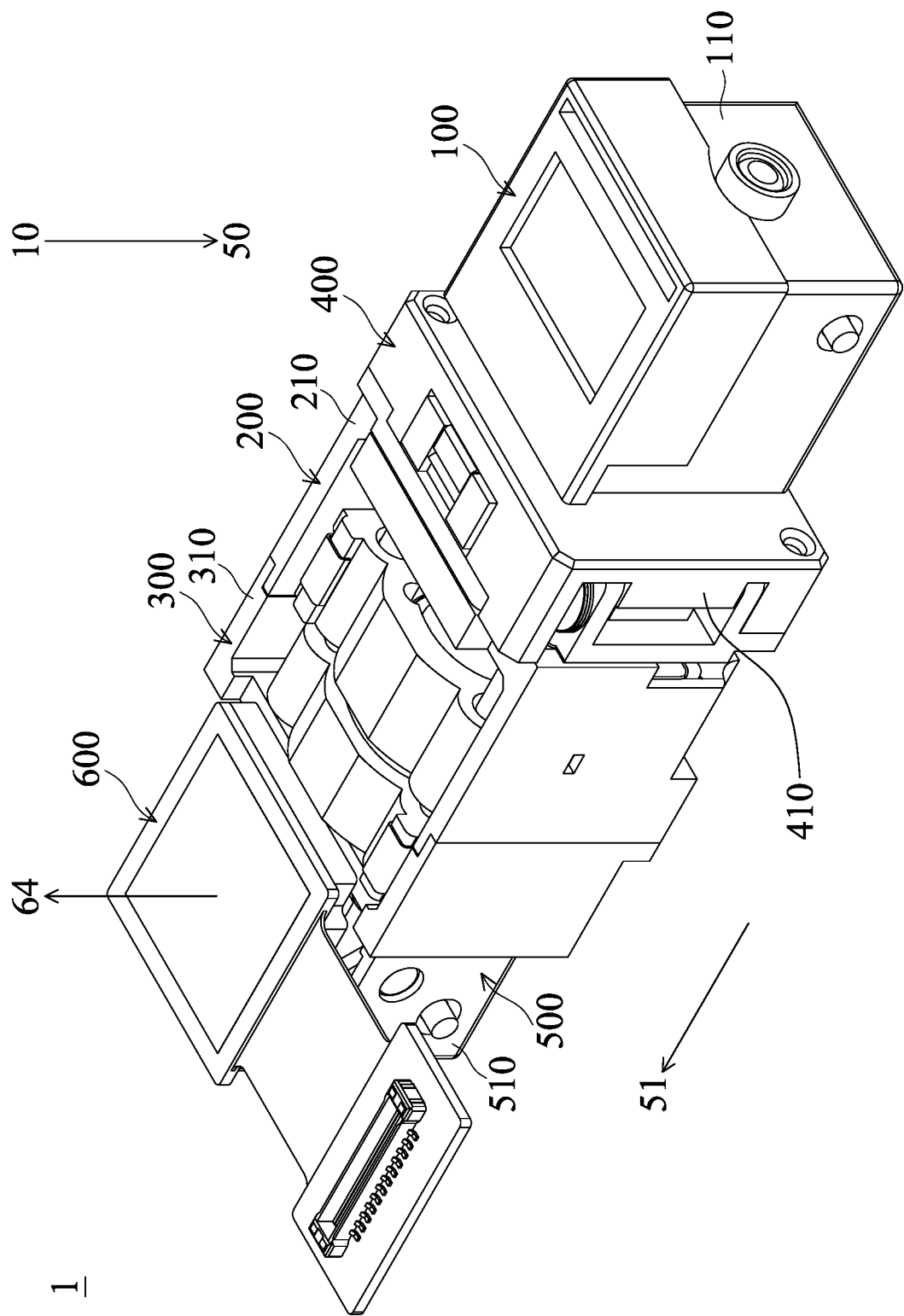
FIG. 1 is a perspective view of the optical system.
Figure 2:
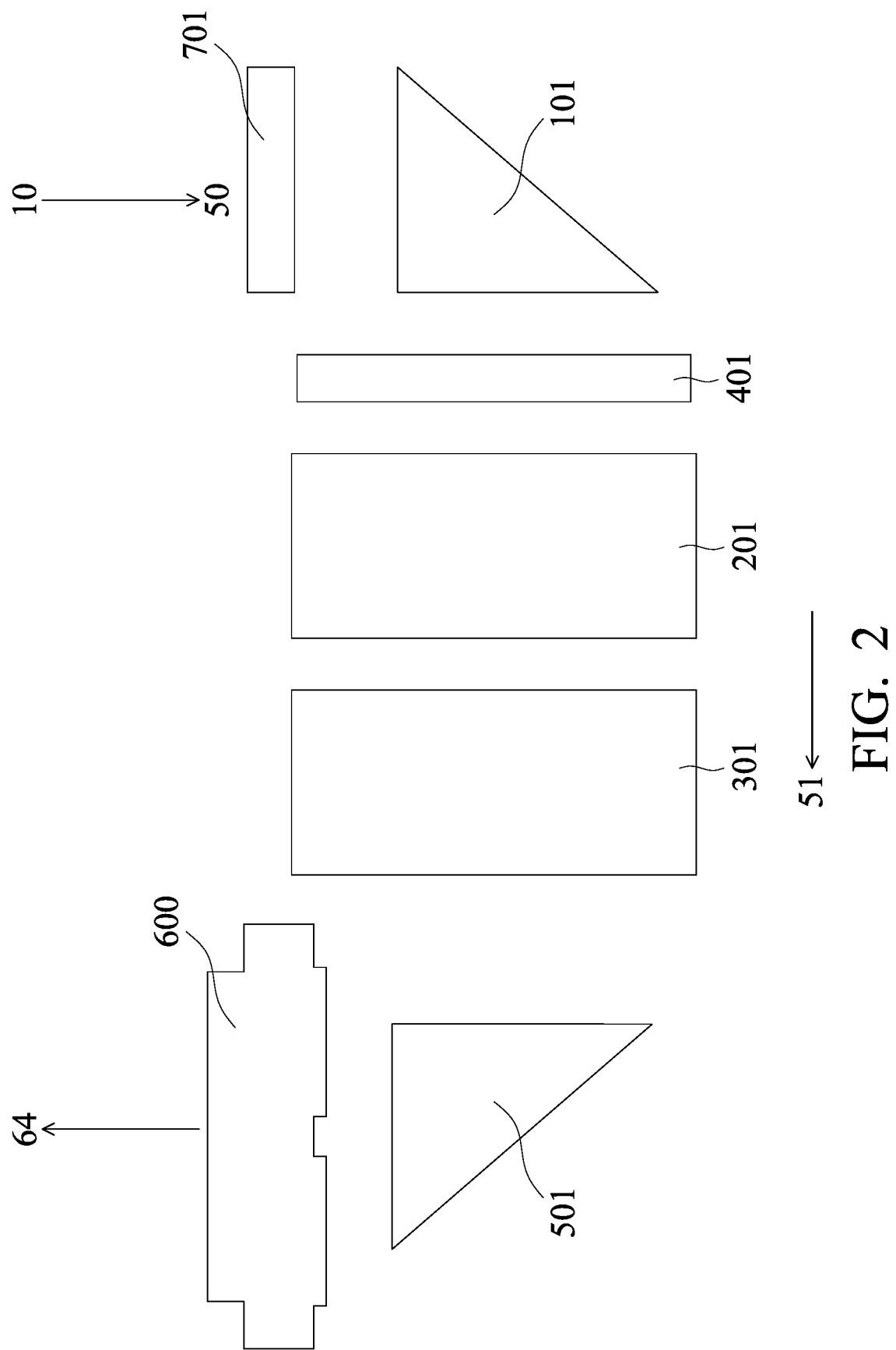
FIG. 2 is a schematic view of the optical elements of the optical system.

According to some embodiments, an optical system 1 is provided. FIG. 1 is a perspective view of the optical system 1. FIG. 2 is a schematic view of the optical elements of the optical system 1. The optical system 1 may be a periscope optical system. The optical system 1 includes a first optical module 100, a second optical module 200, a third optical module 300, a fourth optical module 400, a fifth optical module 500, and a sixth optical module 600.

A light 10 enters the first optical module 100 from the top of the first optical module 100 along an incident direction 50. The direction of the light 10 is adjusted by the first optical module 100 from the incident direction 50 to a first direction 51. Then, the light 10 passes through the fourth optical module 400, the second optical module 200, and the third optical module 300 consecutively. Then, the direction of the light 10 is adjusted by the fifth optical module 500 from the first direction 51 to a fourteenth direction 64. The light 10 leaves the fifth optical module 500 along a fourteenth direction 64 and is converted into an image or video on the sixth optical module 600.

The first optical module 100 and the fifth optical module 500 may include a first optical element 101 and a fifth optical element 501, respectively. The first optical element 101 and the fifth optical element 501 may be a prism, a reflection mirror, a refraction prism, a beam splitter, and the like. The optical path of the light 10 may be changed via the first optical element 101 and the fifth optical element 501. The second optical module 200, the third optical module 300, and the fourth optical module 400 may include a second optical element 201, a third optical element 301, and a fourth optical element 401, respectively. The second optical module 200, the third optical module 300, and the fourth optical module 400 may drive the second optical element 201, the third optical element 301, and the fourth optical element 401 to move, respectively. The second optical element 201, the third optical element 301, and the fourth optical element 401 may be one or more lenses, and may be made of glass, resin, and other materials.

The first optical element 101, the second optical element 201, the third optical element 301, the fourth optical element 401, and the fifth optical element 501 are arranged along the first direction 51. In some embodiments, an optical element 701 with non-zero focal length (not shown, such as one or more lenses) may be placed over the first optical element 101 to correspond the first optical element 101. The optical element 701 may be immovably connected to the first optical element 101. Also, the optical element 701 and the first optical element 101 may be arranged along the incident direction 50. The capturing functionality of the optical system 1 may be improved by increasing the number of optical elements.

In some embodiments, the first optical element 101 and the fifth optical element 501 may be further rotated to achieve yawing and pitching, respectively. In some embodiments, the first optical module 100 achieves pitching and the fifth optical module 500 achieves yawing. In some embodiments, the second optical module 200 and the third optical module 300 may achieve zooming and auto focus (AF), respectively. In some embodiments, the second optical module 200 may achieve auto focus, and the third optical module 300 may achieve zooming. That is, the terms including yawing, pitching, zooming, auto focus are not limited hereto.

In some embodiments, the fourth optical module 400 may achieve optical image stabilization (OIS). In some embodiments, the position of the fourth optical module 400 may be changed. For example, the fourth optical module 400 may be disposed between the third optical module 300 and the fifth optical module 500. In some embodiments, the fourth optical module 400 may be integrated into the second optical module 200 or the third optical module 300, and the single second optical module 200 or the single third optical module 300 may simultaneously achieve auto focus and optical image stabilization. In some embodiments, the fourth optical module 400 may be omitted.

In some embodiments, the sixth optical module 600 may be an image sensor, such as a charge-coupled device (CCD). In some embodiments, the fifth optical module 500 may be omitted, and the position of the sixth optical module 600 may be changed, so that the light 10 leaving the third optical module 300 may be converted into an image on the sixth optical module 600 directly.

Figure 3:
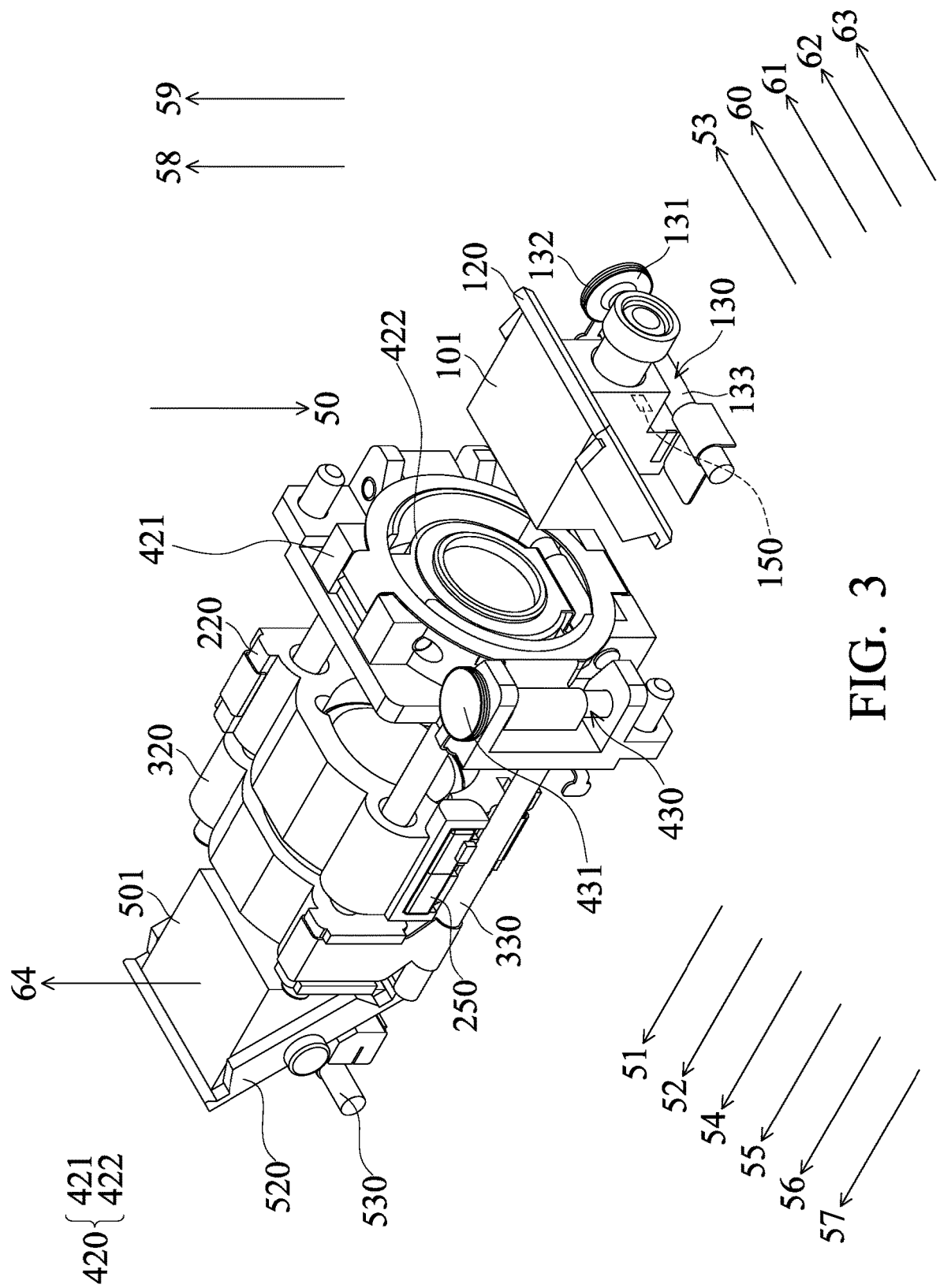
FIG. 3 and FIG. 4 are perspective views of the optical system with some elements omitted.
Figure 4:
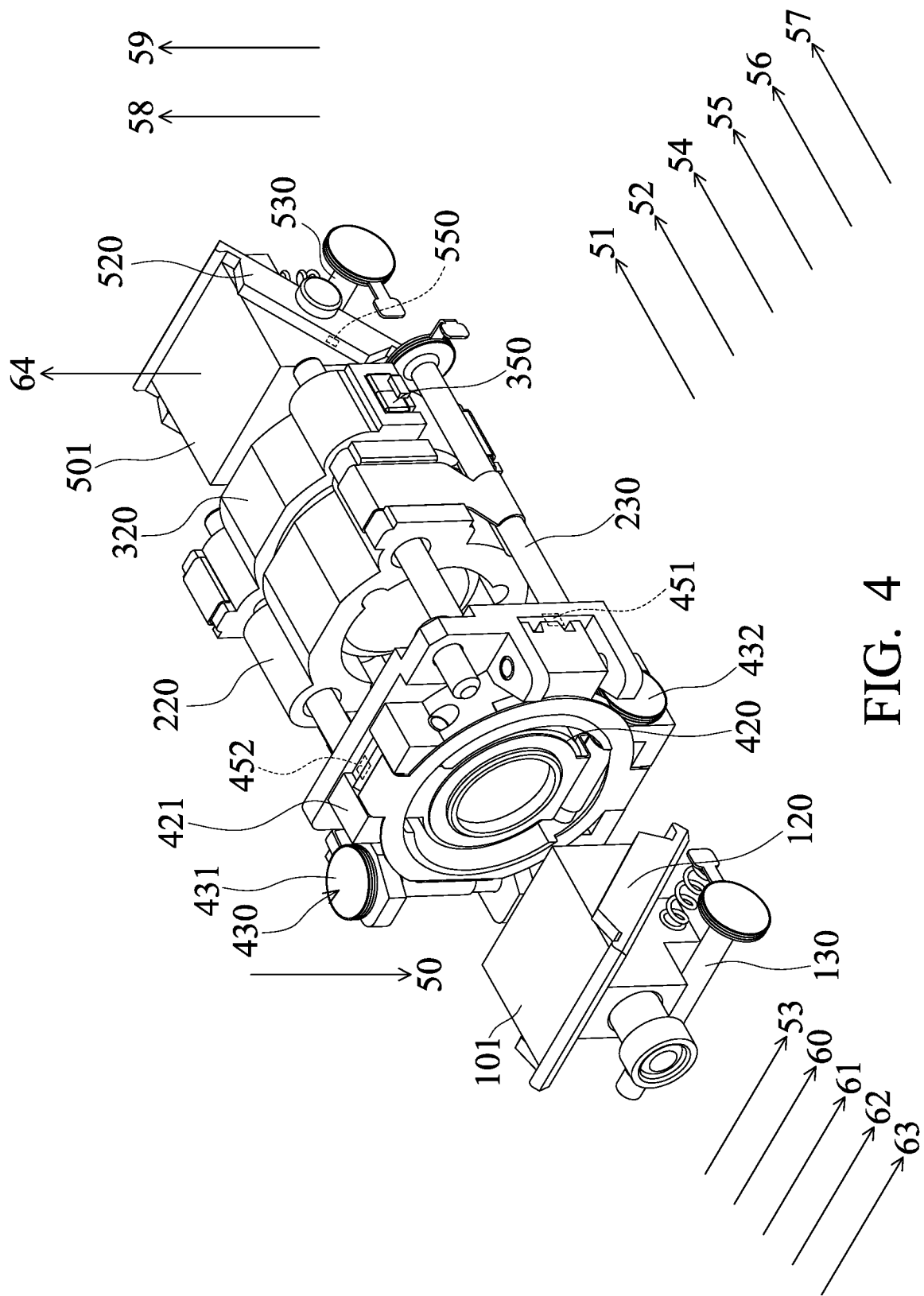

Next, please refer to FIG. 3 and FIG. 4 to understand optical system 1. FIG. 3 and FIG. 4 are perspective views of the optical system with some elements omitted viewed from different perspectives.

The first optical module 100 includes a first immovable part 110, a first movable part 120, a first driving assembly 130, and a first position sensing assembly 150. The first movable part 120 is connected to the first optical element 101. The first movable part 120 is movable relative to the first immovable part 110. The first driving assembly 130 is used for driving the first movable part 120 to rotate relative to the first immovable part 110 around a second direction 52. The first position sensing assembly 150 is used for sensing the movement of the first movable part 120 relative to the first immovable part 110.

The second optical module 200 includes a second immovable part 210, a second movable part 220, a second driving assembly 230, and a second position sensing assembly 250. The second movable part 220 is connected to the second optical element 201. The second movable part 220 is movable relative to the second immovable part 210. The second driving assembly 230 is used for driving the second movable part 220 to move relative to the second immovable part 210 in a fourth direction 54. Specifically, the movement of the second movable part 220 relative to the second immovable part 210 may include linear motion, non-linear motion, rotation, etc. The second position sensing assembly 250 is used for sensing the movement of the second movable part 220 relative to the second immovable part 210.

The third optical module 300 includes a third immovable part 310, a third movable part 320, a third driving assembly 330, and a third position sensing assembly 350. The third movable part 320 is connected to the third optical element 301. The third movable part 320 is movable relative to the third immovable part 310. The third driving assembly 330 is used for driving the third movable part 320 to move relative to the third immovable part 310 in a sixth direction 56. Specifically, the movement of the third movable part 320 relative to the third immovable part 310 may include linear motion, non-linear motion, rotation, etc. The third position sensing assembly 350 is used for sensing the movement of the third movable part 320 relative to the third immovable part 310.

The fourth optical module 400 includes a fourth immovable part 410, a fourth movable part 420, a fourth driving assembly 430, a first dimension position sensing assembly 451, and a second dimension position sensing assembly 452. The fourth movable part 420 is used for connected to the fourth optical element 401. The fourth movable part 420 is movable relative to the fourth immovable part 410. The fourth movable part 420 includes a frame 421 and a holder 422. The first driving assembly 430 is used for driving the fourth movable part 420 to move relative to the fourth immovable part 410 in an eighth direction 58 and/or a tenth direction 60. Specifically, the movement of the fourth movable part 420 relative to the fourth immovable part 410 may include linear motion, non-linear motion, rotation, etc. The first dimension position sensing assembly 451 is used for sensing the movement of the fourth movable part 420 relative to the fourth immovable part 410. The second dimension position sensing assembly 452 is used for sensing the movement of the holder 422 relative to the frame 421.

The fifth optical module 500 includes a fifth immovable part 510, a fifth movable part 520, a fifth driving assembly 530, and a fifth position sensing assembly 550. The fifth movable part 520 is used for connected to the fifth optical element 501. The fifth movable part 520 is movable relative to the fifth immovable part 510. The fifth driving assembly 530 is used for driving the fifth movable part 520 to rotate relative to the fifth immovable part 510 around a twelfth direction 62. The position sensing assembly 550 is used for sensing the movement of the fifth movable part 520 relative to the fifth immovable part 510.

Figure 5:
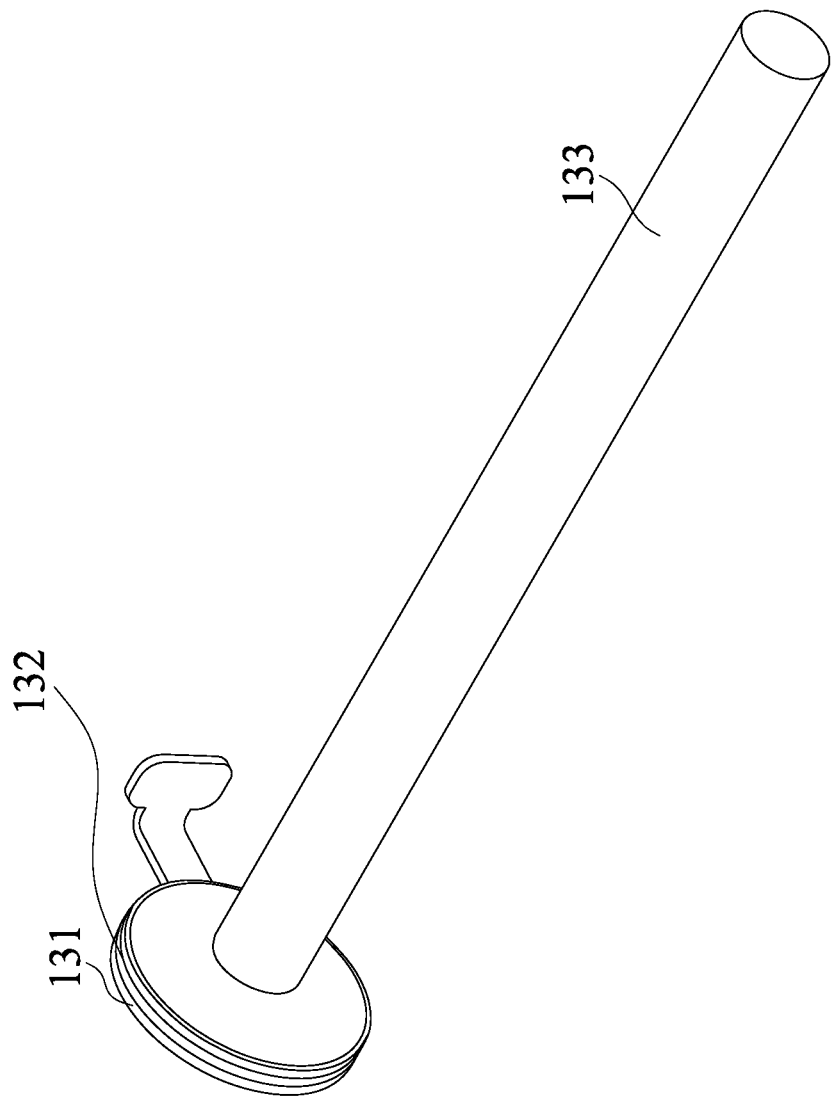
FIG. 5 is a perspective view of the first driving assembly.

Next, please refer to FIG. 5. FIG. 5 is a perspective view of the first driving assembly 130. It should be noted that the second driving assembly 230, the third driving assembly 330, the fourth driving assembly 430, and the fifth driving assembly 530 all include similar features. For simplification, only numerals of first driving assembly 130 are denoted.

The first driving assembly 130 includes a first piezoelectric element 131, a first elastic element 132, and a first transmission element 133. The first piezoelectric element 131 may be made of a piezoelectric material such as metal or ceramic. The first piezoelectric element 131 may be deformable for generating a first driving force. The first elastic element 132 is disposed on the first piezoelectric element 131. The first transmission element 133 has an elongated structure such as a rod, a stick, and the like. The first transmission element 133 extends in a third direction 53. The first transmission element 133 is used for transmitting the first driving force to drive the first movable part 120 to rotate relative to the first immovable part 110 around the second direction 52.

The second driving assembly 230 includes a second piezoelectric element, a second elastic element, and a second transmission element. The second piezoelectric element may be made of a piezoelectric material such as metal or ceramic. The second piezoelectric element may be deformable for generating a second driving force. The second elastic element is disposed on the second piezoelectric element. The second transmission element has an elongated structure such as a rod, a stick, and the like. The second transmission element extends in a fifth direction 55. The second transmission element is used for transmitting the second driving force to drive the second movable part 220 to move relative to the second immovable part 210 in the fourth direction 54.

The third driving assembly 330 includes a third piezoelectric element, a third elastic element, and a third transmission element. The third piezoelectric element may be made of a piezoelectric material such as metal or ceramic. The third piezoelectric element may be deformable for generating a third driving force. The third elastic element is disposed on the third piezoelectric element. The third transmission element has an elongated structure such as a rod, a stick, and the like. The third transmission element extends in a seventh direction 57. The third transmission element is used for transmitting the third driving force to drive the third movable part 320 to move relative to the third immovable part 310 in the sixth direction 56.

The fourth driving assembly 430 includes a first dimension driving unit 431 and a second dimension driving unit 432. The first dimension driving unit 431 includes a first dimension piezoelectric element, a first dimension elastic element, and a first dimension transmission element. The first dimension piezoelectric element may be made of a piezoelectric material such as metal or ceramic. The first dimension piezoelectric element may be deformable for generating a first dimension driving force. The first dimension elastic element is disposed on the first dimension piezoelectric element. The first dimension transmission element has an elongated structure such as a rod, a stick, and the like. The first dimension transmission element extends in a ninth direction 59. The first dimension transmission element is used for transmitting the first dimension driving force to drive the fourth movable part 420 to move relative to the fourth immovable part 410 in the eighth direction 58. The second dimension driving unit 432 includes a second dimension piezoelectric element, a second dimension elastic element, and a second dimension transmission element. The second dimension piezoelectric element may be made of a piezoelectric material such as metal or ceramic. The second dimension piezoelectric element may be deformable for generating a second dimension driving force. The second dimension elastic element is disposed on the second dimension piezoelectric element. The second dimension transmission element has an elongated structure such as a rod, a stick, and the like. The second dimension transmission element extends in an eleventh direction 61. The second dimension transmission element is used for transmitting the second dimension driving force to drive the holder 422 to move relative to the frame 421 in the tenth direction 60.

When viewed from the third direction 53, the first dimension driving unit 431 at least partially overlaps the second dimension driving unit 432. When viewed from the incident direction 50, the first dimension driving unit 431 does not overlap the second dimension driving unit 432.

The fifth driving assembly 530 includes a fifth piezoelectric element, a fifth elastic element, and a fifth transmission element. The fifth piezoelectric element may be made of a piezoelectric material such as metal or ceramic. The fifth piezoelectric element may be deformable for generating a fifth driving force. The fifth elastic element is disposed on the fifth piezoelectric element. The fifth transmission element has an elongated structure such as a rod, a stick, and the like. The fifth transmission element extends in a thirteenth direction 63. The fifth transmission element is used for transmitting the fifth driving force to drive the fifth movable part 520 to rotate relative to the fifth immovable part 510 around the twelfth direction 62.

For the driving assembly of the present disclosure, the driving force generated by the piezoelectric element is transmitted by the transmission element, which may make the movement of the movable part more stable, and thus may achieve high stability and high accuracy. In the art, the form of the aforementioned driving assembly may be referred as TULA.

Figure 6:
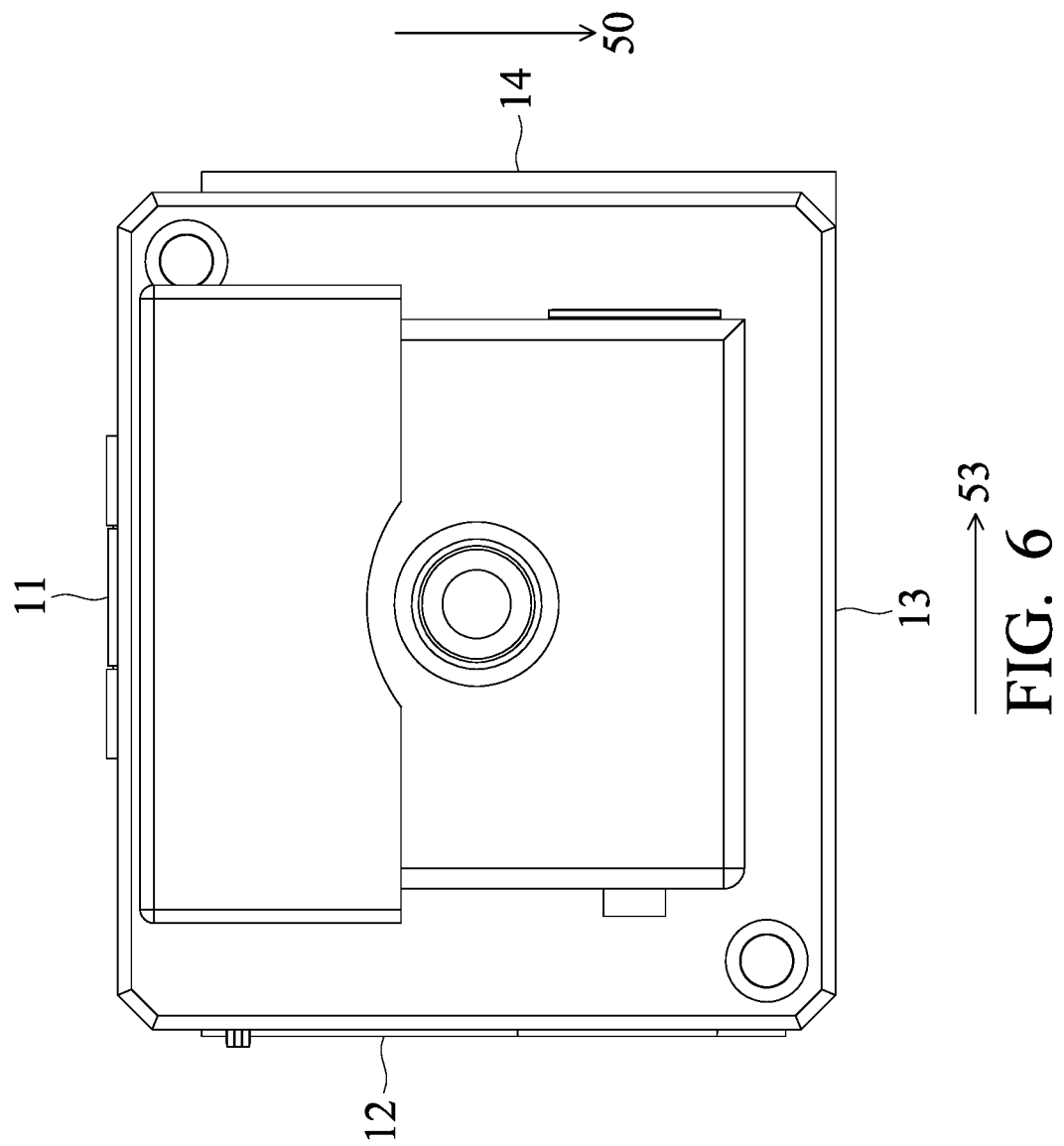
FIG. 6 is a schematic front view of the optical system.

Next, please refer to FIG. 6. FIG. 6 is a schematic front view of the optical system 1. When viewed from the first direction 51, the optical system 1 is polygonal, such as rectangular, including a first side 11, a second side 12 that is not parallel with the first side 11, a third side 13 that is parallel with the first side 11 but not parallel with the second side 12, a fourth side 14 that is parallel with the second side 12 but not parallel with the third side 13. The extending direction of the first side 11 is parallel with the third direction 53. The extending direction of the second side 12 is parallel with the incident direction 50. The first side 11 and the third side 13 are the long sides of the rectangle, and the second side 12 and the fourth side 14 are the short sides of the rectangle. Therefore, when viewed from the first direction 51, the first side 11 is longer than the second side 12, and the third side 13 is longer than the fourth side 14.

When viewed from the first direction 51, the first driving assembly 130 is located on the third side 13. When viewed from the first direction 51, the second driving assembly 230 is located on the third side 13. When viewed from the first direction 51, the third driving assembly 330 is located on the third side 13. When viewed from the first direction 51, the first dimension driving unit 431 is located on the second side 12. When viewed from the first direction 51, the second dimension driving unit 432 is located on the third side 13. When viewed from the first direction 51, the fifth driving assembly 530 is located on the third side 13.

That is, when viewed from the first direction 51, the first driving assembly 130, the second driving assembly 230, the third driving assembly 330, the second dimension driving unit 432, and the fifth driving assembly 530 are located on the same side of the optical system 1. When viewed from the first direction 51, the first dimension driving unit 431 and the second dimension driving unit 432 are located on different sides of the optical system 1.

In some embodiments, when viewed from the first direction 51, the minimum distance between the first dimension driving unit 431 and the center of the fourth optical element 401 is different from/greater than the minimum distance between the second dimension driving unit 432 and the center of the fourth optical element 401. In some embodiments, when viewed from the first direction 51, the minimum distance between the first dimension driving unit 431 and the center of the fourth optical element 401 is greater than the minimum distance between the first driving assembly 130 and the center of the fourth optical element 401. In some embodiments, when viewed from the first direction 51, the minimum distance between the first dimension driving unit 431 and the center of the fourth optical element 401 is greater than the minimum distance between the second driving assembly 230 and the center of the fourth optical element 401. In some embodiments, when viewed from the first direction 51, the minimum distance between the first dimension driving unit 431 and the center of the fourth optical element 401 is greater than the minimum distance between the third driving assembly 330 and the center of the fourth optical element 401. In some embodiments, when viewed from the first direction 51, the minimum distance between the first dimension driving unit 431 and the center of the fourth optical element 401 is greater than the minimum distance between the fifth driving assembly 530 and the center of the fourth optical element 401.

When viewed from the first direction 51, the first position sensing assembly 150 is located on the third side 13. When viewed from the first direction 51, the second position sensing assembly 250 is located on the second side 12. When viewed from the first direction 51, the third position sensing assembly 350 is located on the fourth side 14. When viewed from the first direction 51, the first dimension position sensing assembly 451 is located on the fourth side 14. When viewed from the first direction 51, the second dimension position sensing assembly 452 is located on the first side 11. When viewed from the first direction 51, the fifth position sensing assembly 550 is located on the third side 13.

In other words, when viewed from the first direction 51, the first position sensing assembly 150 and the fifth position sensing assembly 550 are located on the same side of the optical system 1. When viewed from the first direction 51, the first position sensing assembly 150 is located on a side of the optical system 1 that is different from the sides of the optical system 1 on which; the second position sensing assembly 250, the third position sensing assembly 350, the first dimension position sensing assembly 451, and the second dimension position sensing assembly 452 are located. When viewed from the first direction 51, the second position sensing assembly 250 is located on a side of the optical system 1 that is different from the sides of the optical system 1 on which, the third position sensing assembly 350, the first dimension position sensing assembly 451, and the second dimension position sensing assembly 452 are located. When viewed from the first direction 51, the third position sensing assembly 350 and the first dimension position sensing assembly 451 are located on the same side of the optical system 1. When viewed from the first direction 51, the third position sensing assembly 350 is located on a side of the optical system 1 that is different from the sides of the optical system 1 on which the second dimension position sensing assembly 452 and the fifth position sensing assembly 550 are located. When viewed from the first direction 51, the first dimension position sensing assembly 451 is located on a side of the optical system 1 that is different from the sides of the optical system 1 on which, the second dimension position sensing assembly 452 and the fifth position sensing assembly 550 are located. When viewed from the first direction 51, the second dimension position sensing assembly 452 and the fifth position sensing assembly 550 are located on different sides of the optical system 1.

Also, in the first direction 51, the second position sensing assembly 240 is located between the second position sensing assembly 250 and the first dimension position sensing assembly 451. When viewed from the first direction 51, the third position sensing assembly 350 and the second dimension position sensing assembly 452 are located on different sides of the optical system 1. When viewed from the first direction 51, the first dimension position sensing assembly 451 and the first dimension driving unit 431 are located on different sides of the optical system 1.

In addition, when viewed from the first direction 51, the second movable part 220 at least partially overlaps the first dimension driving unit 431. When viewed from the first direction 51, the second movable part 220 at least partially overlaps the second dimension driving unit 432. When viewed from the first direction 51, the second movable part 220 at least partially overlaps the first dimension position sensing assembly 451. When viewed from the first direction 51, the second movable part 220 at least partially overlaps the second dimension position sensing assembly 452. When viewed from the first direction 51, the first dimension driving unit 431 at least partially overlaps the second position sensing assembly 250.

To sum up, in this embodiment, the first direction 51 is not parallel with the incident direction 50. The second direction 52 is not parallel with the incident direction 50, and the second direction 52 is parallel with the first direction 51. The third direction 53 is not parallel with the incident direction 50, the first direction 51, and the second direction 52. The fourth direction 54 is not parallel with the incident direction 50 and the third direction 53, and the fourth direction 54 is parallel with the first direction 51 and the second direction 52. The fifth direction 55 is not parallel with the incident direction 50 and the third direction 53, and the fifth direction 55 is parallel with the first direction 51, the second direction 52, and the fourth direction 54. The sixth direction 56 is not parallel with the incident direction 50 and the third direction 53, and the sixth direction 56 is parallel with the first direction 51, the second direction 52, the fourth direction 54, and the fifth direction 55. The seventh direction 57 is not parallel with the incident direction 50 and the third direction 53, and the seventh direction 57 is parallel with the first direction 51, the second direction 52, the fourth direction 54, the fifth direction 55, and the sixth direction 56.

The eighth direction 58 is parallel with the incident direction 50, and the eighth direction 58 is not parallel with the first direction 51, the second direction 52, the third direction 53, the fourth direction 54, the fifth direction 55, the sixth direction 56, and the seventh direction 57. The ninth direction 59 is parallel with the incident direction 50 and the eighth direction 58, and the ninth direction 59 is parallel with the first direction 51, the second direction 52, the third direction 53, the fourth direction 54, the fifth direction 55, the sixth direction 56, and the seventh direction 57. The tenth direction 60 is not parallel with the incident direction 50, the first direction 51, the second direction 52, the fourth direction 54, the fifth direction 55, the sixth direction 56, the seventh direction 57, the eighth direction 58, and the ninth direction 59, and the tenth direction 60 is parallel with the third direction 53. The eleventh direction 61 is not parallel with the incident direction 50, the first direction 51, the second direction 52, the fourth direction 54, the fifth direction 55, the sixth direction 56, the seventh direction 57, the eighth direction 58, and the ninth direction 59, and the eleventh direction 61 is parallel with the third direction 53 and the tenth direction 60. The twelfth direction 62 is not parallel with the incident direction 50, the first direction 51, the second direction 52, the fourth direction 54, the fifth direction 55, the sixth direction 56, the seventh direction 57, the eighth direction 58, and the ninth direction 59, and the twelfth direction 62 is parallel with the third direction 53, the tenth direction 60, and the eleventh direction 61. The thirteenth direction 63 is not parallel with the incident direction 50, the first direction 51, the second direction 52, the fourth direction 54, the fifth direction 55, the sixth direction 56, the seventh direction 57, the eighth direction 58, and the ninth direction 59, and the thirteenth direction 63 is parallel with the third direction 53, the tenth direction 60, the eleventh direction 61, and the twelfth direction 62. The fourteenth direction 64 is parallel with the incident direction 50, and the fourteenth direction 64 is not parallel with the first direction 51.

Figure 7:
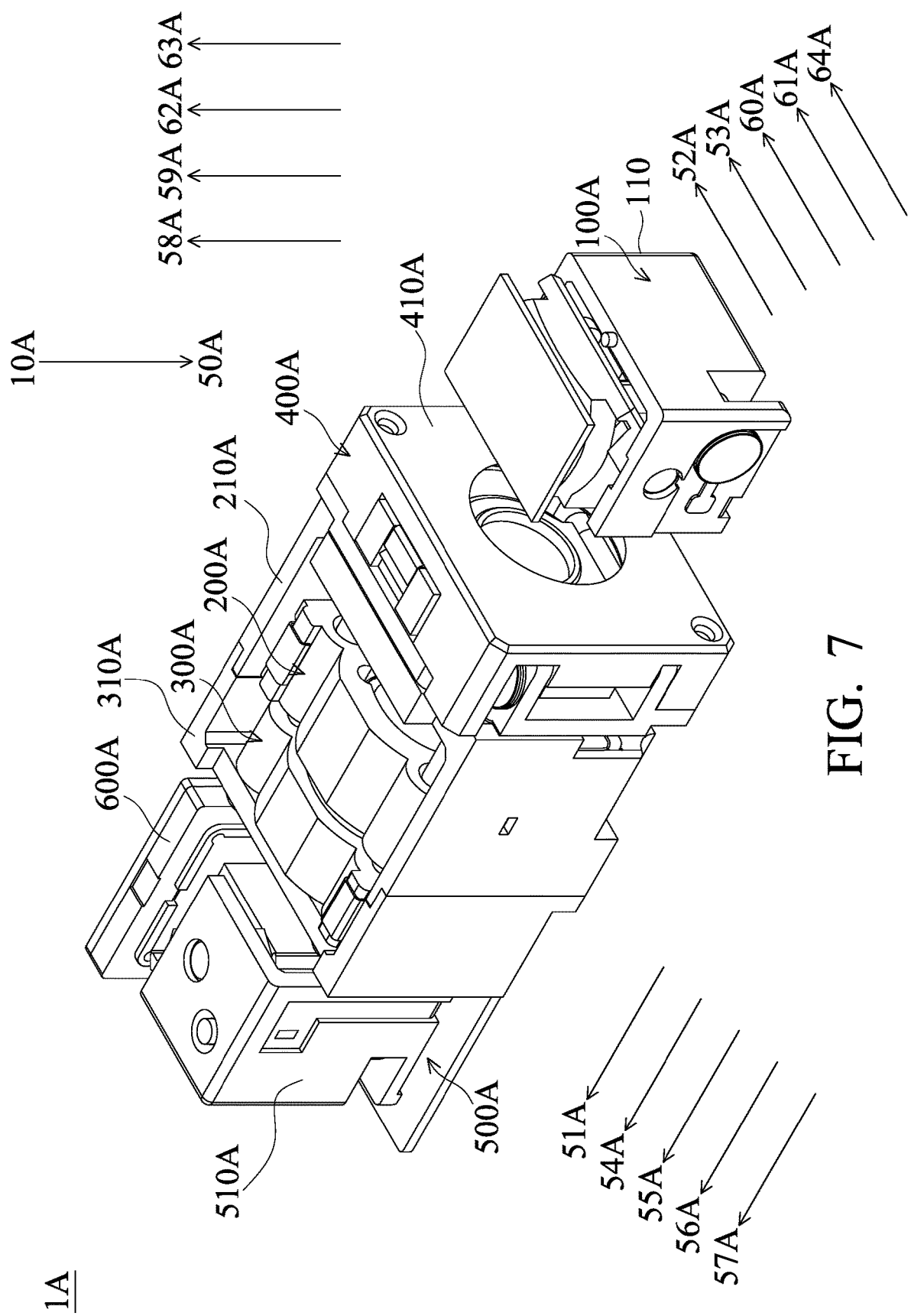
FIG. 7 is a perspective view of the optical system.
Figure 8:
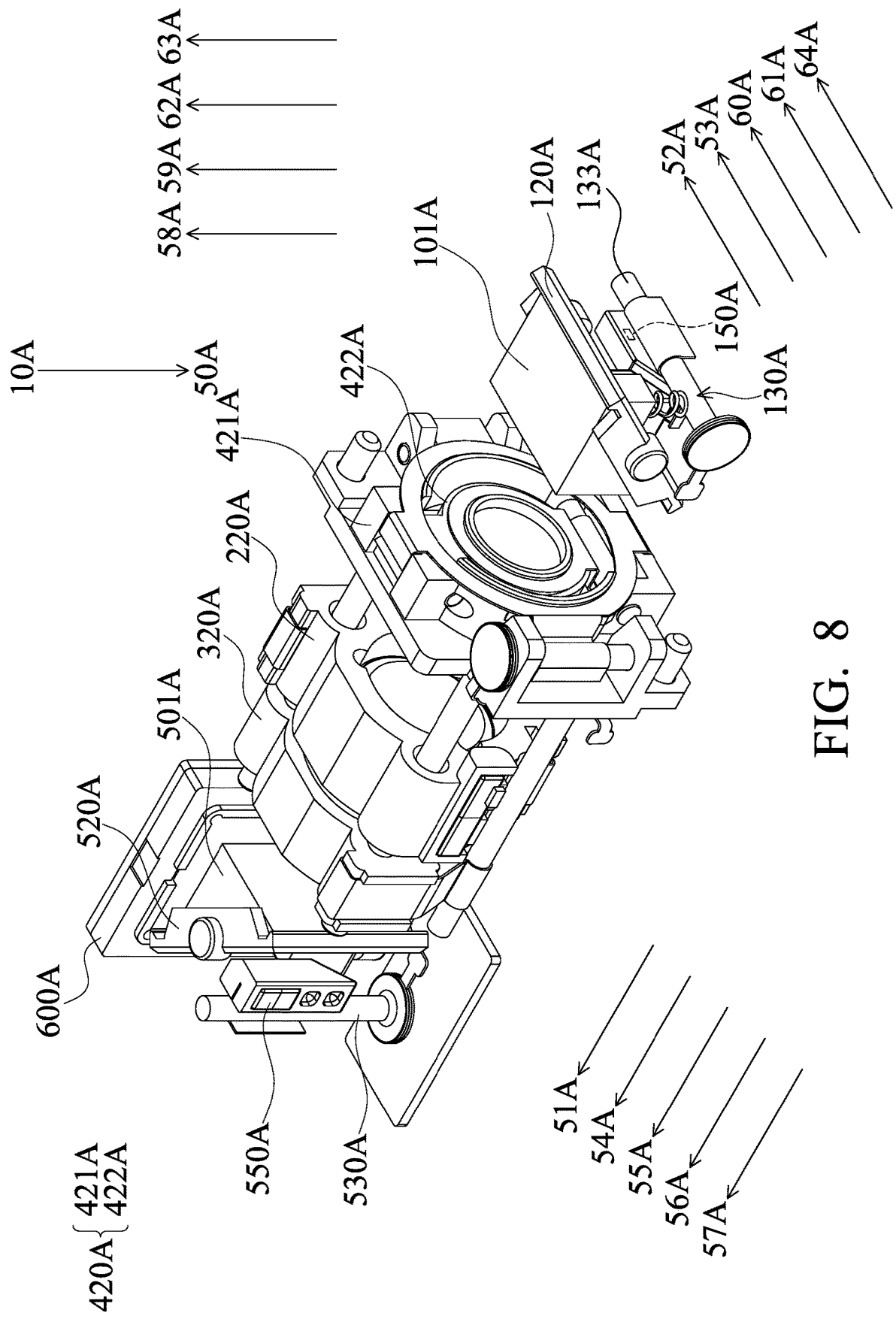
FIG. 8 and FIG. 9 are perspective views of the optical system with some elements omitted.
Figure 9:
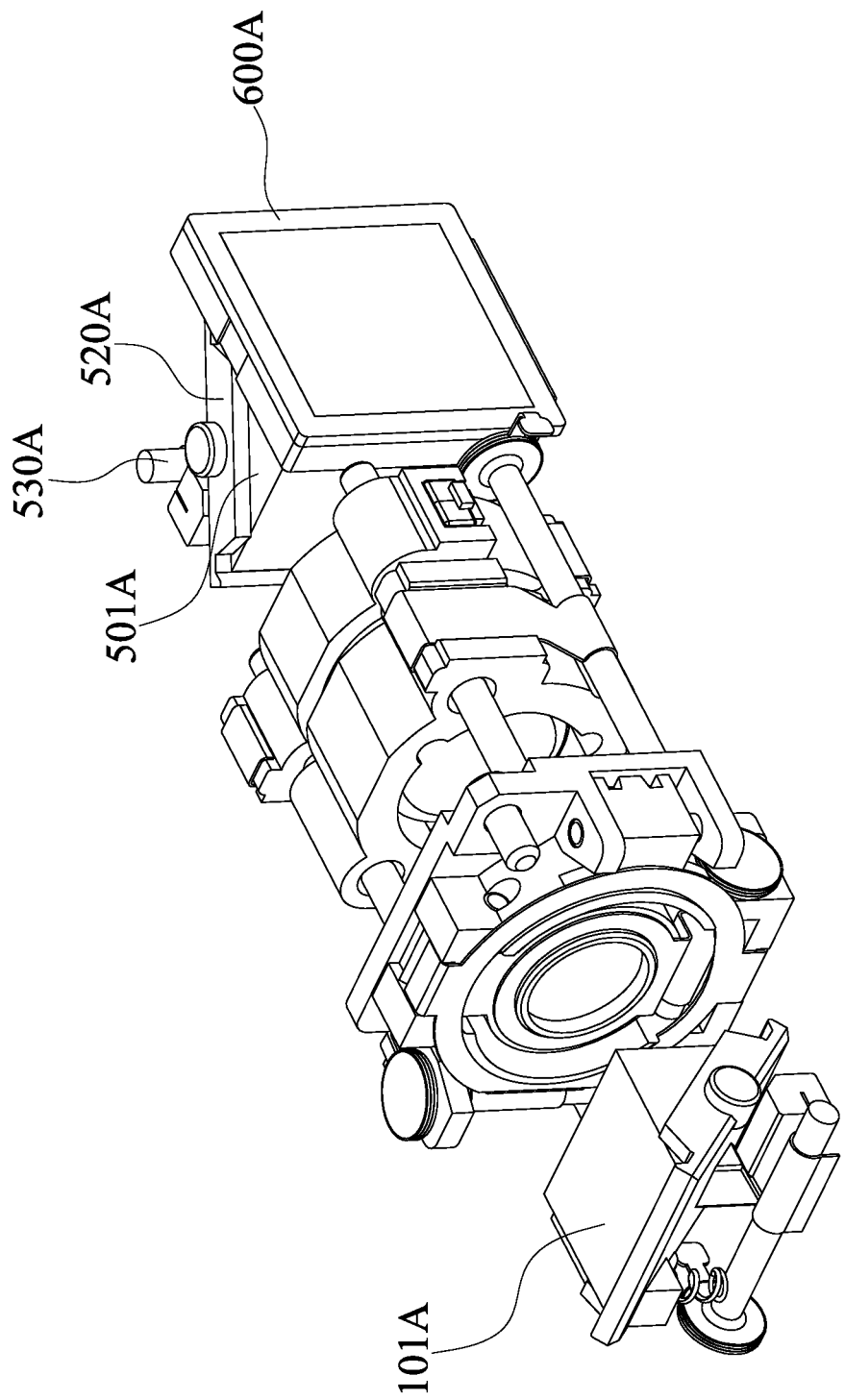

Next, please refer to FIG. 7 to FIG. 9. FIG. 7 is a perspective view of an optical system 1A. FIG. 8 and FIG. 9 are perspective views of the optical system 1A with some elements omitted. Similarly, the optical system 1A may be a periscope optical system. The optical system 1A includes a first optical module 100A, a second optical module 200A, a third optical module 300A, a fourth optical module 400A, a fifth optical module 500A, and a sixth optical module 600A. In the following and in the drawings, the same elements will be denoted with similar symbols, and the same features will not be repeated.

It should be clarified that the definition of the direction is substantially the same for the optical system 1A and the optical system 1. That is, a light 10A enters the first optical module 100A along an incident direction 50A from the top of the first optical module 100A. Then, the light 10A is adjusted by the first optical module 100A to travel in a first direction 51A. The direction of the light 10A is adjusted by the fifth optical module 500A from the first direction 51A to a fourteenth direction 64A. The light 10A leaves the fifth optical module 500A along the fourteenth direction 64A, and the light 10A is converted into an image or video on the sixth optical module 600A. The first optical module 100A, the second optical module 200A, the third optical module 300A, the fourth optical module 400A, and the fifth optical module 500A are arranged along the first direction 51A.

A first movable part 120A is rotated relative to a first immovable part 110A around a second direction 52A, so as to driving a first optical element 101A to rotate around the second direction 52A. A second movable part 220A is moved relative to a second immovable part 210A in a fourth direction 54A. A third movable part 320A is moved relative to a third immovable part 310A in a sixth direction 56A. A fourth movable part 420A is moved relative to a fourth immovable part 410A in an eighth direction 58A and/or a tenth direction 60A. Specifically, a holder 422A is movable relative to a frame 421A in the tenth direction 60A. A fifth movable part 520A is rotated relative to the fifth immovable part 510A around a twelfth direction 62A, so as to driving the fifth optical element 501A to rotate around the twelfth direction 62A.

A first transmission element 133A extends in a third direction 53A. A second transmission element extends in a fifth direction 55A. A third transmission element extends in a seventh direction 57A. A first dimension transmission element extends in a ninth direction 59A. A second dimension transmission element extends in an eleventh direction 61A. A fifth transmission element extends in a thirteenth direction 63A.

The difference between the optical system 1A and the optical system 1 includes the direction of rotation of the first movable part 120A, the direction of rotation of the fifth movable part 520A, the position of the fifth driving assembly 530A, and the position of the fifth position sensing assembly 550A.

Therefore, in this embodiment, the second direction 52A is not parallel with the incident direction 50A and the first direction 51A. The third direction 53A is not parallel with the incident direction 50A and the first direction 51A, and the third direction 53A is parallel with the second direction 52A. The fourth direction 54A is not parallel with the incident direction 50A, the second direction 52A, and the third direction 53A, and the fourth direction 54A is parallel with the first direction 51A. The fifth direction 55A is not parallel with the incident direction 50A, the second direction 52A, and the third direction 53A, and the fifth direction 55A is parallel with the first direction 51A and the fourth direction 54A. The sixth direction 56A is not parallel with the incident direction 50A, the second direction 52A, and the third direction 53A, and the sixth direction 56A is parallel with the first direction 51A, the fourth direction 54A, and the fifth direction 55A. The seventh direction 57A is not parallel with the incident direction 50A, the second direction 52A, and the third direction 53A, and the seventh direction 57A is parallel with the first direction 51A, the fourth direction 54A, the fifth direction 55A, and the sixth direction 56A.

The eighth direction 58A is parallel with the incident direction 50A, and the eighth direction 58A is not parallel with the first direction 51A, the second direction 52A, the third direction 53A, the fourth direction 54A, the fifth direction 55A, the sixth direction 56A, and the seventh direction 57A. The ninth direction 59A is parallel with the incident direction 50A and the eighth direction 58A, and the ninth direction 59A is not parallel with the first direction 51A, the second direction 52A, the third direction 53A, the fourth direction 54A, the fifth direction 55A, and the sixth direction 56A, and the seventh direction 57A. The tenth direction 60A is not parallel with the incident direction 50A, the first direction 51A, the fourth direction 54A, the fifth direction 55A, the sixth direction 56A, the seventh direction 57A, the eighth direction 58A, and the ninth direction 59A, and the tenth direction 60A is parallel with the second direction 52A and the third direction 53A. The eleventh direction 61A is not parallel with the incident direction 50A, the first direction 51A, the fourth direction 54A, the fifth direction 55A, the sixth direction 56A, the seventh direction 57A, the eighth direction 58A, and the ninth direction 59A, and the eleventh direction 61A is parallel with the second direction 52A, the third direction 53A, and the tenth direction 60A. The twelfth direction 62A is parallel with the incident direction 50A, the eighth direction 58A, and the ninth direction 59A, and the twelfth direction 62A is not parallel with the first direction 51A, the second direction 52A, the third direction 53A, the fourth direction 54A, the fifth direction 55A, the sixth direction 56A, the seventh direction 57A, the tenth direction 60A, and the eleventh direction 61A. The thirteenth direction 63A is parallel with the incident direction 50A, the eighth direction 58A, the ninth direction 59A, and the twelfth direction 62A, and the thirteenth direction 63A is not parallel with the first direction 51A, the second direction 52A, the third direction 53A, the fourth direction 54A, the fifth direction 55A, the sixth direction 56A, the seventh direction 57A, the tenth direction 60A, and the eleventh direction 61A. The fourteenth direction 64A is not parallel with the incident direction 50A and the first direction 51A.

Figure 10:
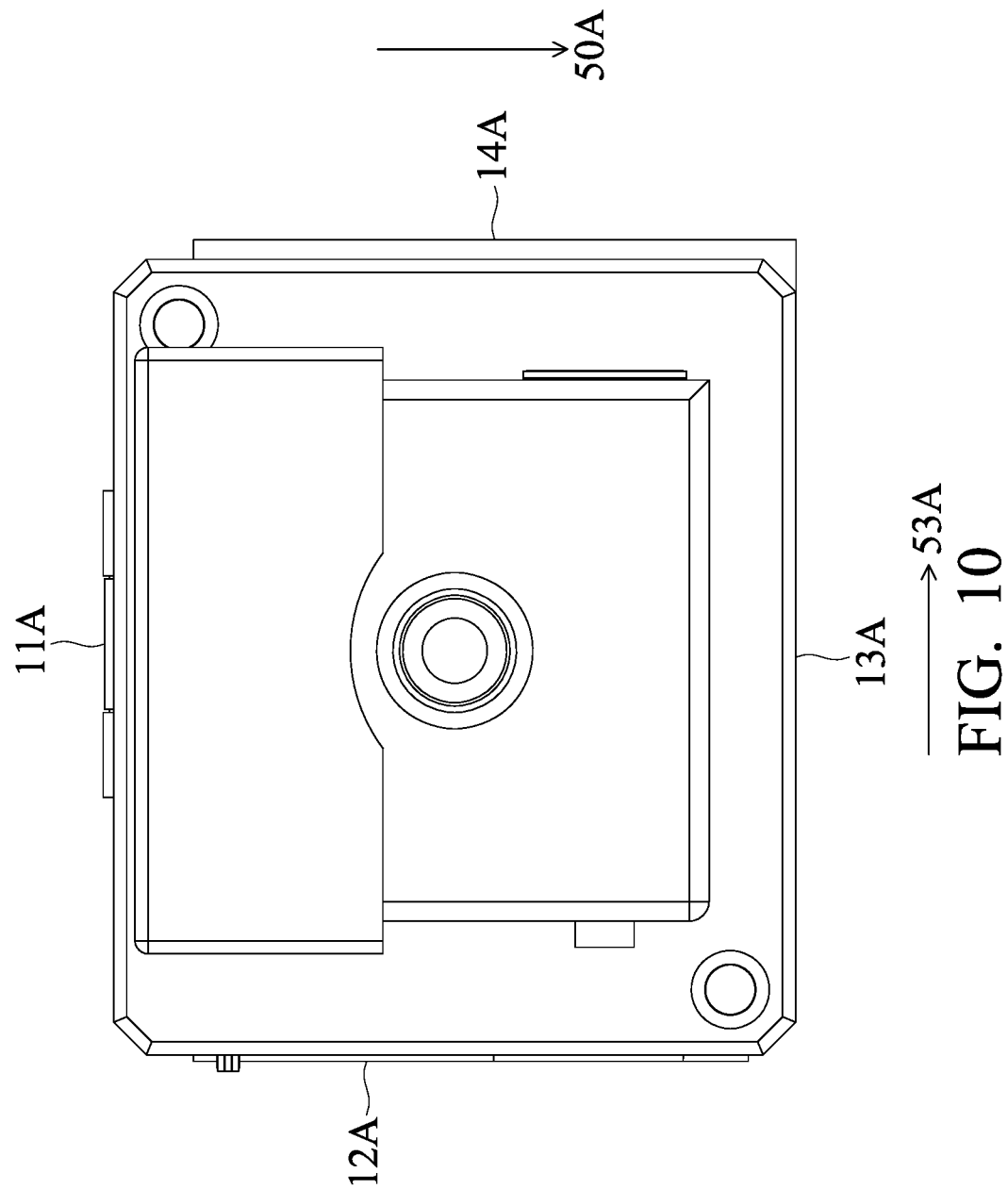
FIG. 10 is a schematic front view of the optical system.

FIG. 10 is a schematic front view of the optical system 1A. Similarly, the optical system 1A includes a first side 11A, a second side 12A, a third side 13A, and a fourth side 14A. When viewed from the first direction 51A, the fifth driving assembly 530A is located on the second side 12A. Therefore, the first driving assembly 130A and the fifth driving assembly 530A are located on different sides of the optical system 1A. When viewed from the first direction 51A, the fifth position sensing assembly 550A is located on the second side 12A. Therefore, the first position sensing assembly 150A and the fifth position sensing assembly 550A are located on different sides of the optical system 1A.

The present disclosure provides an optical system. The optical system includes optical modules for performing different functions, including yawing, pitching, zooming, auto focus, optical image stabilization, and the like. In addition, the driving assembly of the present disclosure transmitting the driving force generated by the piezoelectric element by the transmission element, so that the movement of the movable part (including linear motion, non-linear motion, rotation, etc.) is more stable, and high stability and high accuracy may be achieved.

It should be noted that the following description regarding the first optical module, the second optical module, the third optical module, the fourth optical module, and the fifth optical module may also be applicable to the optical system 1 and the optical system 1A.

The second group of embodiments.

Figure 11:
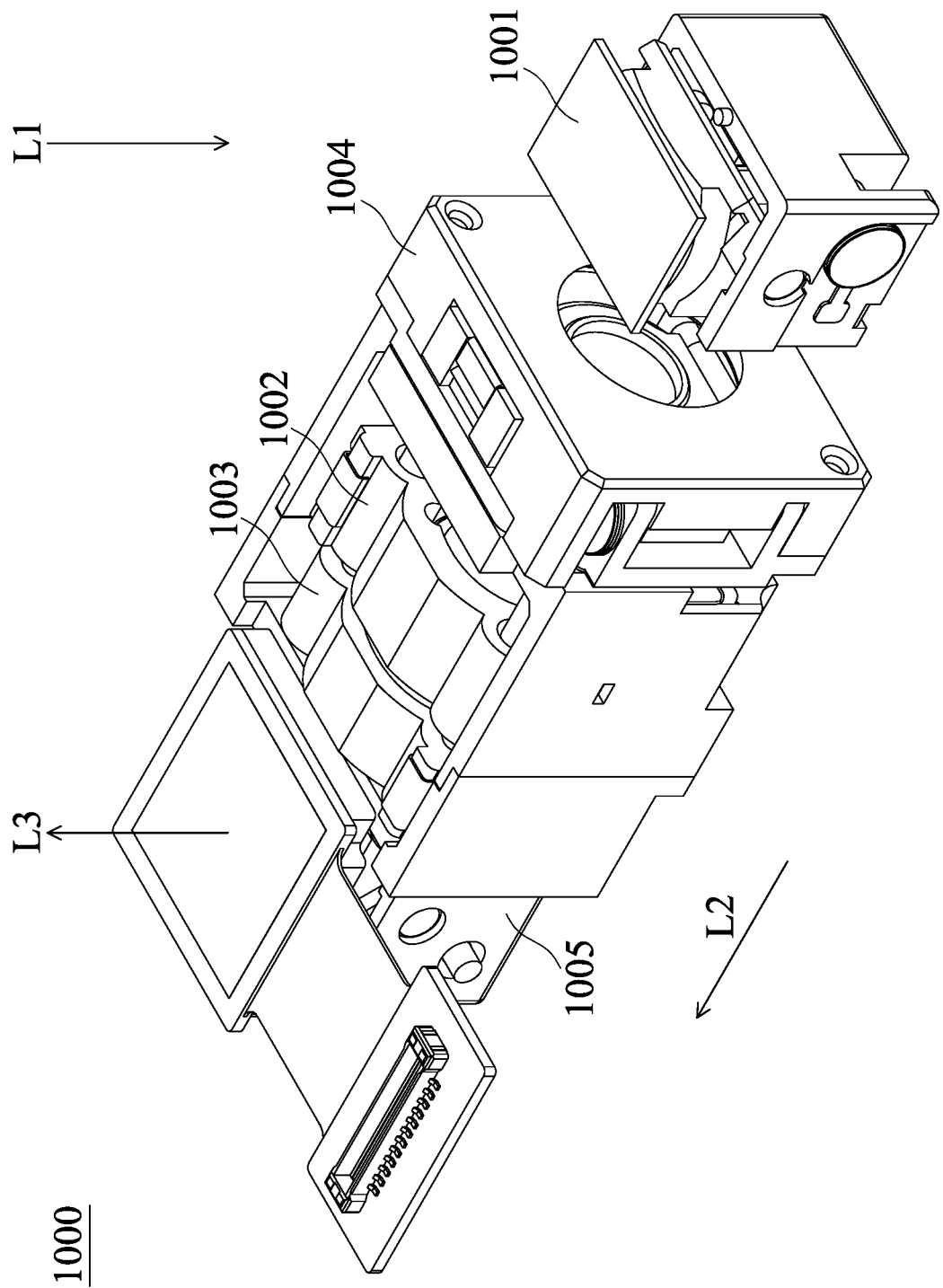
FIG. 11 is a perspective view of an optical system.
Figure 12:
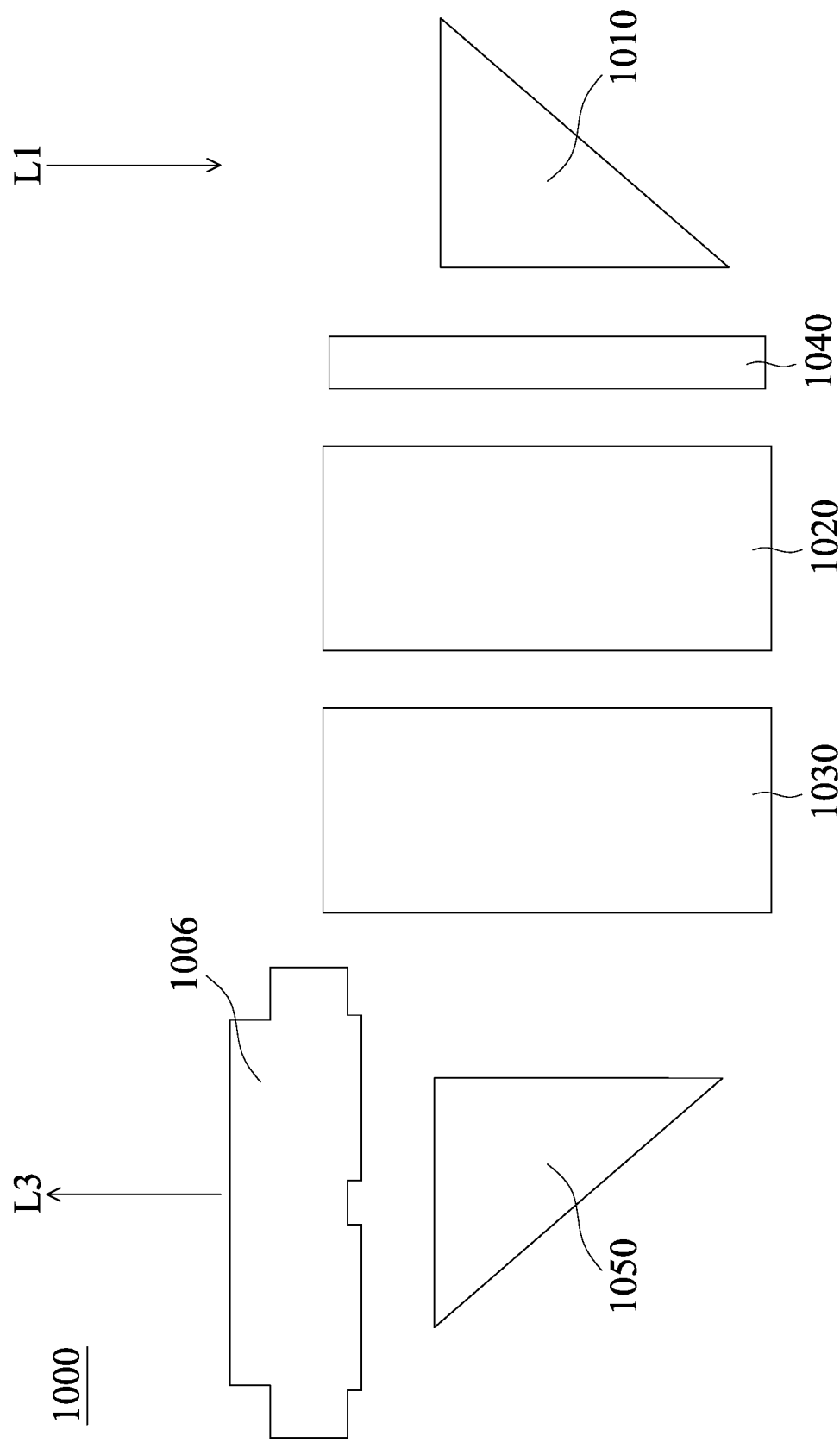
FIG. 12 is a schematic diagram of optical elements in the optical system.

According to some embodiments, an optical system 1000 is provided. FIG. 11 is a perspective view of an optical system 1000. FIG. 12 is a schematic diagram of optical elements in the optical system 1000. For simplicity, only the optical elements are shown in FIG. 12. The optical system 1000 may be a periscope optical system. The optical system 1000 includes a first optical module 1001, a second optical module 1002, a third optical module 1003, a fourth optical module 1004, a fifth optical module 1005, and a sixth optical module 1006.

A light above the first optical module 1001 enters the first optical module 1001 along a first incident direction L1, and is adjusted by the first optical module 1001 to sequentially pass through the fourth optical module 1004, the second optical module 1002, and the third optical module 1003 along a second incident direction L2. Then, the light exits the the fifth optical module 1005 along an emitting direction L3, and the light may be imaged on the sixth optical module 1006.

The first optical module 1001 and the fifth optical module 1005 may include a first optical element 1010 and a fifth optical element 1050, respectively. The first optical element 1010 and the fifth optical element 1050 may be a prism, a mirror, a refractive prism, a beam splitter, or the like. The rotation of the first optical element 1010 and the fifth optical element 1050 may change an optical path of the light. The second optical module 1002, the third optical module 1003, and the fourth optical module 1004 may include a second optical element 1020, a third optical element 1030, and a fourth optical element 1040, respectively. The second optical module 1002, the third optical module 1003, and the fourth optical module 1004 may drive the second optical element 1020, the third optical element 1030, and the fourth optical element 1040 to move, respectively. The second optical element 1020, the third optical element 1030, and the fourth optical element 1040 may be one or more lenses, optical lenses, etc., and are made of materials such as glass and resin.

In some embodiments, an optical element (not shown, for example, one or more lenses, optical lenses, etc.) may be disposed above the first optical element 1010 to correspond the first optical element 1010, and a focal length of the optical element is not zero. In other words, the optical element whose focal length is not zero may be fixedly connected to the first optical element 1010 and arranged along the first incident direction L1 with the first optical element 1010. The shooting effect of the optical system 1000 may be improved by increasing the number of optical elements.

In some embodiments, the first optical module 1001 and the fifth optical module 1005 may perform yawing and pitching, respectively. In some embodiments, the first optical module 1001 may perform yawing, and the fifth optical module 1005 may perform pitching. In some embodiments, both the first optical module 1001 and the fifth optical module 1005 may perform pitching. In some embodiments, both the first optical module 1001 and the fifth optical module 1005 may perform yawing. In some embodiments, the second optical module 1002 and the third optical module 1003 may respectively achieve functions of zooming and auto focusing. In some embodiments, the second optical module 1002 may perform auto focusing, and the third optical module 1003 may perform zooming. In other words, terms such as yawing, pitching, zooming, and auto focusing do not constitute limitations.

In some embodiments, the fourth optical module 1004 may achieve the function of Optical Image Stabilization (OIS). In some embodiments, the position of the fourth optical module 1004 may be changed, for example, the fourth optical module 1004 is disposed between the third optical module 1003 and the fifth optical module 1005. In some embodiments, the fourth optical module 1004 may be integrated into the second optical module 1002 or the third optical module 1003, and the functions of auto focusing and optical image stabilization may be achieved simultaneously via the second optical module 1002 or the third optical module 1003. In some embodiments, the fourth optical module 1004 may be omitted.

In some embodiments, the sixth optical module 1006 may be an image sensor (or called a photosensitive device), etc., for example, a Charge Coupled Device (CCD). In some embodiments, the fifth optical module 1005 may be omitted, and the position of the sixth optical module 1006 may be changed, so that the light leaving the third optical module 1003 is directly imaged on the sixth optical module 1006.

Figure 13:
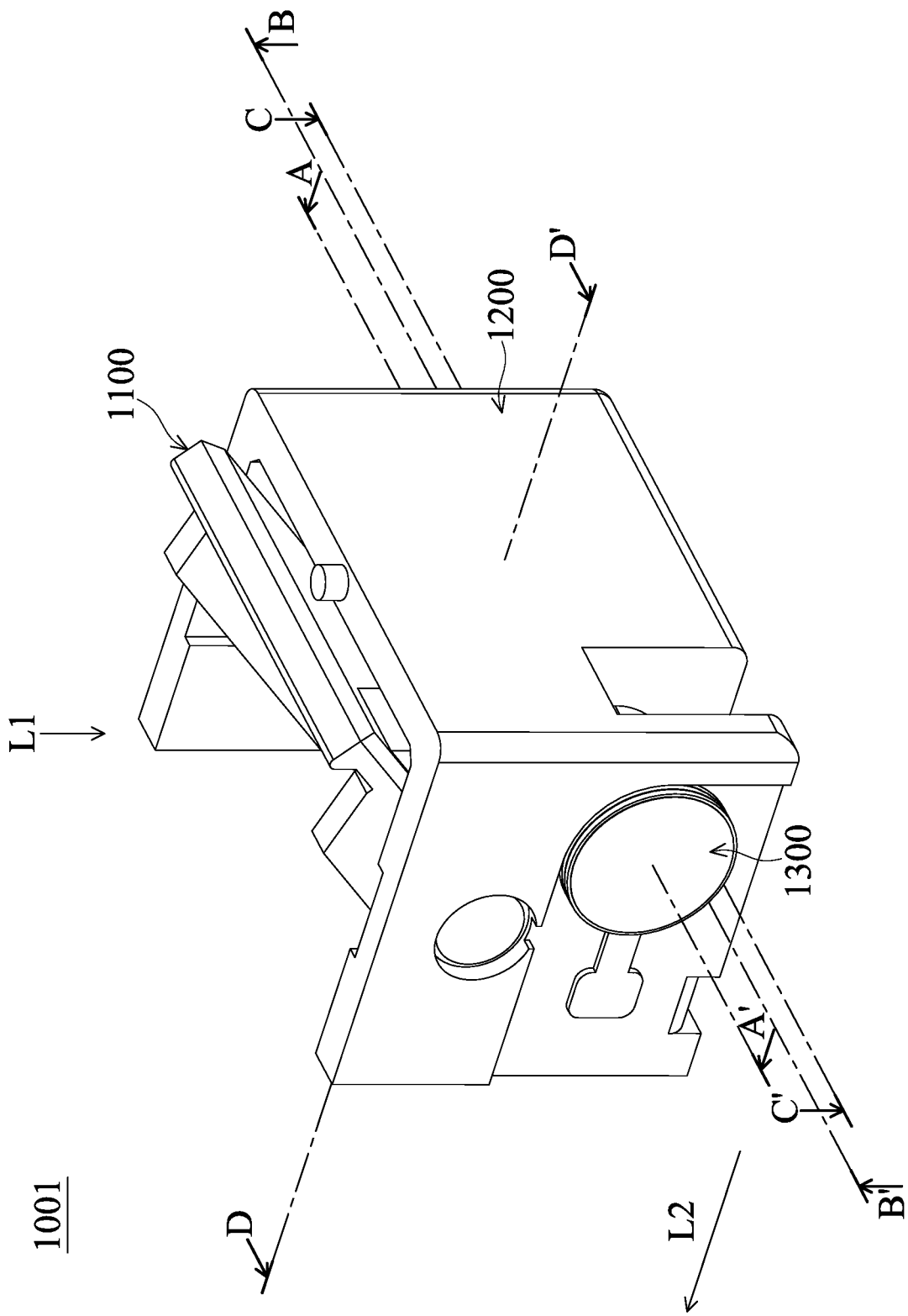
FIG. 13 is a perspective view of a first optical module of an optical system according to an embodiment of the present disclosure.
Figure 14:
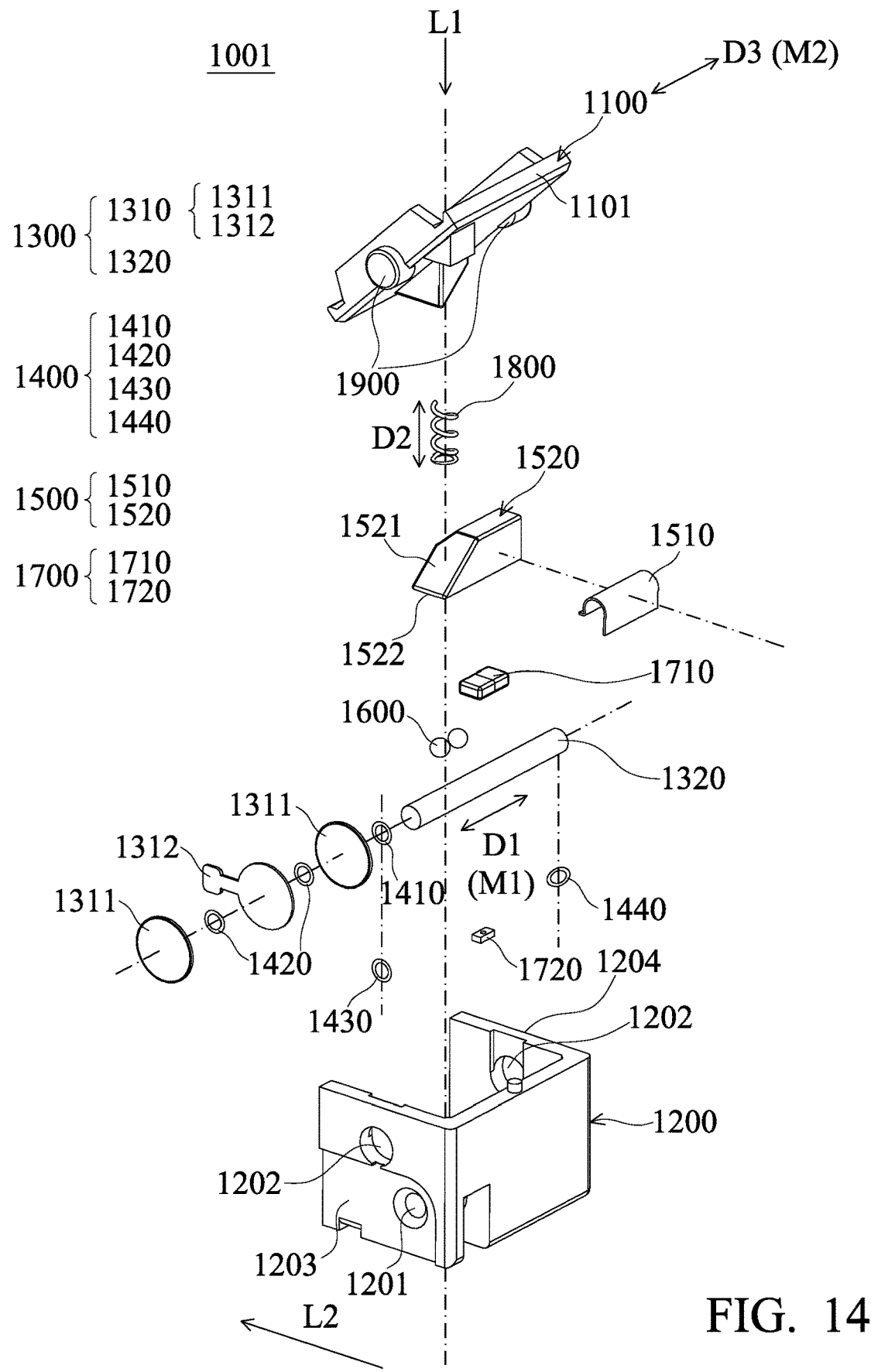
FIG. 14 is an exploded view of the first optical module according to an embodiment of the present disclosure.
Figure 15:
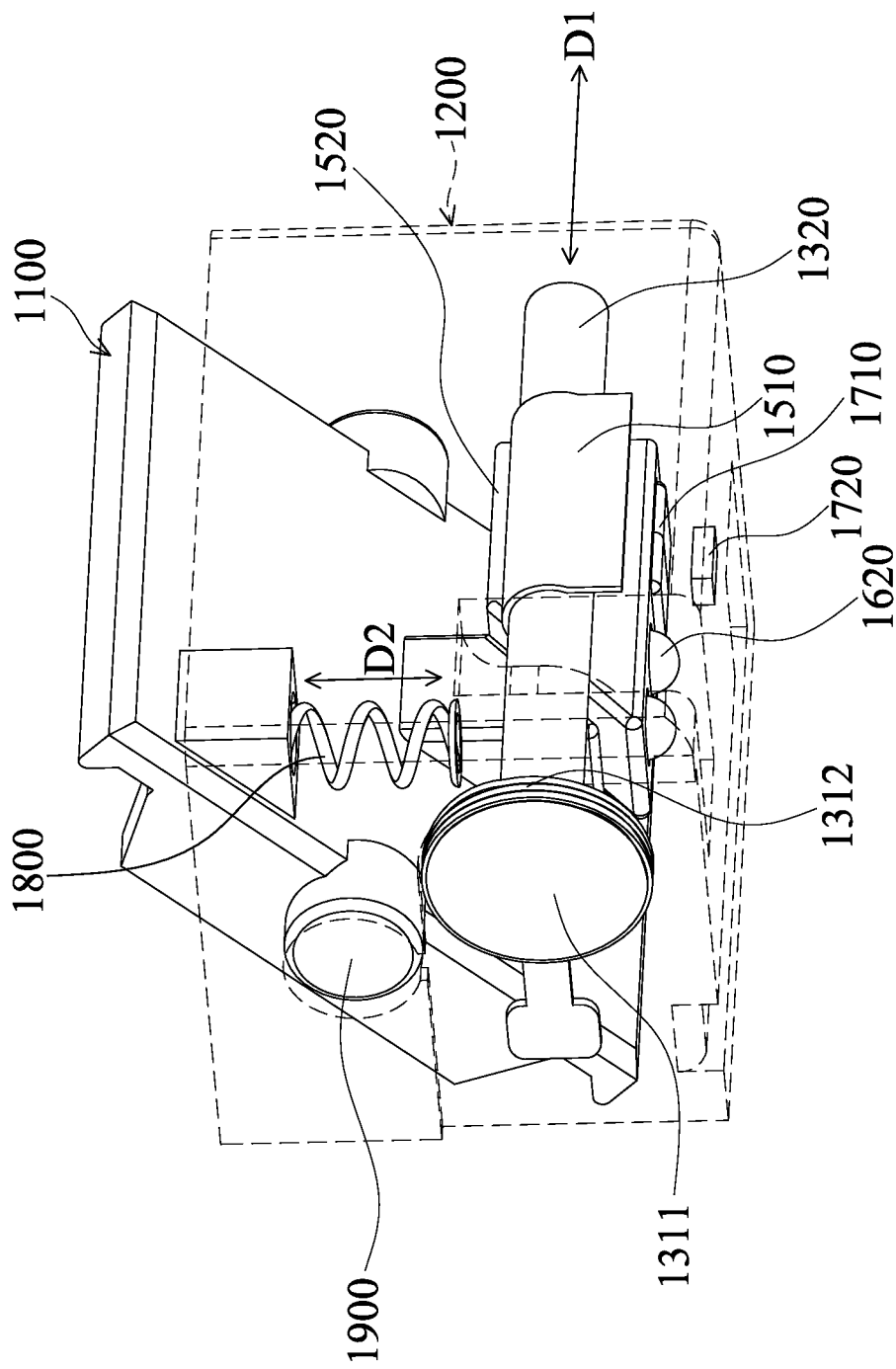
FIG. 15 is a perspective view of the first optical module according to an embodiment of the present disclosure.
Figure 16:
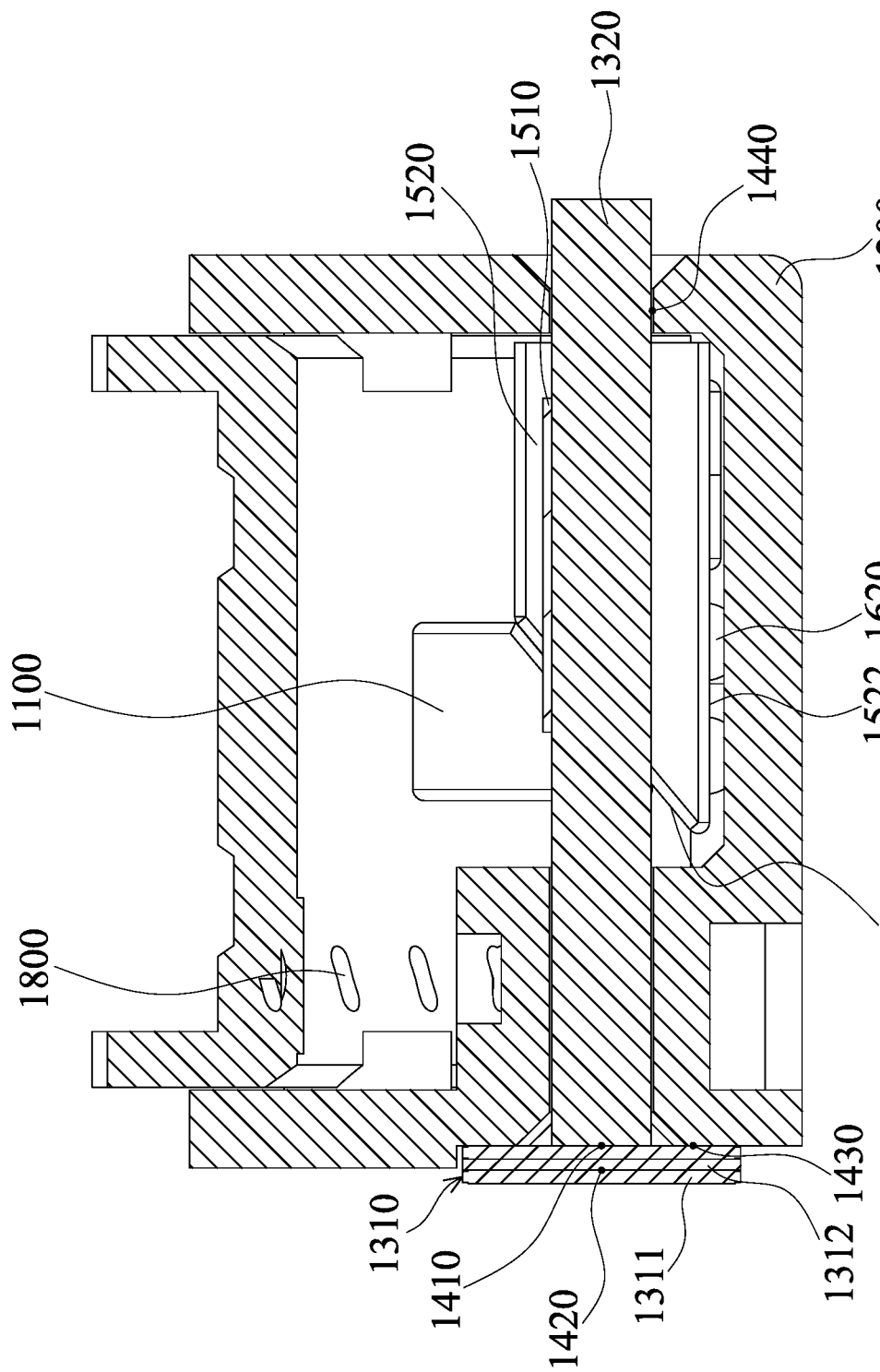
FIG. 16 is a cross-sectional view of the first optical module taken along the line A-A' in FIG. 13.

Refer to FIG. 13 to FIG. 16. FIG. 13 is a perspective view of a first optical module 1001 according to an embodiment of the present disclosure. FIG. 14 is an exploded view of the first optical module 1001 according to an embodiment of the present disclosure. FIG. 15 is a perspective view of the first optical module 1001 according to an embodiment of the present disclosure, in which some elements are shown as transparent by dashed lines to clearly show the configuration of the elements. FIG. 16 is a cross-sectional view of the first optical module taken along the line A-A' in FIG. 13. As mentioned above, the first optical module 1001 and the fifth optical module 1005 are used to control and change the optical path, and may have a similar structure. Therefore, the first optical module 1001 is described below as an example, and the description about the fifth optical module 1005 is omitted. The first optical module 1001 includes a first movable portion 1100, a first fixed portion 1200, a first driving assembly 1300, a first adhesive assembly 1400, a first conversion assembly 1500, a first guiding assembly 1600, a first position sensing assembly 1700, a first elastic element 1800, and a first rotating shaft 1900.

In this embodiment, the first optical element 1010 may be a right-angle prism, which is fixed to a holding surface 1101 of the first movable portion 1100, and the holding surface 1101 does not contact any surface forming the right angle of the first optical element 1010. The first fixed portion 1200 is a housing, and has two first holes 1201, two second holes 1202, a first wall 1203, and a second wall 1204. The two first holes 1201 are oppositely disposed on the first wall 1203 and the second wall 1204 of the first fixed portion 1200, and the two first holes 1201 may accommodate a part of the first driving assembly 1300. The two second holes 1202 are oppositely disposed on the first wall 1203 and the second wall 1204 of the first fixed portion 1200. The two second holes 1202 may accommodate a part of the first rotating shaft 1900. The first movable portion 1100 holding the first optical element 1010 is disposed in the first fixed portion 1200 and is movable relative to the first fixed portion 1200.

The first driving assembly 1300 drives the first movable portion 1100 to move relative to the first fixed portion 1200. The first driving assembly 1300 includes a first driving source 1310 and a first transmission element 1320. The first driving source 1310 is configured to generate a first driving force. The first driving source 1310 includes a first piezoelectric element 1311 and a first elastic material 1312. The first elastic material 1312 is disposed on the first piezoelectric element 1311 and has a plate-shaped structure. However, the number and the configuration of the first piezoelectric element 1311 and the first elastic material 1312 is not limited to this. For example, in this embodiment, the first driving source 1310 includes two first piezoelectric elements 1311, the first piezoelectric elements 1311 may be piezoelectric ceramic plates, and the first elastic material 1312 is disposed between the two first piezoelectric elements 1311. The first transmission element 1320 is configured to transmit the first driving force, has a cylindrical long shaft, and extends along a first direction D1.

As shown in FIG. 16, the first adhesive assembly 1400 includes a first adhesive element 1410, a second adhesive element 1420, a third adhesive element 1430, and a fourth adhesive element 1440. The first transmission element 1320 is connected to the first driving source 1310 via the first adhesive element 1410, the first piezoelectric element 1311 is connected to the first elastic material 1312 via the second adhesive element 1420, and the first driving source 1310 is connected to the first fixed portion 1200 via the third adhesive element 1430, and the first transmission element 1320 is connected to the first fixed portion 1200 via the fourth adhesive element 1440.

The Young's modulus of the first adhesive element 1410 is different from the Young's modulus of the second adhesive element 1420. In more detail, the Young's modulus of the first adhesive element 1410 is greater than the Young's modulus of the second adhesive element 1420. The Young's modulus of the first adhesive element 1410 is different from the Young's modulus of the third adhesive element 1430. In more detail, the Young's modulus of the first adhesive element 1410 is greater than the Young's modulus of the third adhesive element 1430. The Young's modulus of the first adhesive element 1410 is different from the Young's modulus of the fourth adhesive element 1440. In more detail, the Young's modulus of the first adhesive element 1410 is greater than the Young's modulus of the fourth adhesive element 1440. The Young's modulus of the second adhesive element 1420 is different from the Young's modulus of the third adhesive element 1430. In more detail, the Young's modulus of the second adhesive element 1420 is smaller than the Young's modulus of the third adhesive element 1430. The Young's modulus of the third adhesive element 1430 is the same as the Young's modulus of the fourth adhesive element 1440.

That is, in this embodiment, if the relative movement between elements is relatively large, an adhesive element with a relatively small Young's modulus may be used. Therefore, when the element is driven, the driving force will not be completely absorbed by the adhesive element, and most of the driving force may be transmitted to the target element. For example, the fourth adhesive element 1440 is connected the first transmission element 1320 and the first fixed portion 1200. On the other hand, if the relative movement between elements is relatively small, an adhesive element with a relatively large Young's modulus may be used to make a better fixation between elements. For example, the first adhesive assembly 1410 is connected the first transmission element 1320 and the first driving source 1310.

The first conversion assembly 1500 may transmit the first driving force of the first driving assembly 1300 to the first movable portion 1100. The first conversion assembly 1500 includes a first clamping element 1510 and a first sliding element 1520. The first clamping element 1510 corresponds to the first transmission element 1320, the first sliding element 1520 corresponds to the first movable portion 1100, and the first clamping element 1510 is connected to the first sliding element 1520. In more detail, the first clamping element 1510 is formed in the first sliding element 1520 by inserting molding, but not limited to this. In some embodiments, the first clamping element 1510 and the first sliding element 1520 are integrally formed. The first clamping element 1510 is made of a metal material and directly contacts the first transmission element 1320, and at least partially surrounds the first transmission element 1320. In more detail, the metal material of the first clamping element 1510 has elasticity, and the first clamping element 1510 has an arc shape, which matches the shape of the long shaft (the first transmission element 1320), so that the long shaft may pass through the first clamping element 1510 and the first clamping element 1510 may be clamped on the long shaft.

The first sliding element 1520 directly contacts the first movable portion 1100. The first sliding element 1520 has a first sliding surface 1521 and a second sliding surface 1522. The first sliding surface 1521 faces the first movable portion 1100 and contacts the first movable portion 1100, the first sliding surface 1521 is not parallel to the first direction D1, and the first sliding surface 1521 is not perpendicular to the first direction D1. The second sliding surface 1522 faces the first fixed portion 1200 and does not contact the first fixed portion 1200, and the second sliding surface 1522 is parallel to the first direction D1.

Figure 17:
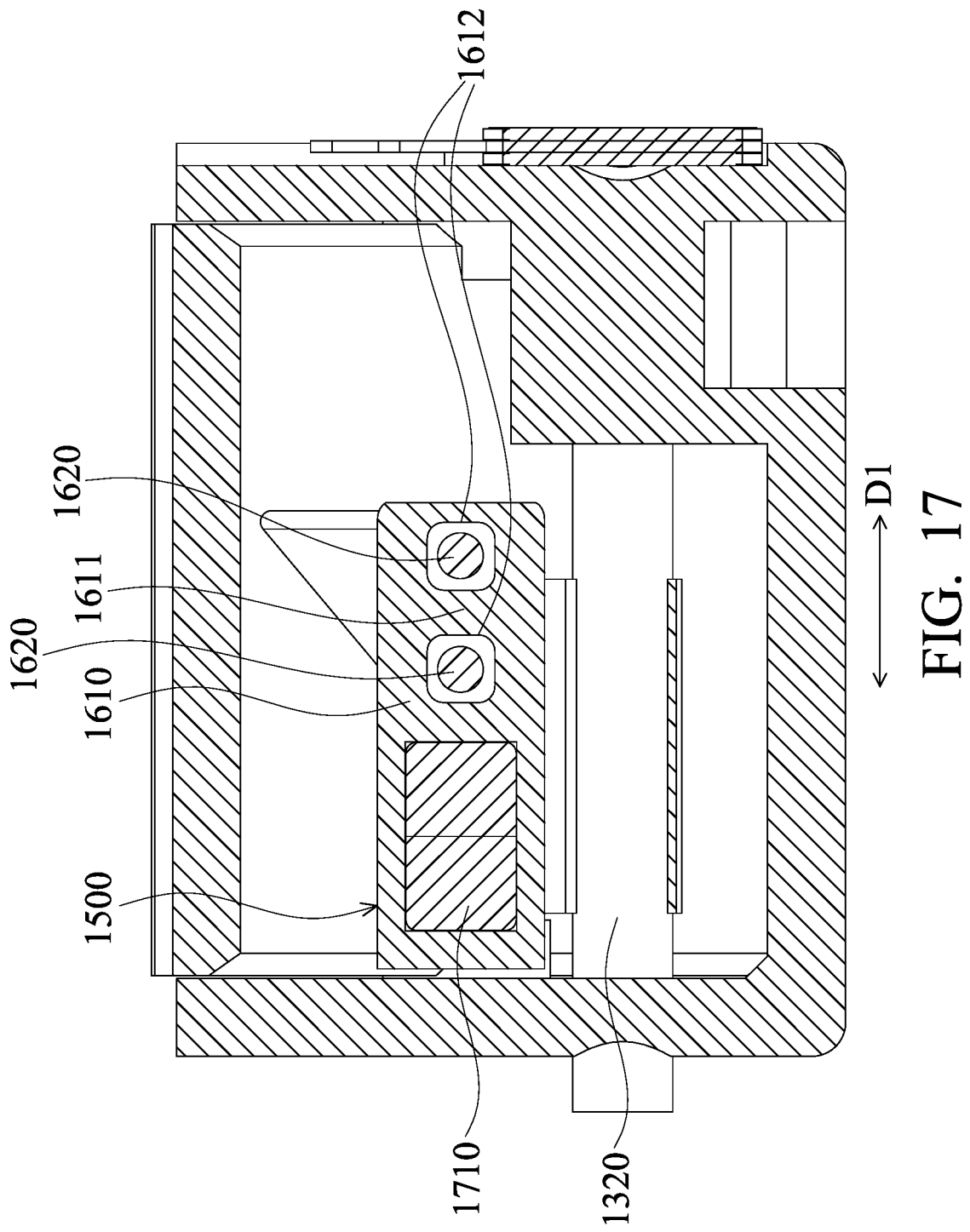
FIG. 17 is a cross-sectional view of the first optical module taken along the line B-B' in FIG. 13.
Figure 18:
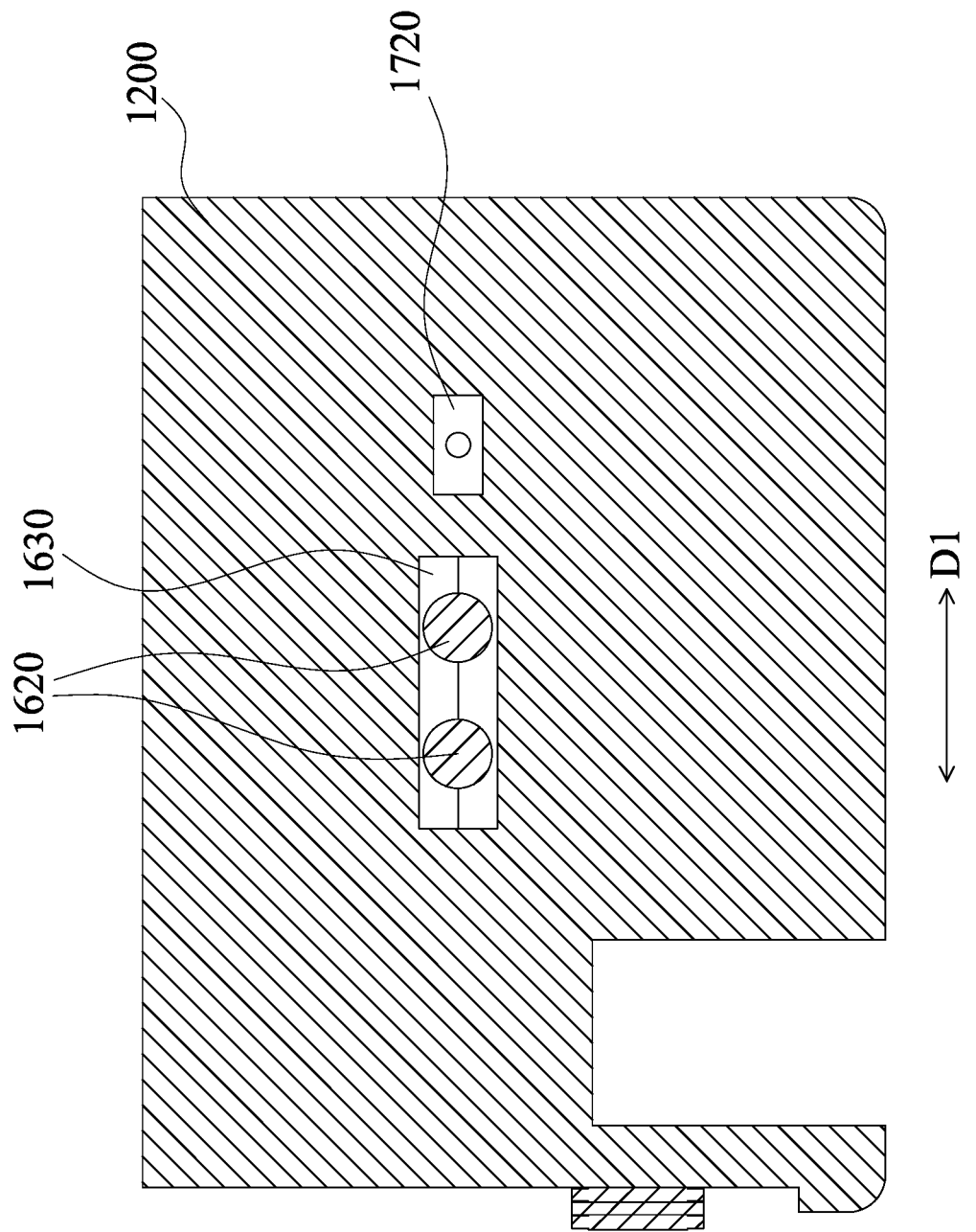
FIG. 18 is a cross-sectional view of the first optical module taken along the line C-C' in FIG. 13.

Refer to FIG. 14 to FIG. 18. FIG. 17 is a cross-sectional view of the first optical module 1001 taken along the line B-B' of FIG. 13. FIG. 18 is a cross-sectional view of the first optical module 1001 taken along the line C-C' of FIG. 13. The first guiding assembly 1600 is configured to guide the first conversion assembly 1500 to move along a first dimension M1 relative to the first fixed portion 1200. The first dimension M1 is parallel to the first direction D1. The first guiding assembly 1600 includes a first guiding element 1610, two intermediate elements 1620, and a second guiding element 1630. As shown in FIG. 17, the first guiding element 1610 is made of metal material, and is fixedly disposed on the first conversion assembly 1500. The first guiding element 1610 has a partition wall 1611 and two recessed structures 1612, and the partition wall 1611 separates the two recessed structures 1612. The two recessed structures 1612 are arranged along a direction that is parallel to the first direction D1, and may respectively accommodate a part of the two intermediate elements 1620. As shown in FIG. 18, the second guiding element 1630 is made of metal, and is fixedly disposed on the first fixed portion 1200 and corresponds to the intermediate element 1620. The second guiding element 1630 has a groove structure extending parallel to the first direction D1, which may accommodate a part of the intermediate element 1620. The intermediate element 1620 corresponds to the first guiding element 1610 and the second guiding element 1630, and is movable relative to the first guiding element 1610 and the second guiding element 1630.

In this embodiment, the metal material of the first guiding element 1610 and the second guiding element 1630 may be formed by coating or embedding a metal plate. Although the intermediate element 1620 is spherical, it is not limited to this. The intermediate element 1620 may also be changed to a guiding rod or a slidable pivot of different shapes as required.

The first position sensing assembly 1700 senses the movement of the first conversion assembly 1500 relative to the first fixed portion 1200, and includes a first reference element 1710 and a first position sensing element 1720. The first position sensing element 1720 corresponds to the first reference element 1710. The first position sensing assembly 1700 and the first guiding assembly 1600 are arranged along the first direction D1. When viewed along the first direction D1, the first position sensing assembly 1700 and the first guiding assembly 1600 at least partially overlap.

In this embodiment, the first reference element 1710 is a magnetic element disposed on the second sliding surface 1522 of the first sliding element 1520. The first position sensing element 1720 may be, for example, a Hall effect sensor, a magnetoresistive sensor, or a Fluxgate, etc., which is disposed on the first fixed portion 1200 to sense the magnetic field of the first reference element 1710 disposed on the first conversion assembly 1500, so as to obtain the position of the first conversion assembly 1500 relative to the first fixed portion 1200. But it is not limited to this. In some embodiments, the first position sensing element 1720 is disposed on the first conversion assembly 1500, and the first reference element 1710 is disposed on the first fixed portion 1200. In some embodiments, the first position sensing element 1720 is disposed on the first fixed portion 1200 and the first reference element 1710 is disposed on the first movable portion 1100.

Figure 19:
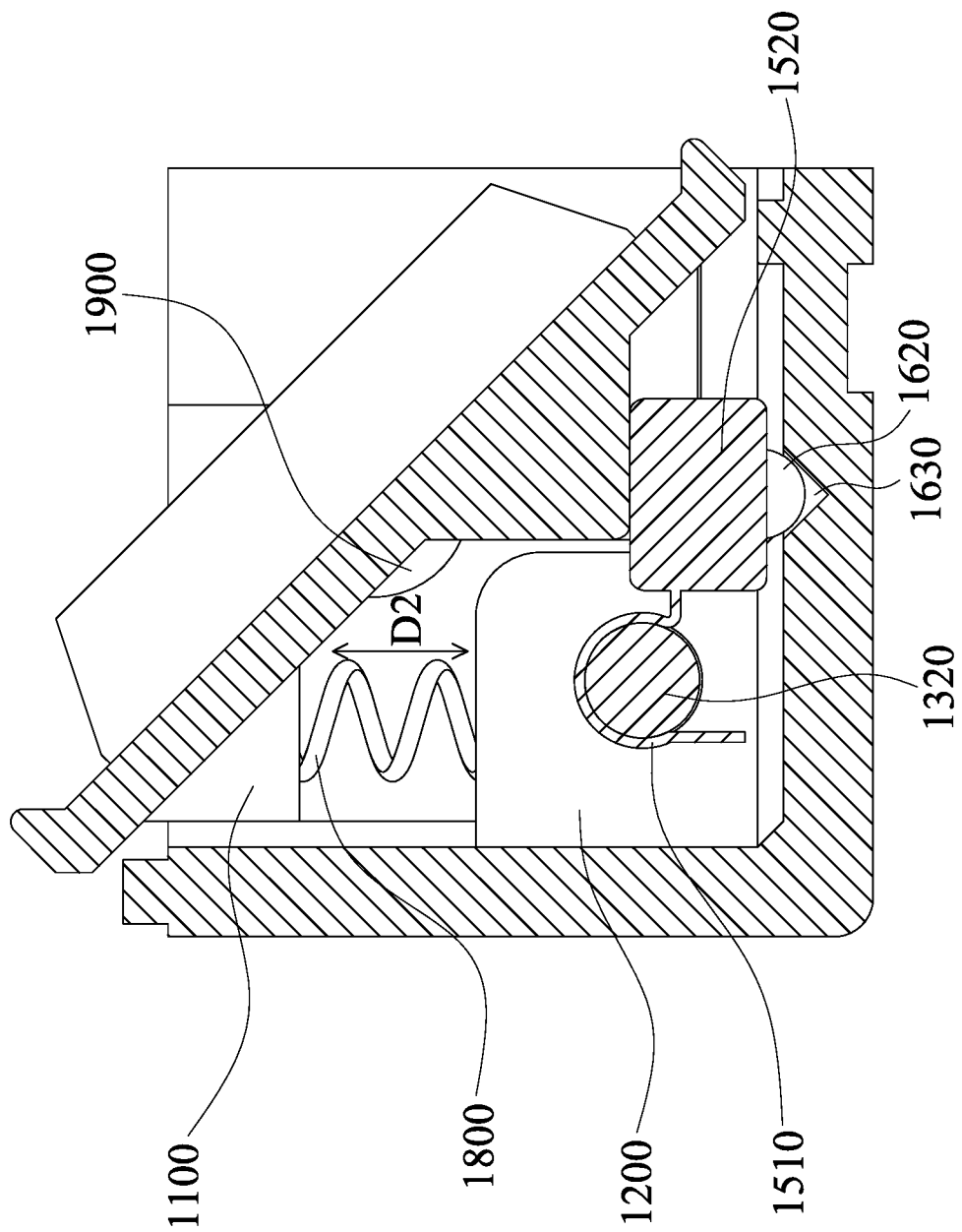
FIG. 19 is a cross-sectional view of the first optical module taken along the line D-D' in FIG. 13.

Refer to FIG. 14, FIG. 15, and FIG. 19. FIG. 19 is a cross-sectional view of the first optical module 1001 along the line D-D' in FIG. 13. The first elastic element 1800 has a spiral structure and extends along a second direction that is different from the first direction D1. Both ends of the first elastic element 1800 are respectively connected to the first movable portion 1100 and the first fixed portion 1200, so that the first movable portion 1100 is movably connected to the first fixed portion 1200 via the first elastic element 1800. The first elastic element 1800 generates a first pre-stress to stabilize the first movable portion 1100. The direction of the first pre-stress (ie, the second direction D2) is different from the first direction D1. In more detail, the direction of the first pre-stress is perpendicular to the first direction D1.

The first rotating shaft 1900 is passed through the first movable portion 1100 and disposed in the second holes 1202 of the first fixed portion 1200. The first movable portion 1100 is movable relative to the first fixed portion 1200 along a second dimension M2 via the first rotating shaft 1900. The second dimension M2 is different from the first dimension M1. In more detail, the first rotating shaft 1900 extends along the third direction D3. The first direction D1 is parallel to the third direction D3. The first movable portion 1100 may be rotated about the first rotating shaft 1900 relative to the first fixed portion 1200. When viewed along the first direction D1, the first elastic element 1800, the first rotating shaft 1900, and the first sliding surface 1521 do not overlap with each other, and the first transmission element 1320 and the first movable portion 1100 do not overlap. When viewed along the second direction D2, the first elastic element 1800 and the first driving assembly 1300 at least partially overlap. When viewed along the second direction D2, the first driving assembly 1300 and the first movable portion 1100 at least partially overlap. When viewed along a direction that is perpendicular to the first direction D1 and the second direction D2, the first elastic element 1800 and the first driving assembly 1300 do not overlap, and the first driving assembly 1300 and the first movable portion 1100 at least partially overlap.

Next, the operation of pitching in the first optical module 1001 will be described with reference to FIG. 13 to FIG. 9. When a voltage is applied to the first driving assembly 1300, the first piezoelectric element 1311 is deformed, such as slowly bending outward (an outer circumference of the first piezoelectric element 1311 is farther away from the second wall 1204 than a center of the first piezoelectric element 1311), so that the first transmission element 1320 is moved close to the second wall 1204 in the first direction D1. At this time, because there is a static friction between the first transmission element 1320 and the first clamping element 1510, there is no relative movement between the first transmission element 1320 and the first clamping element 1510. Then the voltage is controlled to make the first piezoelectric element 1311 bend inward quickly (the center of the first piezoelectric element 1311 is farther from the second wall 1204 than the outer circumference of the first piezoelectric element 1311), and the first transmission element 1320 is moved away from the second wall 1204 in the first direction D1 quickly, and the static friction between the first transmission element 1320 and the first clamping element 1510 is overcome, thereby causing the first clamping element 1510 to move close to the second wall 1204 in the first direction D1 relative to the first transmission element 1320. Therefore, by repeating the above steps, the movement of the first clamping element 1510 in the first direction D1 may be controlled.

When the first clamping element 1510 is controlled to move away from or close to the second wall 1204 in the first direction D1, the first sliding element 1520 connected to the first clamping element 1510 also moves in the same direction via the movement of the intermediate element 1620 relative to the first fixed portion 1200 and the first conversion assembly 1500, so that the first sliding surface 1521 contacts the first movable portion 1100. The forces respectively applied by the first sliding surface 1521 and the first elastic element 1800 on the first movable portion 1100 cause the first movable portion 1100 to rotate about the first rotating shaft 1900. Therefore, by controlling the movement of the first driving assembly 1300 in the first direction D1, the movement of the first movable portion 1100 in the second dimension M2 may be controlled, and then an angle of the first optical element 1010 may be controlled.

Figure 20:
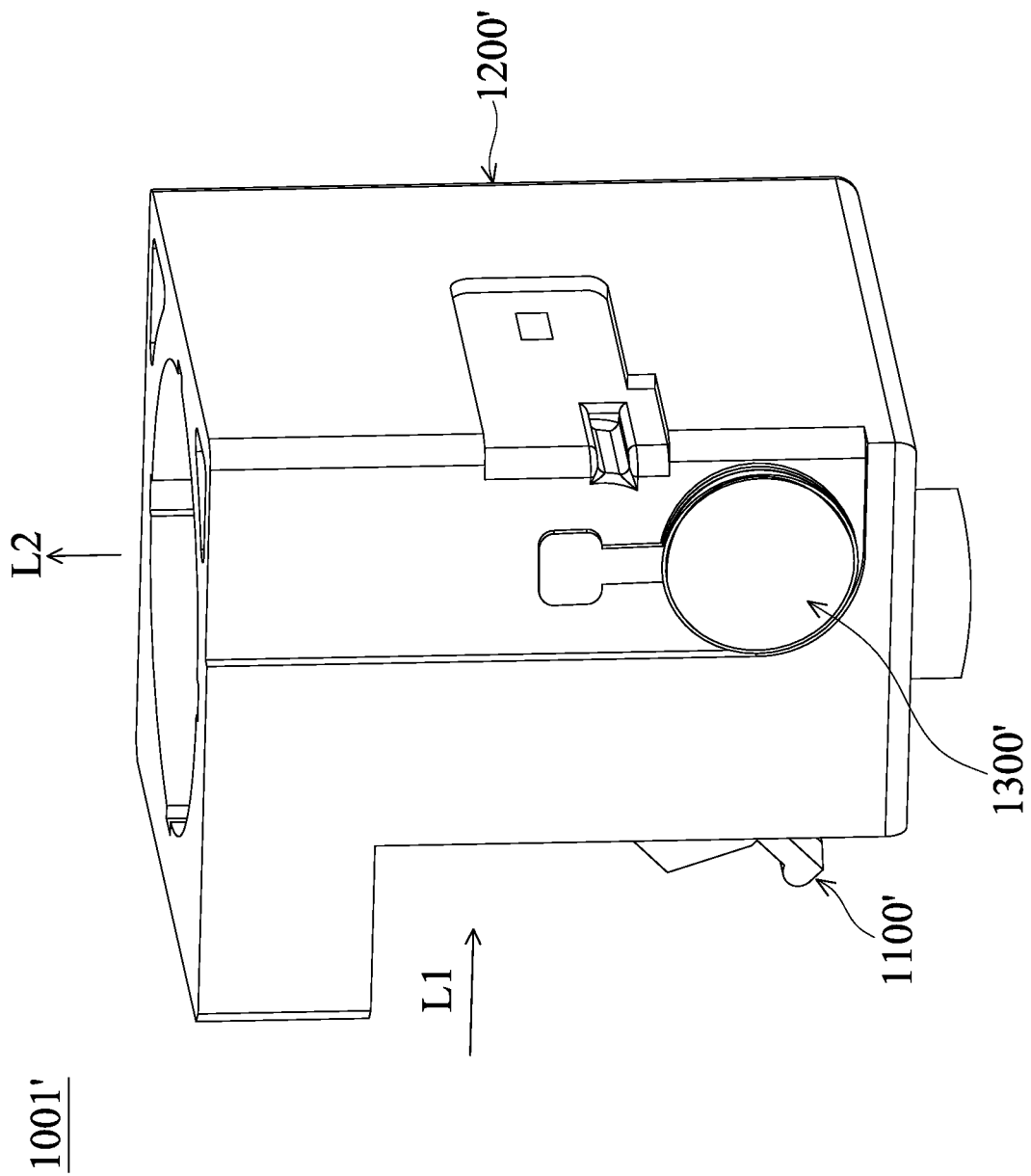
FIG. 20 is a perspective view of a first optical module according to another embodiment of the present disclosure.
Figure 21:
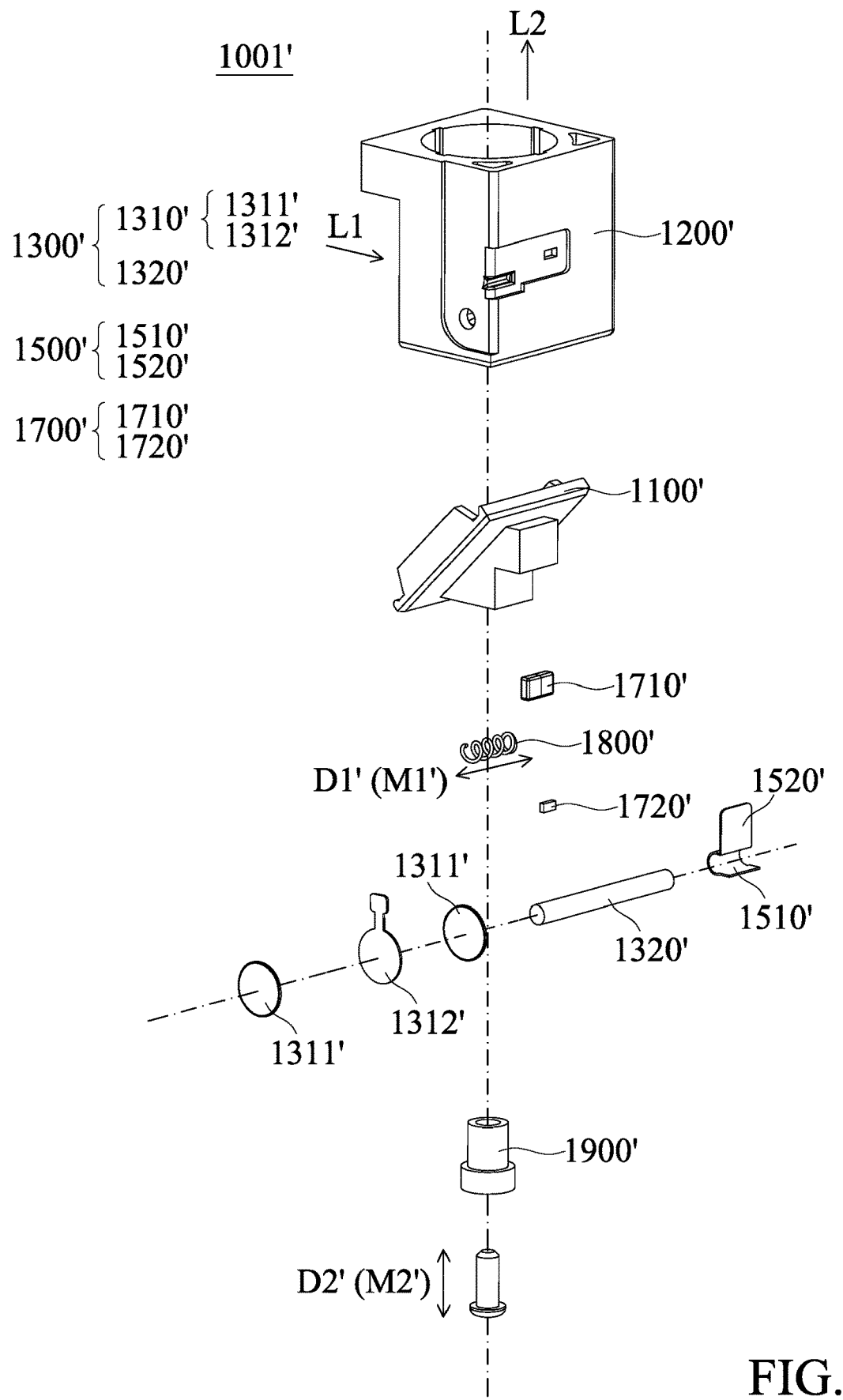
FIG. 21 is an exploded view of the first optical module according to another embodiment of the present disclosure.
Figure 22:
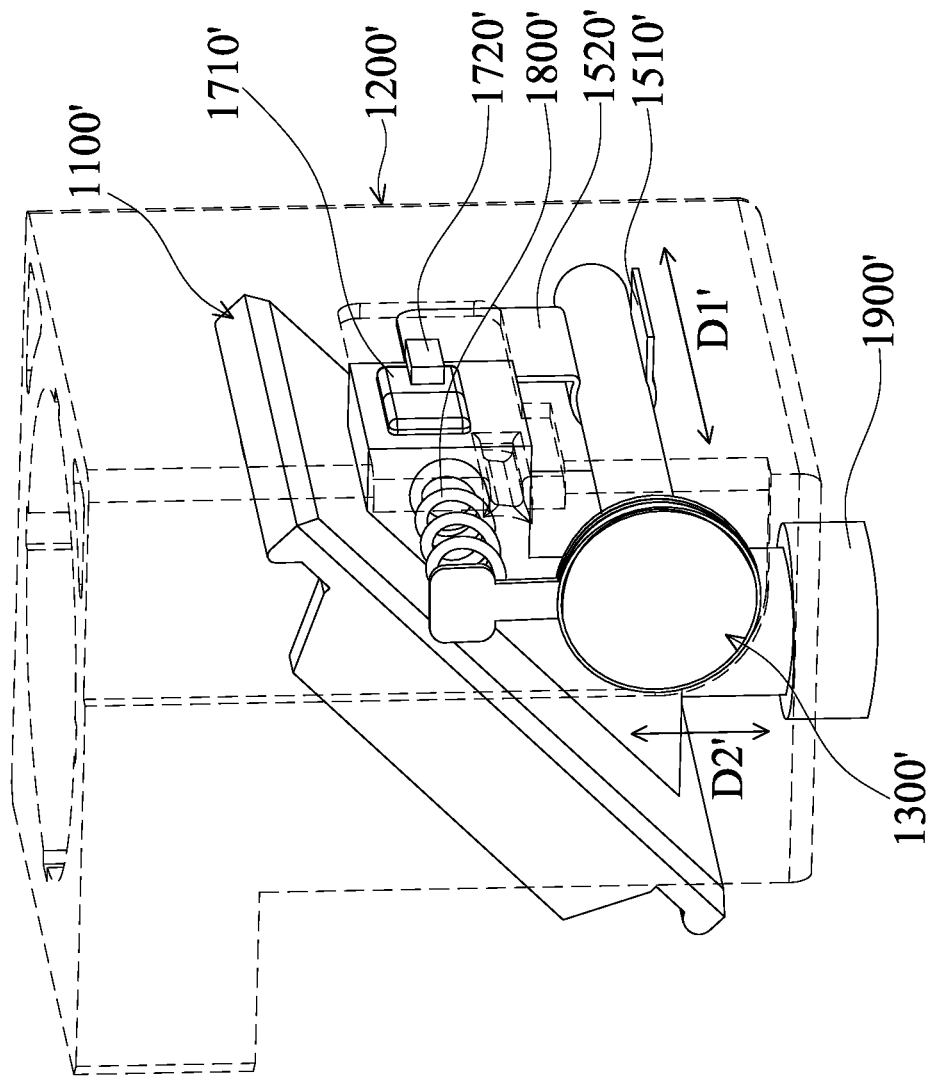
FIG. 22 is a perspective view of the first optical module according to another embodiment of the present disclosure.

Refer to FIG. 20 to FIG. 22. FIG. 20 is a perspective view of a first optical module 1001' according to another embodiment of the present disclosure. FIG. 21 is an exploded view of the first optical module 1001' according to another embodiment of the present disclosure. FIG. 22 is a perspective view of the first optical module 1001' according to another embodiment of the present disclosure, in which the housing is shown as transparent by dotted lines to clearly show the configuration of the elements. In this embodiment, the first optical module 1001' may perform yawing, and the differences from the first optical module 1001 are the first conversion assembly 1500', the first position sensing assembly 1700', the first elastic element 1800', and the first rotating shaft 1900'.

The first sliding element 1520 in the first conversion assembly 1500 is replaced with a first contacting element 1520' in the first conversion assembly 1500', and the first contacting element 1520' directly contacts the first movable portion 1100' and does not contact the first fixed portion 1200'. Therefore, the first optical module 1001' does not have the first guiding assembly 1600 either. The first reference element 1710' of the first position sensing assembly 1700' is disposed on the first movable portion 1100', so the first position sensing element 1720' disposed on the first fixed portion 1200' directly senses the movement of the first movable portion 1100'. The first elastic element 1800' extends along a direction that is parallel to the first direction D1'. The first rotating shaft 1900' extends in a direction that is parallel to the second direction D2', so that the first movable portion 1100' may move along a second dimension M2' relative to the first fixed portion 1200' via the first rotating shaft 1900'. When viewed along the first direction D1', the first transmission element 1320' and the first movable portion 1100' do not overlap. When viewed along the second direction D2', the first driving assembly 1300' and the first movable portion 1100' at least partially overlap. When viewed along a direction perpendicular to the first direction D1' and the second direction D2', the first elastic element 1800' does not overlap with the first driving assembly 1300', and the first driving assembly 1300' and the first movable portion 1100' at least partially overlap.

Therefore, similar to the first optical module 1001, when a voltage is applied to the first driving assembly 1300', the first clamping element 1510' is further controlled to move away from or close to the first piezoelectric element 1311' in the first direction D1', and the first contacting element 1520' connected to the first clamping element 1510' also moves in the same direction to directly contact the first movable portion 1100'. The forces respectively applied by the first contacting element 1520' and the first elastic element 1800' to the first movable portion 1100' causes the first movable portion 1100' to rotate about the first rotating shaft 1900', and thus performing yawing. Therefore, by controlling the movement of the first driving assembly 1300' in the first direction D1', the movement of the first movable portion 1100' in the second dimension M2' may be controlled, and then an angle of the first optical element 1010 may be controlled.

As described above, the embodiments of the present disclosure provide an optical system includes a first optical module for driving the first optical element. The first optical module includes a first movable portion, a first fixed portion, and a first driving assembly. The first movable portion is connected to the first optical element and is movable relative to the first fixed portion. The first driving assembly drives the first movable portion to move relative to the first fixed portion. By controlling the movement of the first driving assembly in the first dimension, the movement of the first movable portion in the second dimension may be controlled. Therefore, the rotation angle of the first optical element may be controlled to change the optical path. The special position and size relationship of each element disclosed in the present invention may enable the optical system to achieve a specific direction of thinning and overall miniaturization. In addition, by applying with different optical modules, the optical module may further improve the optical quality (such as shooting quality or depth sensing accuracy, etc.) of the optical system.

The third group of embodiments.

Figure 23:
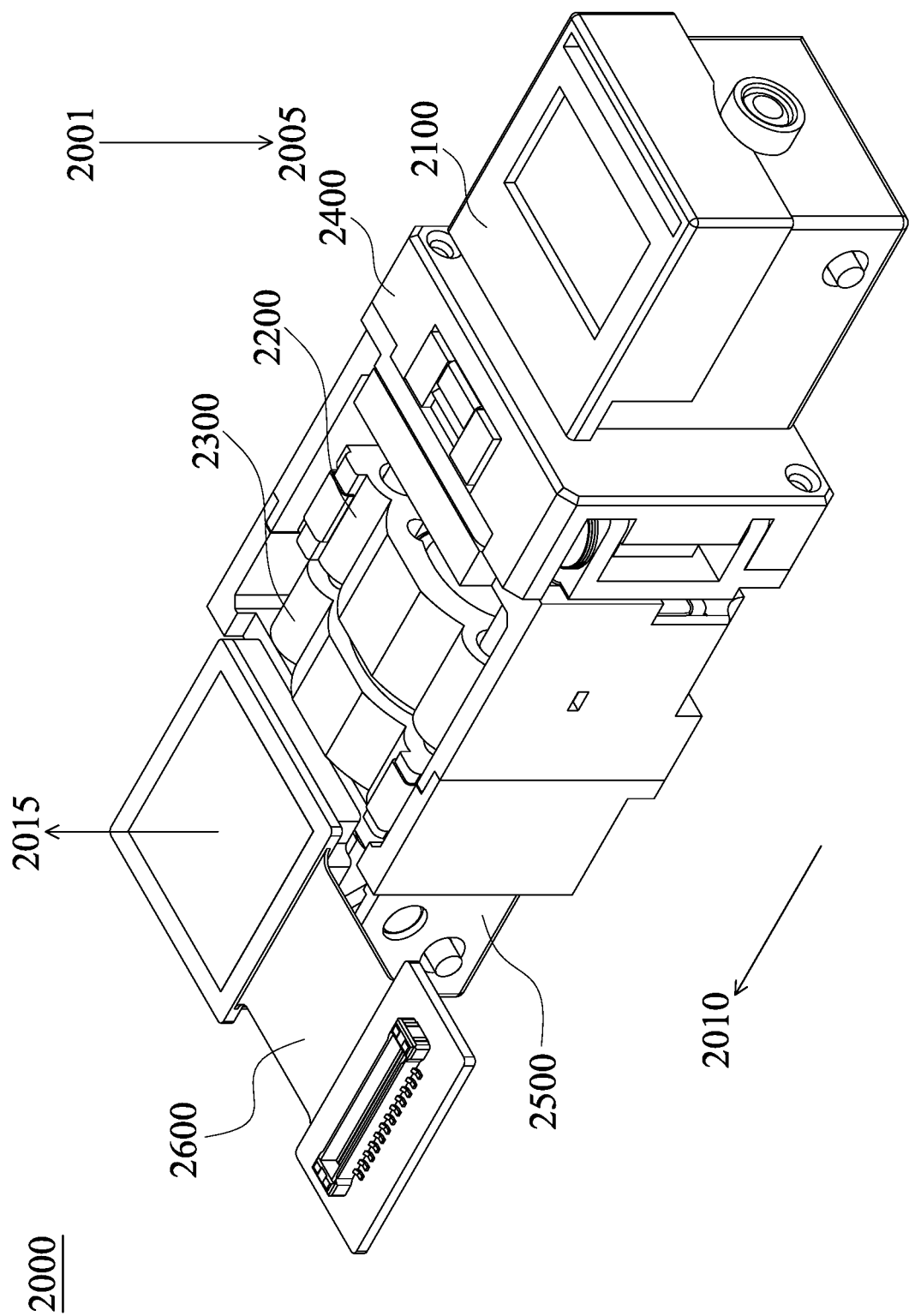
FIG. 23 is a perspective view of the optical system.
Figure 24:
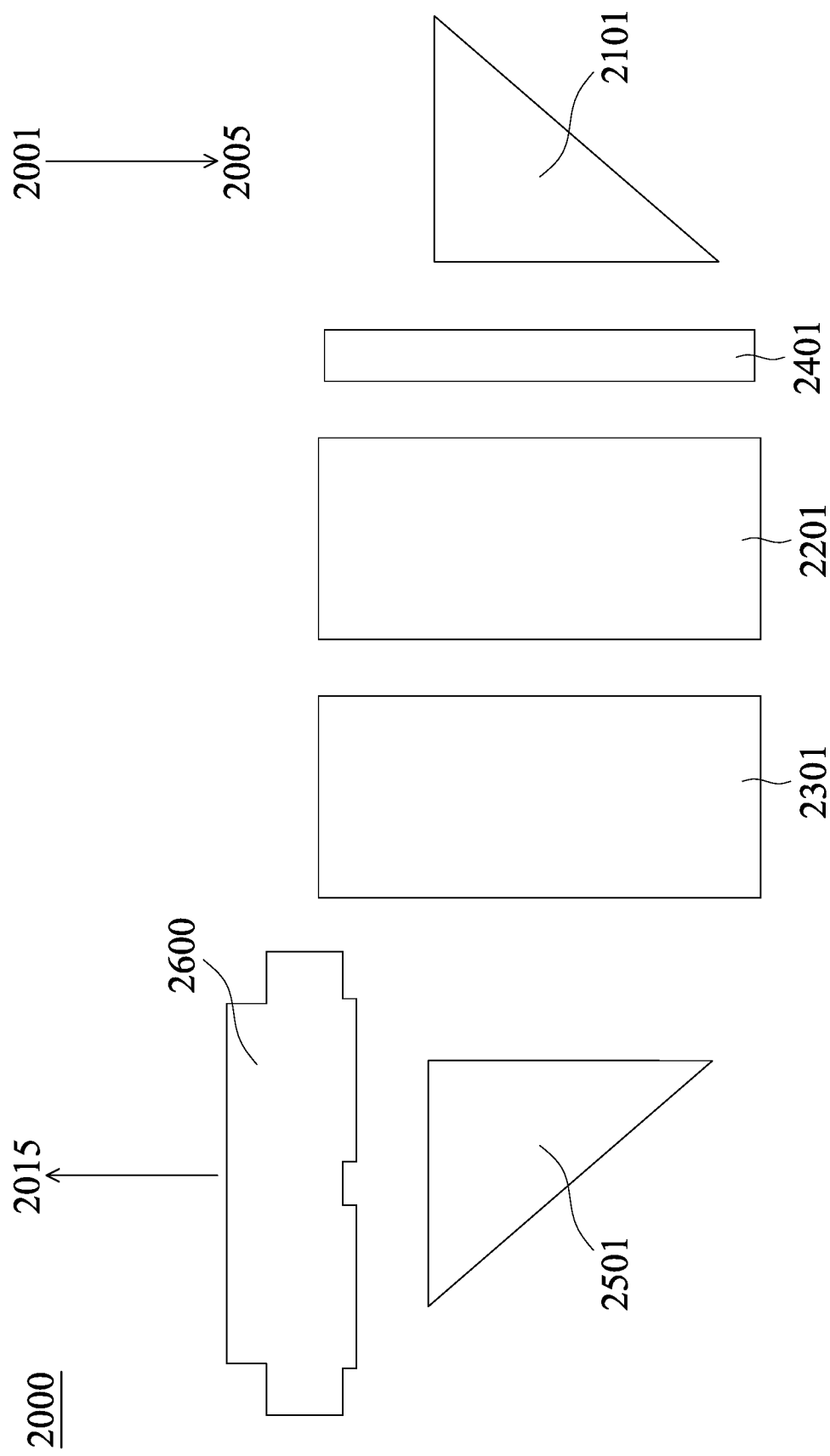
FIG. 24 is a schematic view of the optical elements of the optical system.

According to some embodiments, an optical system 2000 is provided. FIG. 23 is a perspective view of the optical system 2000. FIG. 24 is a schematic view of the optical elements of the optical system 2000. For simplification, the optical elements are only illustrated in FIG. 24. The optical system 2000 may be a periscope optical system. The optical system 2000 includes a first optical module 2100, a second optical module 2200, a third optical module 2300, a fourth optical module 2400, a fifth optical module 2500, and a sixth optical module 2600.

A light 2001 enters the first optical module 2100 from the top of the first optical module 2100 along an incident direction 2005. The direction of the light 2001 is adjusted by the first optical module 2100 from the incident direction 2005 to a first direction 2010. Then, the light 2001 passes through the fourth optical module 2400, the second optical module 2200, and the third optical module 2300 consecutively. The light 2001 leaves the fifth optical module 2500 from the top of the fifth optical module 2500 along an exit direction 2015. Furthermore, the light 2001 is converted into an image or video on the sixth optical module 2600.

The first optical module 2100 and the fifth optical module 2500 may include a first optical element 2101 and a fifth optical element 2501, respectively. The first optical element 2101 and the fifth optical element 2501 may be a prism, a reflection mirror, a refraction prism, a beam splitter, and the like. The optical path of the light 2001 may be changed via the first optical element 2101 and the fifth optical element 2501. The second optical module 2200, the third optical module 2300, and the fourth optical module 2400 may include a second optical element 2201, a third optical element 2301, and a fourth optical element 2401, respectively. The second optical module 2200, the third optical module 2300, and the fourth optical module 2400 may drive the second optical element 2201, the third optical element 2301, and the fourth optical element 2401 to move, respectively. The second optical element 2201, the third optical element 2301, and the fourth optical element 2401 may be one or more lenses, and may be made of glass, resin, and other materials. The first optical element 2101, the second optical element 2201, the third optical element 2301, the fourth optical element 2401, and the fifth optical element 2501 are arranged along the first direction 2010.

In some embodiments, an optical element with non-zero focal length (not shown, such as one or more lenses) may be placed over the first optical element 2101 to correspond the first optical element 2101. In other words, the aforementioned optical element with non-zero focal length may be immovably connected to the first optical element 2101. Also, the aforementioned optical element with non-zero focal length and the first optical element 2101 may be arranged along the incident direction 2005. The capturing functionality of the optical system 2000 may be improved by increasing the number of optical elements.

In some embodiments, the first optical module 2100 and the fifth optical module 2500 may be further rotated to achieve yawing and pitching, respectively. In some embodiments, the first optical module 2100 achieves pitching and the fifth optical module 2500 achieves yawing. In some embodiments, the second optical module 2200 and the third optical module 2300 may achieve zooming and auto focus (AF), respectively. In some embodiments, the second optical module 2200 may achieve auto focus, and the third optical module 2300 may achieve zooming. That is, the terms including yawing, pitching, zooming, auto focus are not limited hereto.

In some embodiments, the fourth optical module 2400 may achieve optical image stabilization (OIS). In some embodiments, the position of the fourth optical module 2400 may be changed. For example, the fourth optical module 2400 may be disposed between the third optical module 2300 and the fifth optical module 2500. In some embodiments, the fourth optical module 2400 may be integrated into the second optical module 2200 or the third optical module 2300, and the single second optical module 2200 or the single third optical module 2300 may simultaneously achieve auto focus and optical image stabilization. In some embodiments, the fourth optical module 2400 may be omitted.

In some embodiments, the sixth optical module 2600 may be an image sensor, such as a charge-coupled device (CCD). In some embodiments, the fifth optical module 2500 may be omitted, and the position of the sixth optical module 2600 may be changed, so that the light 2001 leaving the third optical module 2300 may be converted into an image on the sixth optical module 2600 directly.

Figure 25:
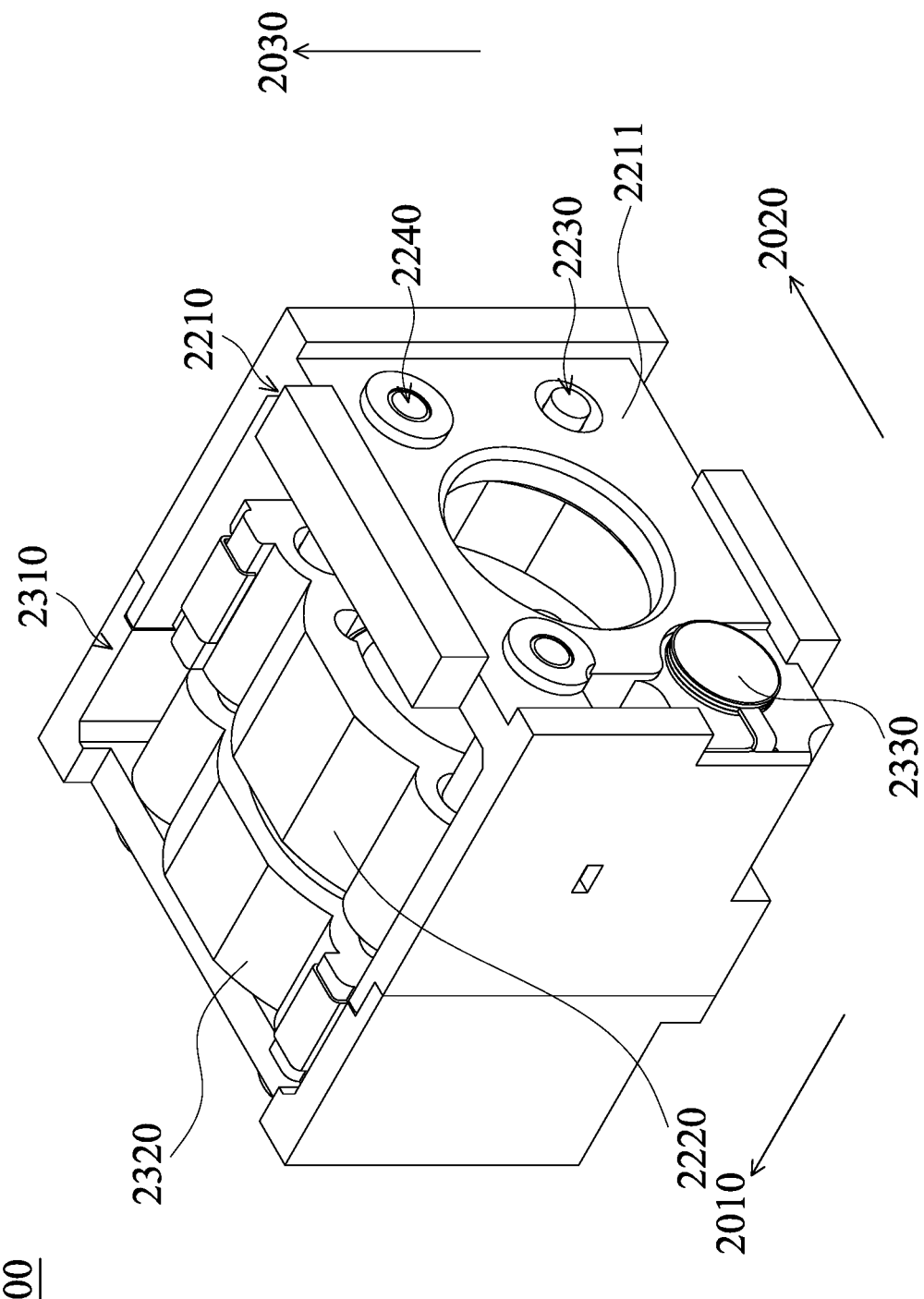
FIG. 25 is a perspective view of the second optical module and the third optical module.
Figure 26:
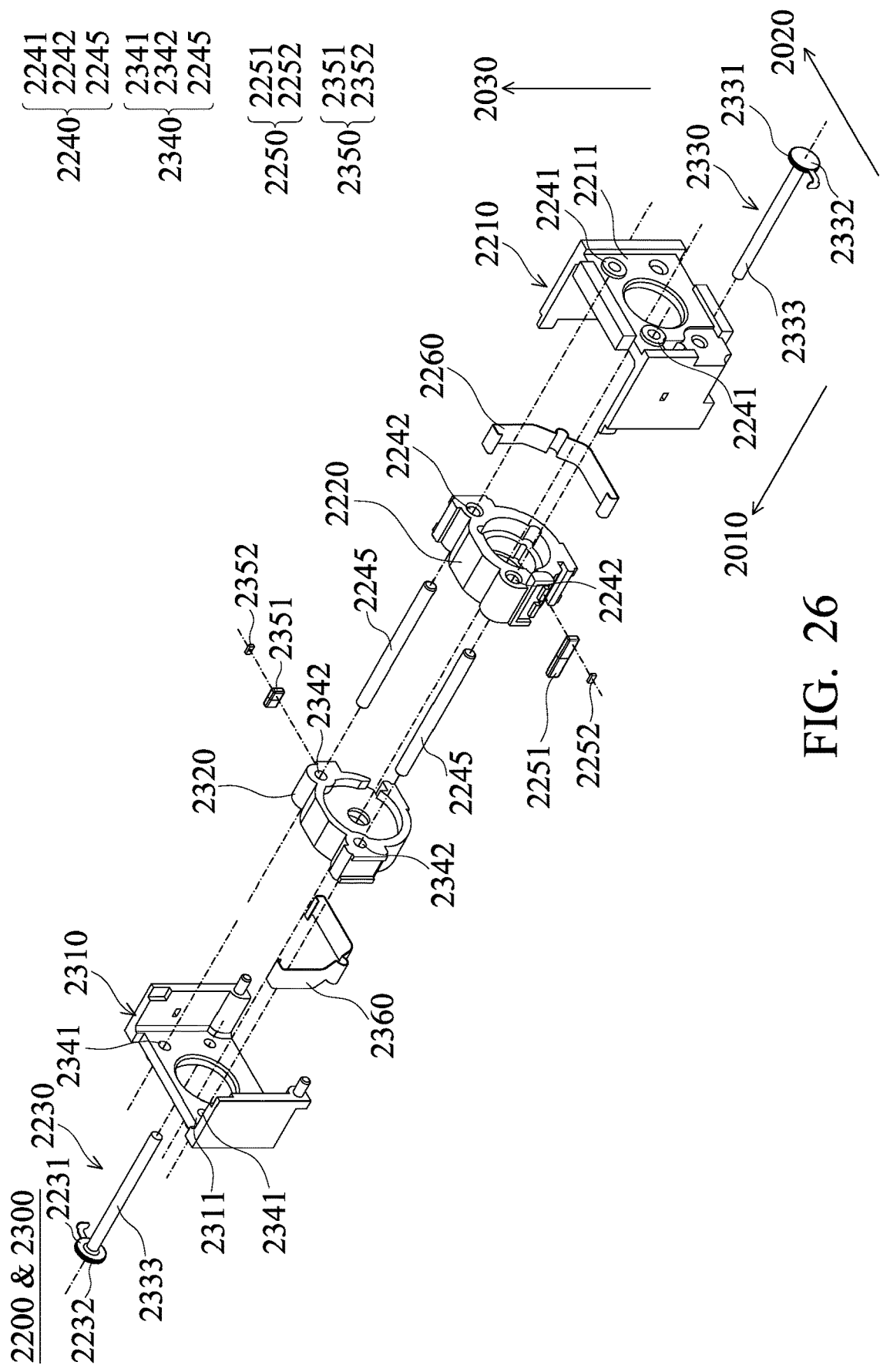
FIG. 26 is an exploded view of the second optical module and the third optical module.

In the following, the second optical module 2200 and the third optical module 2300 will be described in detail. FIG. 25 is a perspective view of the second optical module 2200 and the third optical module 2300. FIG. 26 is an exploded view of the second optical module 2200 and the third optical module 2300.

The second optical module 2200 includes a second immovable part 2210, a second movable part 2220, a second driving assembly 2230, a second guiding assembly 2240, and a second position sensing assembly 2250. The second movable part 2220 is used for connected to the second optical element 2201. The second movable part 2220 is movable relative to the second immovable part 2210. The second driving assembly 2230 is used for driving the second movable part 2220 to move relative to the second immovable part 2210. The second guiding assembly 2240 is used for guiding the second movable part 2220 to move relative to the second immovable part 2210 in a first dimension. Specifically, the movement of the second movable part 2220 relative to the second immovable part 2210 may include linear motion, non-linear motion, and rotation. The second position sensing assembly 2250 is used for sensing the movement of the second movable part 2220 relative to the second immovable part 2210.

The second immovable part 2210 may be a case for protecting the internal elements of the second optical module 2200. The second immovable part 2210 includes a second immovable part wall 2211 that is perpendicular to the first direction 2010. When viewed from the first direction 2010, the second immovable part wall 2211 is rectangular. Its long side extends in a second direction 2020 and its short side extends in a third direction 2030. In some embodiments, the first direction 2010, the second direction 2020, and the third direction 2030 are not parallel with each other. In some embodiments, the first direction 2010, the second direction 2020, the third direction 2030 are perpendicular to each other.

A threaded structure and its corresponding structure may be formed between the second movable part 2220 and the second optical element 2201, so that the second optical element 2201 may be fixed in the second movable part 2220. The second driving assembly 2230 includes a second piezoelectric element 2231, a second elastic element 2232, and a second transmission element 2233. The second guiding assembly 2240 includes at least one second immovable part guiding structure 2241, at least one second movable part guiding structure 2242, and at least one intermediate element 2245. The second position sensing assembly 2250 includes a second reference element 2251 and a second position sensing element 2252.

Similarly, the third optical module 2300 includes a third immovable part 2310, a third movable part 2320, a third driving assembly 2330, a third guiding assembly 2340, and a third position sensing assembly 2350. The third movable part 2320 is used for connected to the third optical element 2301. The third movable part 2320 is movable relative to the third immovable part 2310. The third driving assembly 2330 is used for driving the third movable part 2320 to move relative to the third immovable part 2310. The third guiding assembly 2340 is used for guiding the third movable part 2320 to move relative to the third immovable part 2310 in the first dimension. Specifically, the movement of the third movable part 2320 relative to the third immovable part 2310 may include linear motion, non-linear motion, and rotation. The third position sensing assembly 2350 is used for sensing the movement of the third movable part 2320 relative to the third immovable part 2310.

The third immovable part 2310 may be a case for protecting the internal elements of the third optical module 2300. The third immovable part 2310 includes a third immovable part wall 2311 that is perpendicular to the first direction 2010. The third immovable part 2310 is immovably connected to the second immovable part 2210. There may be structures formed between the second immovable part 2210 and the third immovable part 2310 to strengthen the connection between the second immovable part 2210 and the third immovable part 2310.

A threaded structure and its corresponding structure may be formed between the third movable part 2320 and the third optical element 2301, so that the third optical element 2301 may be fixed in the third movable part 2320. The third driving assembly 2330 includes a third piezoelectric element 2331, a third elastic element 2332, and a third transmission element 2333. The third guiding assembly 2340 includes at least one third immovable part guiding structure 2341, at least one third movable part guiding structure 2342, and the intermediate elements 2245. It should be noted that the third guiding assembly 2340 and the second guiding assembly 2240 share the intermediate elements 2345. In this embodiment, there are two intermediate elements 2245 arranged in the second direction 2020. The third position sensing assembly 2350 includes a third reference element 2351 and a third position sensing element 2352.

It should be noted that the elements of the third optical module 2300 and the elements of the second optical module 2200 may be substantially the same. For simplification, in the following, it is likely that only one of the second optical module 2200 and the third optical module 2300 is described. However, it should be understood that the related description is applicable to the other of the second optical module 2200 and the third optical module 2300.

Also, since the second optical module 2200 and the third optical module 2300 respectively provide zoom and auto focus functionality, and the range of movement of the second movable part 2220 (and the second optical element 2201) that performs the zoom function is usually wider than the range of movement of the third movable part 2320 (and the third optical element 2301) that performs the auto focus function, the range of movement of the second movable part 2220 is different from the range of movement of the third movable part 2320. Therefore, the sizes and other features of the elements of the second optical module 2200 may be different from the sizes and other features of the elements of the third optical module 2300. Additionally, as described above, in some other embodiments, the second optical module 2200 performs the auto focus function and the third optical module performs the zoom function, and thus the following description may contradict.

In the present disclosure, the second movable part 2220 may move within a second limit range in the first direction 2010, and the third movable part 2320 may move within a third limit range in the first direction 2010. In some embodiments, the second limit range is different from the third limit range. In some embodiments, the second limit range is wider than the third limit range. Also, since the second limit range is wider than the third limit range, the sizes of the elements of the second optical module 2200 may be different from the sizes of the elements of the third optical module 2300. For example, in the first direction 2010, the maximum size of the second optical element 2201 is different from the maximum size of the third optical element 2301. For example, the thickness of the second optical element 2201 may be greater than the thickness of the third optical element 2301. For example, the size of the second immovable part 2210 may be larger than the size of the third immovable part 2310. For example, the size of the second movable part 2220 may be larger than the size of the third movable part 2320.

Figure 27:
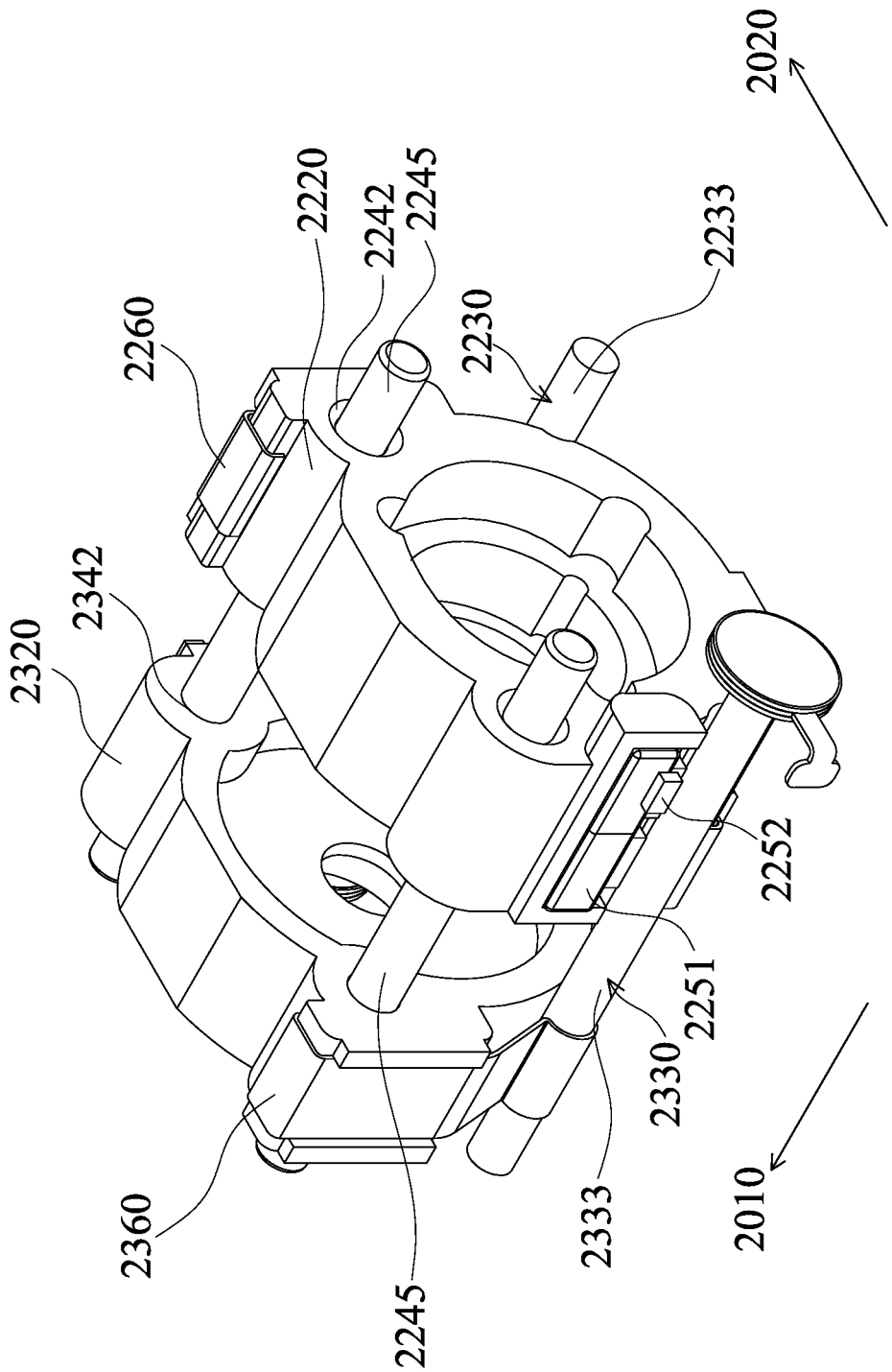
FIG. 27 is a perspective view of the second optical module and the third optical module with the second immovable part and the third immovable part omitted.
Figure 28:
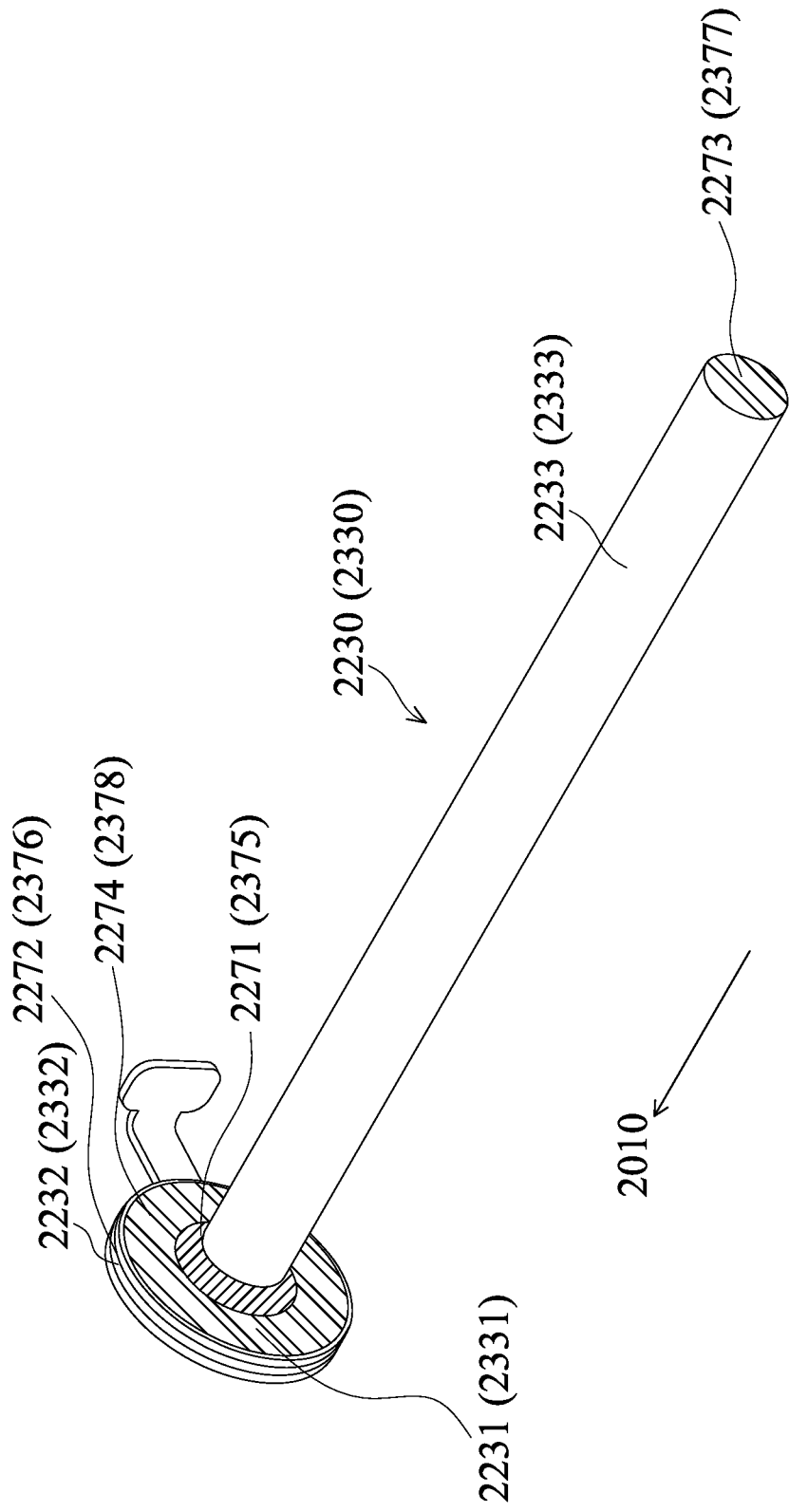
FIG. 28 is a perspective view of the second driving assembly (the third driving assembly).

Next, please refer to FIG. 27 and FIG. 28 to understand how the second driving assembly 2230 drives the second movable part 2220 to move relative to the second immovable part 2210, how the third driving assembly 2330 drives the third movable part 2320 to move relative to the third immovable part 2310, how the second guiding assembly 2240 guides the second movable part 2220 to move relative to the second immovable part 2210 in the first dimension, and how the third guiding assembly 2340 guides the third movable part 2320 to move relative to the third immovable part 2310 in the first dimension. FIG. 27 is a perspective view of the second optical module 2200 and the third optical module 2300 with the second immovable part 2210 and the third immovable part 2310 omitted. FIG. 28 is a perspective view of the second driving assembly 2230 (the third driving assembly 2330). The following description regarding the second driving assembly 2230 may also be applicable to the third driving assembly 2330.

The second piezoelectric element 2231 may be made of a piezoelectric material such as metal or ceramic. The second piezoelectric element 2231 may be deformable for generating a second driving force. For example, the second piezoelectric element 2231 may be bent. The second elastic element 2232 is disposed on the second piezoelectric element 2231. The second elastic element 2232 has a plate structure. The second transmission element 2233 has an elongated structure such as a rod, a stick, and the like. The second transmission element 2233 extends in the first direction 2010. The second transmission element 2233 is used for transmitting the second driving force to drive the second movable part 2220 to move relative to the second immovable part 2210. For the second driving assembly 2230, the second driving force generated by the second piezoelectric element 2231 is transmitted by the second transmission element 2233, which may make the movement of the second movable part 2220 more stable, and thus may achieve high stability and high accuracy. In the art, the form of the aforementioned second driving assembly 2230 may be referred as TULA.

The second optical module 2200 may further include a first adhesive element 2271, a second adhesive element 2272, a third adhesive element 2273, and a fourth adhesive element 2274. In FIG. 28, the positions where the first adhesive element 2271, the second adhesive element 2272, the third adhesive element 2273, and the fourth adhesive element 2274 are applied are illustrated schematically. The second transmission element 2233 is connected to the second piezoelectric element 2231 via the first adhesive element 2271. The second piezoelectric element 2231 is connected to the second elastic element 2232 via the second adhesive element 2272. The second transmission element 2233 is connected to the second immovable part 2210 via the third adhesive element 2273. The second piezoelectric element 2231 is connected to the third immovable part 2310 via the fourth adhesive element 2274.

Depending on the different elements to be adhered to each other, the same or different adhesive elements may be selected. In the art, "Young's modulus" may be used to describe the elastic modulus of different adhesive elements. If the Young's modulus of the adhesive elements is different, it means that their elastic modulus is different, or it may be said that their hardness is different. In some embodiments, the Young's modulus of the first adhesive element 2271 is different from that of the second adhesive element 2272, the third adhesive element 2273, and the fourth adhesive element 2274. In some embodiments, the Young's modulus of the first adhesive element 2271 is higher than that of the second adhesive element 2272, the third adhesive element 2273, and the fourth adhesive element 2274. In some embodiments, the Young's modulus of the second adhesive element 2272 is different from the Young's modulus of the third adhesive element 2273. In some embodiments, the Young's modulus of the second adhesive element 2272 is less than the Young's modulus of the third adhesive element 2273. In some embodiments, the Young's modulus of the third adhesive element 2273 is the same as the Young's modulus of the fourth adhesive element 2274.

Since the second transmission element 2233 has to transmit the second driving force generated by the second piezoelectric element 2231, the hardness of the first adhesive element 2271 that connects the second transmission element 2233 and the second piezoelectric element 2231 has to be relatively high (i.e., it has a relatively high Young's modulus). If the Young's modulus of the first adhesive element 2271 is not high enough, the second driving force may be absorbed by the first adhesive element 2271, and thus the driving efficiency is reduced. Since the second piezoelectric element 2231 has to deform, the hardness of the second adhesive element 2272 that connects the second piezoelectric element 2231 to the second elastic element 2232 has to be relatively low (i.e., it has a relatively low Young's modulus). If the Young's modulus of the second adhesive element 2272 is not low enough, the second piezoelectric element 2231 may not deform smoothly. Since the third adhesive element 2273 and the fourth adhesive element 2274 are mainly used for connecting the second driving assembly 2230 to the second immovable part 2210 and the third immovable part 2310, the third adhesive element 2273 may be substantially the same as the fourth adhesive element 2274.

Similarly, the third optical module 2300 may further include a fifth adhesive element 2375, a sixth adhesive element 2376, a seventh adhesive element 2377, and an eighth adhesive element 2378. In FIG. 28, the positions where the fifth adhesive element 2375, the sixth adhesive element 2376, the seventh adhesive element 2377, and the eighth adhesive element 2378 are applied are illustrated schematically. The third transmission element 2333 is connected to the third piezoelectric element 2331 via the fifth adhesive element 2375. The third piezoelectric element 2331 is connected to the third elastic element 2332 via the sixth adhesive element 2376. The third transmission element 2333 is connected to the second immovable part 2210 via the seventh adhesive element 2377. The third piezoelectric element 2331 is connected to the third immovable part 2310 via the eighth adhesive element 2378. The fifth adhesive element 2375 may be substantially the same as the first adhesive element 2271. The sixth adhesive element 2376 may be substantially the same as the second adhesive element 2272. The seventh adhesive element 2377 may be substantially the same as the third adhesive element 2273. The eighth adhesive element 2378 may be substantially the same as the fourth adhesive element 2274.

Therefore, the relationship of the Young's modulus of the fifth adhesive element 2375, the sixth adhesive element 2376, the seventh adhesive element 2377, and the eighth adhesive element 2378 may be similar to that of the first adhesive element 2271, the second adhesive element 2272, the third adhesive element 2273, and the fourth adhesive element 2274. Particularly, in some embodiments, the Young's modulus of the fifth adhesive element 2375 is different from that of the sixth adhesive element 2376, the seventh adhesive element 2377, and the eighth adhesive element 2378. In some embodiments, the Young's modulus of the fifth adhesive element 2375 is higher than that of the sixth adhesive element 2376, the seventh adhesive element 2377, and the eighth adhesive element 2378. In some embodiments, the Young's modulus of the sixth adhesive element 2376 is different from the Young's modulus of the seventh adhesive element 2377. In some embodiments, the Young's modulus of the sixth adhesive element 2376 is lower than the Young's modulus of the seventh adhesive element 2377. In some embodiments, the Young's modulus of the seventh adhesive element 2377 is the same as the Young's modulus of the eighth adhesive element 2378.

As shown in FIG. 26 and FIG. 27, in some embodiments, the second optical module 2200 further includes a second clamping element 2260, and the third optical module 2300 further includes a third clamping element 2360. The second clamping element 2260 and the third clamping element 2360 may be made of an elastic material such as metal. The second clamping element 2260 is in direct contact with the second transmission element 2233, generating a second pressure to make the second movable part 2220 contact the second transmission element 2233. Similarly, the third clamping element 2360 is in direct contact with the third transmission element 2333, generating a third pressure to make the third movable part 2320 contact the third transmission element 2333. Therefore, the transmission efficiency of the second driving force and the third driving force is enhanced by the second clamping element 2260 and the third clamping element 2360.

When the second driving assembly 2230 drives the second movable part 2220 to move relative to the second immovable part 2210 and/or the third driving assembly 2330 drives the third movable part 2320 to move relative to the third immovable part 2310, the second guiding assembly 2240 may guide the second movable part 2220 to move relative to the second immovable part 2210 in the first dimension and/or the third guiding assembly 2340 may guide the third movable part 2320 to move relative to the third immovable part 2310 in the first dimension. In some embodiments, the first dimension is substantially parallel with the first direction 2010.

The intermediate elements 2245 may be any element that may guide the second movable part 2220 and the third movable part 2320 to move relative to the second immovable part 2210 and the third immovable part 2310 in the first dimension. For example, the intermediate elements 2245 may include a guiding rod, a ball, or a slidable fulcrum. The second immovable part guiding structure 2241 may be a hole formed on the second immovable part 2210. In other words, the second immovable part guiding structure 2241 is fixedly disposed on the second immovable part 2210. The second immovable part guiding structure 2241 corresponds to one of the intermediate elements 2245 and is fixedly connected to the one of the intermediate elements 2245. The method for fixedly connecting the one of the intermediate elements 2245 to the second immovable part guiding structure 2241 may include welding or gluing. The second immovable part guiding structure 2241 may include a metal material, which is advantageous for being welded or preventing generating unwanted particles during the contact with the one of the intermediate elements 2245. The second movable part guiding structure 2242 may be a hole formed on the second movable part 2220. In other words, the second movable part guiding structure 2242 is fixedly disposed on the second movable part 2220. The second movable part guiding structure 2242 corresponds to the other intermediate element 2245 and is movable relative to the other intermediate element 2245. The second movable part guiding structure 2242 may include a metal material, for example, formed by plating or embedding a metal material. The third immovable part guiding structure 2341 is similar to the second immovable part guiding structure 2241, and the third movable part guiding structure 2342 is similar to the second movable part guiding structure 2242. The second guiding assembly 2240 and the third guiding assembly 2340 ensure the predetermined positions of the second movable part 2220 and the third movable part 2320, so that the second movable part 2220 and the third movable part 2320 do not depart from the predetermined positions when moving. Therefore, the range of movement of the second movable part 2220 in the first dimension and the range of movement of the third movable part 2320 in the first dimension are ensured, and unwanted shaking, vibration, rotation, tilting, and the like of the second movable part 2220 and the third movable part 2320 are prevented.

Additionally, when the second driving assembly 2230 drives the second movable part 2220 to move relative to the second immovable part 2210 and/or the third driving assembly 2330 drives the third movable part 2320 to move relative to the third immovable part 2310, the second position sensing assembly 2250 may sense the movement of the second movable part 2220 relative to the second immovable part 2210 and/or third position sensing assembly 2350 may sense the movement of the third movable part 2320 relative to the third immovable part 2310.

The second reference element 2251 and the third reference element 2351 include a magnetic material. For example, the second reference element 2251 and/or the third reference element 2351 may be a magnet, a permanent magnet, and the like. The second position sensing element 2252 and/or the third position sensing element 2253 may be a sensor, including a Hall sensor, a magnetoresistance (MR) effect sensor, a giant magnetoresistive (GMR) effect sensor, a tunneling magnetoresistive (TMR) effect sensor, and the like.

The position of the second reference element 2251 corresponds to the position of the second position sensing element 2252. Also, when viewed from the second direction 2020, the second position sensing element 2252 at least partially overlaps the second optical element 2201, and the second position sensing element 2252 does not overlap the third optical element 2301. When the second movable part 2220 moves relative to the second immovable part 2210, the second position sensing element 2252 may sense the change of the magnetic lines of force of the second reference element 2251, so as to know the position of the second movable part 2220. Similarly, the position of the third reference element 2351 corresponds to the position of the third position sensing element 2352. Also, when viewed from the second direction 2020, the third position sensing element 2352 does not overlap the second optical element 2201, and the third position sensing element 2352 at least partially overlaps the third optical element 2301. When the third movable part 2320 moves relative to the third immovable part 2310, the third position sensing element 2352 may sense the change of the magnetic lines of force of the third reference element 2351, so as to know the position of the third movable part 2320.

Since the size of the second movable part 2220 and the size of the third movable part 2320 may be different, the size of the second position sensing assembly 2250 may be different from the size of the third position sensing assembly 2350. In some embodiments, in the first direction 2010, the maximum size of the second reference element 2251 is different from the maximum size of the third reference element 2351. In some embodiments, in the first direction 2010, the maximum size of the second reference element 2251 is larger than the maximum size of the third reference element 2351.

Figure 29:
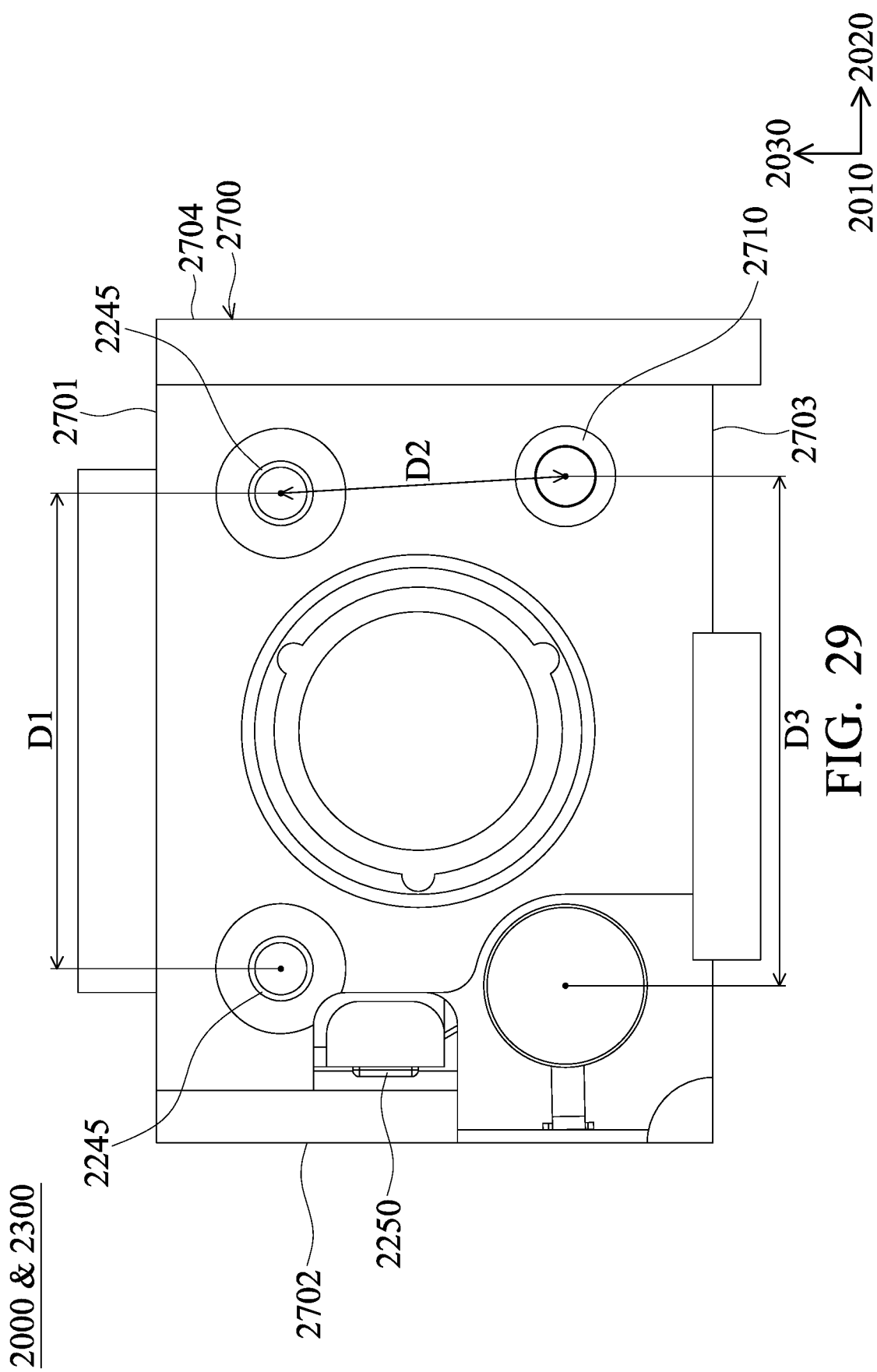
FIG. 29 is a front view of the second optical module and the third optical module.
Figure 30:
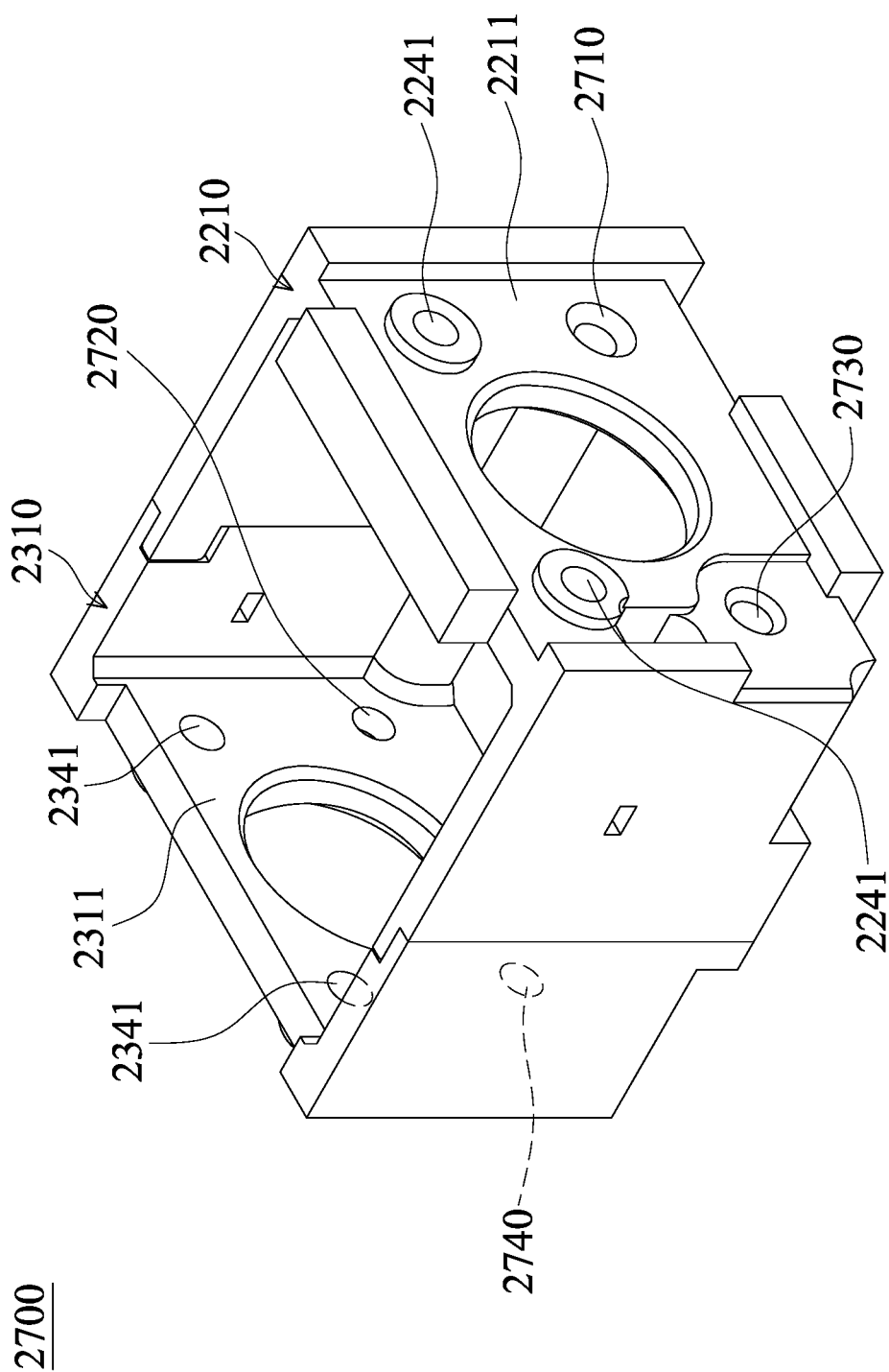
FIG. 30 is a perspective view of the immovable part.
Figure 31:
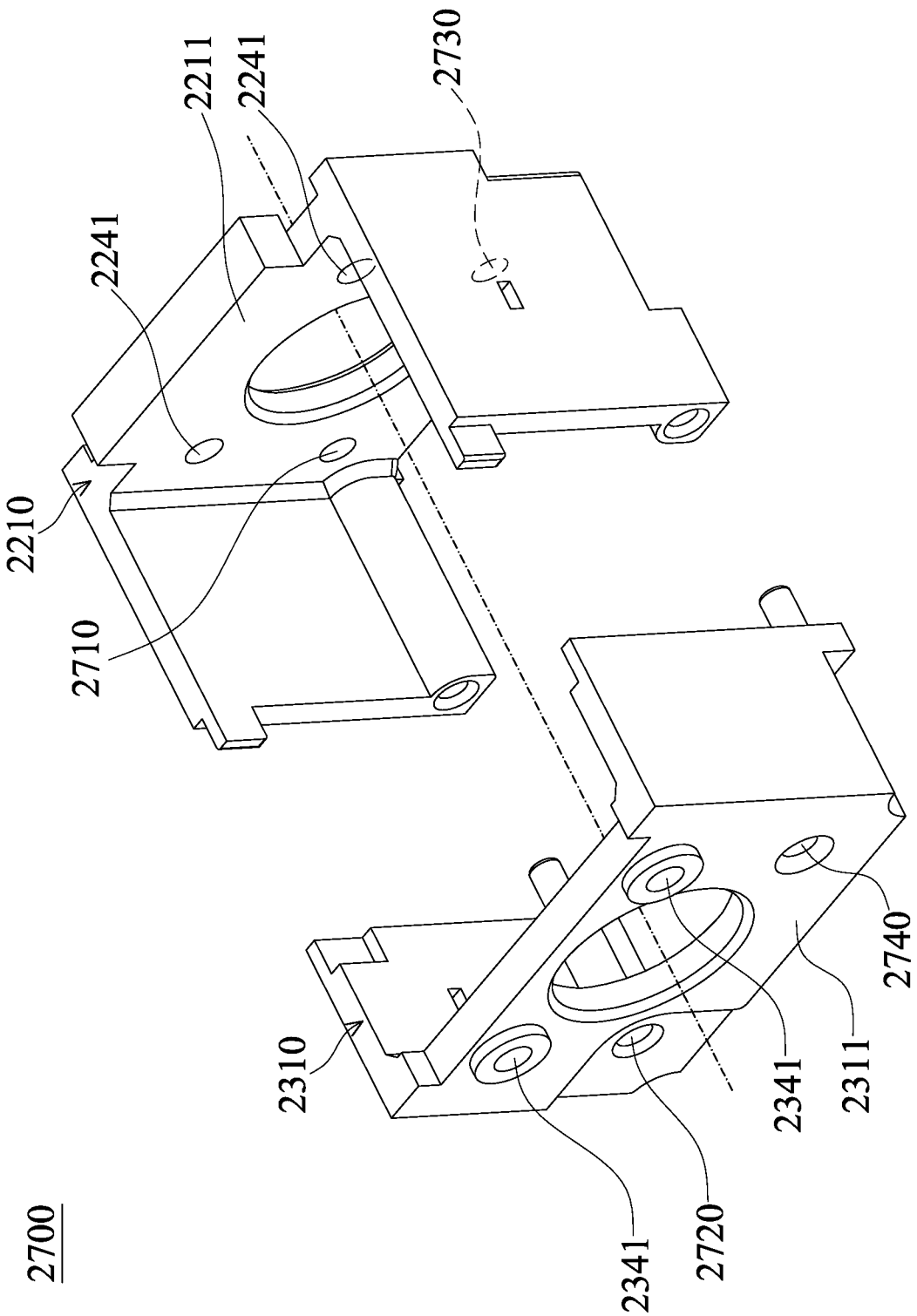
FIG. 31 is an exploded view of the immovable part.

Please refer to FIG. 29 to FIG. 31 to further understand the positions of the elements of the second optical module 2200 and the third optical module 2300. It should be understood that the second immovable part 2210 and the third immovable part 2310 may be defined as an immovable part 2700. FIG. 29 is a front view of the second optical module 2200 and the third optical module 2300. FIG. 30 is a perspective view of the immovable part 2700. FIG. 31 is an exploded view of the immovable part 2700 viewed from a different perspective than FIG. 30. As shown in FIG. 29, when viewed from the first direction 2010, the immovable part 2700 has a rectangular structure, including a first side 2701 that extends in the second direction 2020, a second side 2702 that extends in the third direction 2030 and is not parallel with the first side 2701, a third side 2703 that is not parallel with the second side 2702, a fourth side 2704 that is not parallel with the third side 2703. The first side 2701 and the third side 2703 are the long sides of the rectangle, and the second side 2702 and the fourth side 2704 are the short sides of the rectangle. Therefore, the first side 2701 is longer than the second side 2702, and the third side 2703 is longer than the fourth side 2704.

The immovable part 2700 includes a first opening 2710, a second opening 2720 corresponding to the first opening 2710, a third opening 2730, a fourth opening 2740 corresponding to the third opening 2730. Specifically, the first opening 2710 and the third opening 2730 are formed on the second immovable part wall 2211, and the second opening 2720 and the fourth opening 2740 are formed on the third immovable part wall 2311. The second immovable part wall 2211 may include a recessed structure (not shown) for receiving at least part of the third piezoelectric element 2331. The third immovable part wall 2311 may include a recessed structure (not shown) for receiving at least part of the second piezoelectric element 2231. The second piezoelectric element 2231 and the second movable part 2220 are located on the opposite sides of the third immovable part wall 2311, and the third piezoelectric element 2331 and the third movable part 2320 are located on the opposite sides of the second immovable part wall 2211.

When viewed from the first direction 2010, the second transmission element 2233 and the third transmission element 2333 are located on different corners of the immovable part 2700. The first opening 2710 and the second opening 2720 are used for receiving part of the second transmission element 2233, and the third opening 2730 and the fourth opening 2740 are used for receiving part of the third transmission element 2333. The third adhesive element 2273 is in direct contact with the first opening 2710, and the fourth adhesive element 2274 is in direct contact with the second opening 2720. The seventh adhesive element 2377 is in direct contact with the fourth opening 2740, and the eighth adhesive element 2378 is in direct contact with the third opening 2730.

The second transmission element 2233 and the third transmission element 2333 are arranged along the second direction 2020. One of the intermediate elements 2245 and the second transmission element 2233 are located on the fourth side 2704, and the other intermediate element 2245 and the third transmission element 2333 are located on the second side 2702.

In some embodiments, when viewed from the first direction 2010, the distance D1 between the centers of the intermediate elements 2245 is different from the distance D2 between the center of the intermediate element 2245 on the fourth side 2704 and the center of the second transmission element 2233. In some embodiments, when viewed from the first direction 2010, the distance D1 between the centers of the intermediate elements 2245 is longer than the distance D2 between the center of the intermediate element 2245 at the fourth side 2704 and the center of the second transmission element 2233. In some embodiments, when viewed from the first direction 2010, the distance D1 between the centers of the intermediate elements 2245 is at least 1.5 times the distance D2 between the center of the intermediate element 2245 at the fourth side 2704 and the center of the second transmission element 2233.

Also, in some embodiments, when viewed from the first direction 2010, the distance D1 between the centers of the intermediate elements 2245 is different from the distance D3 between the center of the second transmission element 2233 and the center of the second transmission element 2233. In some embodiments, when viewed from the first direction 2010, the distance D1 between the centers of the intermediate elements 2245 is less than the distance D3 between the center of the second transmission element 2233 and the center of the second transmission element 2233.

In some embodiments, when viewed from the first direction 2010, the distance D3 between the center of the second transmission element 2233 and the center of the second transmission element 2233 is different from the distance D2 between the center of the intermediate element 2245 at the fourth side 2704 and the center of the second transmission element 2233. In some embodiments, when viewed from the first direction 2010, the distance D3 between the center of the second transmission element 2233 and the center of the second transmission element 2233 is longer than the distance D2 between the center of the intermediate element 2245 at the fourth side 2704 and the center of the second transmission element 2233. In some embodiments, when viewed from the first direction 2010, the distance D3 between the center of the second transmission element 2233 and the center of the third transmission element 2333 is at least 1.5 times the distance D2 between the center of the intermediate element 2245 at the fourth side 2704 and the center of the second transmission element 2233.

Furthermore, when viewed from the first direction 2010, the second position sensing assembly 2250 and the third position sensing assembly 2350 are located on different sides of the immovable part 2700. Specifically, when viewed from the first direction 2010, the second position sensing assembly 2250 is at the second side 2702, and the third position sensing assembly 2350 is at the fourth side 2704.

The present disclosure provides an optical system. The optical system includes optical modules for performing different functions, including yawing, pitching, zooming, auto focus, optical image stabilization, and the like. In addition, the driving assembly of the present disclosure transmitting the driving force generated by the piezoelectric element by the transmission element, so that the movement of the movable part (including linear motion, non-linear motion, rotation, etc.) is more stable, and high stability and high accuracy may be achieved. Furthermore, the movement of the movable part in a certain dimension is ensured via the guiding assembly, and unwanted shaking, vibration, rotation, tilting, and the like of the movable part are prevented.

The fourth group of embodiments.

Figure 32:
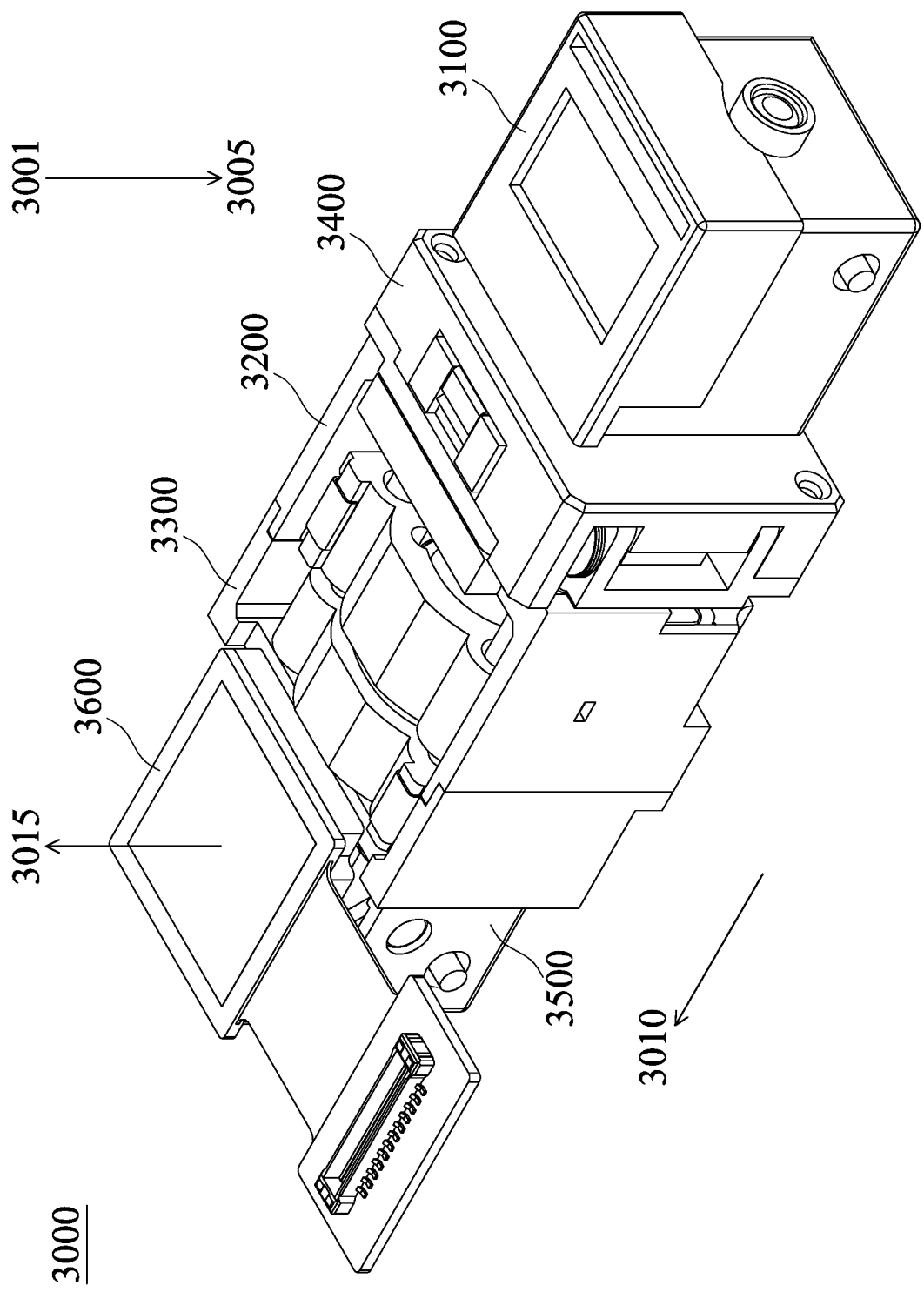
FIG. 32 is a perspective view of the optical system.
Figure 33:
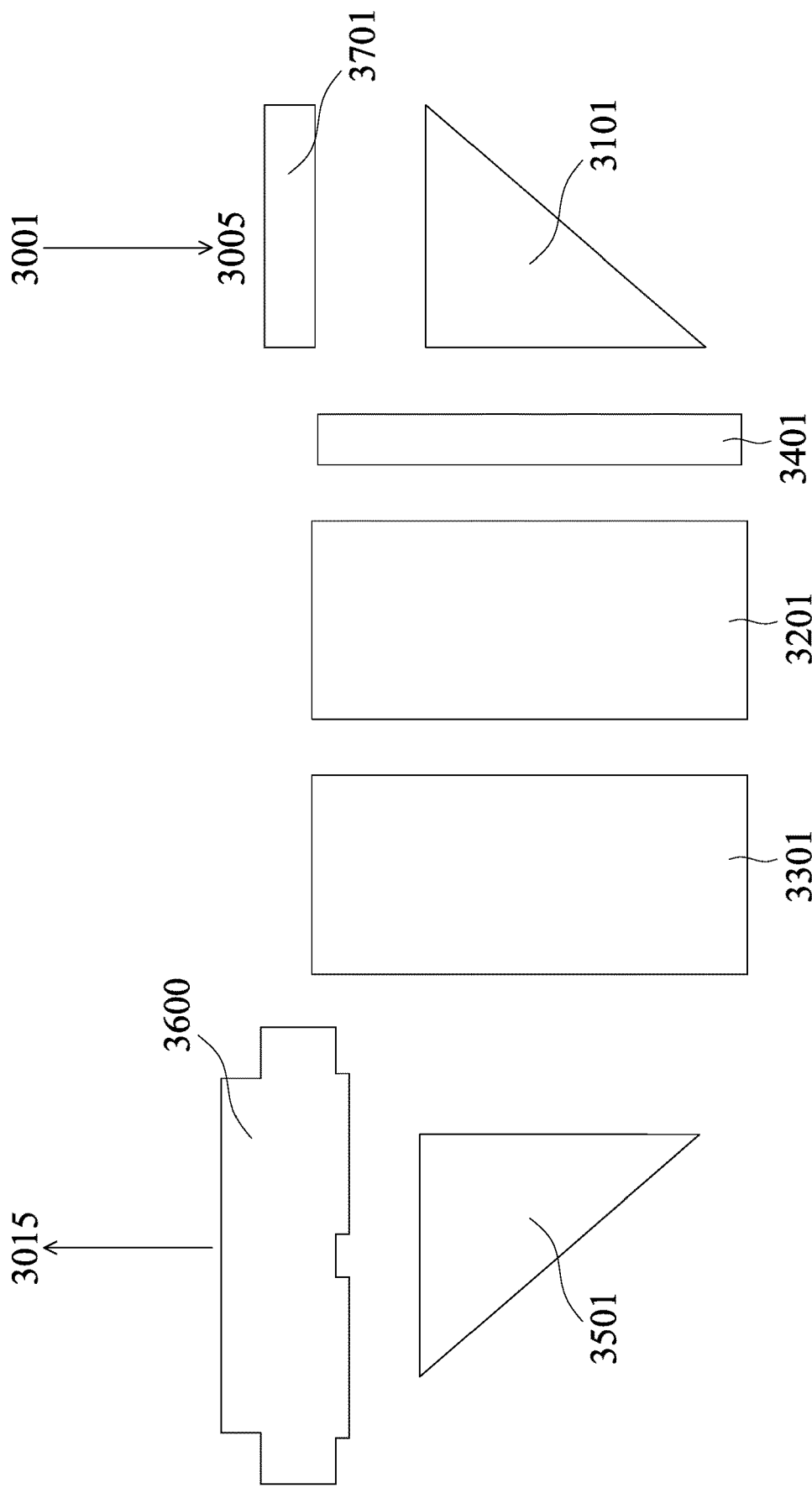
FIG. 33 is a schematic view of the optical elements of the optical system.

According to some embodiments, an optical system 3000 is provided. FIG. 32 is a perspective view of the optical system 3000. FIG. 33 is a schematic view of the optical elements of the optical system 3000. For simplification, the optical elements are only illustrated in FIG. 33. The optical system 3000 may be a periscope optical system. The optical system 3000 includes a first optical module 3100, a second optical module 3200, a third optical module 3300, a fourth optical module 3400, a fifth optical module 3500, and a sixth optical module 3600.

A light 3001 enters the first optical module 3100 from the top of the first optical module 3100 along an incident direction 3005. The direction of the light 3001 is adjusted by the first optical module 3100 from the incident direction 3005 to a first direction 3010. Then, the light 3001 passes through the fourth optical module 3400, the second optical module 3200, and the third optical module 3300 consecutively. The light 3001 leaves the fifth optical module 3500 from the top of the fifth optical module 3500 along an exit direction 3015. Furthermore, the light 3001 is converted into an image or video on the sixth optical module 3600.

The first optical module 3100 and the fifth optical module 3500 may include a first optical element 3101 and a fifth optical element 3501, respectively. The first optical element 3101 and a fifth optical element 3501 may be a prism, a reflection mirror, a refraction prism, a beam splitter, and the like. The optical path of the light 3001 may be changed via the first optical element 3101 and the fifth optical element 3501. The second optical module 3200, the third optical module 3300, and the fourth optical module 3400 may include a second optical element 3201, a third optical element 3301, and a fourth optical element 3401, respectively. The second optical module 3200, the third optical module 3300, and the fourth optical module 3400 may drive the second optical element 3201, the third optical element 3301, and the fourth optical element 3401 to move, respectively. The second optical element 3201, the third optical element 3301, and the fourth optical element 3401 may be one or more lenses, and may be made of glass, resin, and other materials. The first optical element 3101, the second optical element 3201, the third optical element 3301, the fourth optical element 3401, and the fifth optical element 3501 are arranged along the first direction 3010.

In some embodiments, an optical element 3701 with non-zero focal length (not shown, such as one or more lenses) may be placed over the first optical element 3101 to correspond the first optical element 3101. The optical element 3701 may be immovably connected to the first optical element 3101. Also, the optical element 3701 and the first optical element 3101 may be arranged along the incident direction 3005. The capturing functionality of the optical system 3000 may be improved by increasing the number of optical elements.

In some embodiments, the first optical module 3100 and the fifth optical module 3500 may be further rotated to achieve yawing and pitching, respectively. In some embodiments, the first optical module 3100 achieves pitching and the fifth optical module 3500 achieves yawing. In some embodiments, the second optical module 3200 and the third optical module 3300 may achieve zooming and auto focus (AF), respectively. In some embodiments, the second optical module 3200 may achieve auto focus, and the third optical module 3300 may achieve zooming. That is, the terms including yawing, pitching, zooming, auto focus are not limited hereto.

In some embodiments, the fourth optical module 3400 may achieve optical image stabilization (OIS). In some embodiments, the position of the fourth optical module 3400 may be changed. For example, the fourth optical module 3400 may be disposed between the third optical module 3300 and the fifth optical module 3500. In some embodiments, the fourth optical module 3400 may be integrated into the second optical module 3200 or the third optical module 3300, and the single second optical module 3200 or the single third optical module 3300 may simultaneously achieve auto focus and optical image stabilization. In some embodiments, the fourth optical module 3400 may be omitted.

In some embodiments, the sixth optical module 3600 may be an image sensor, such as a charge-coupled device (CCD). In some embodiments, the fifth optical module 3500 may be omitted, and the position of the sixth optical module 3600 may be changed, so that the light 3001 leaving the third optical module 3300 may be converted into an image on the sixth optical module 3600 directly.

Figure 34:
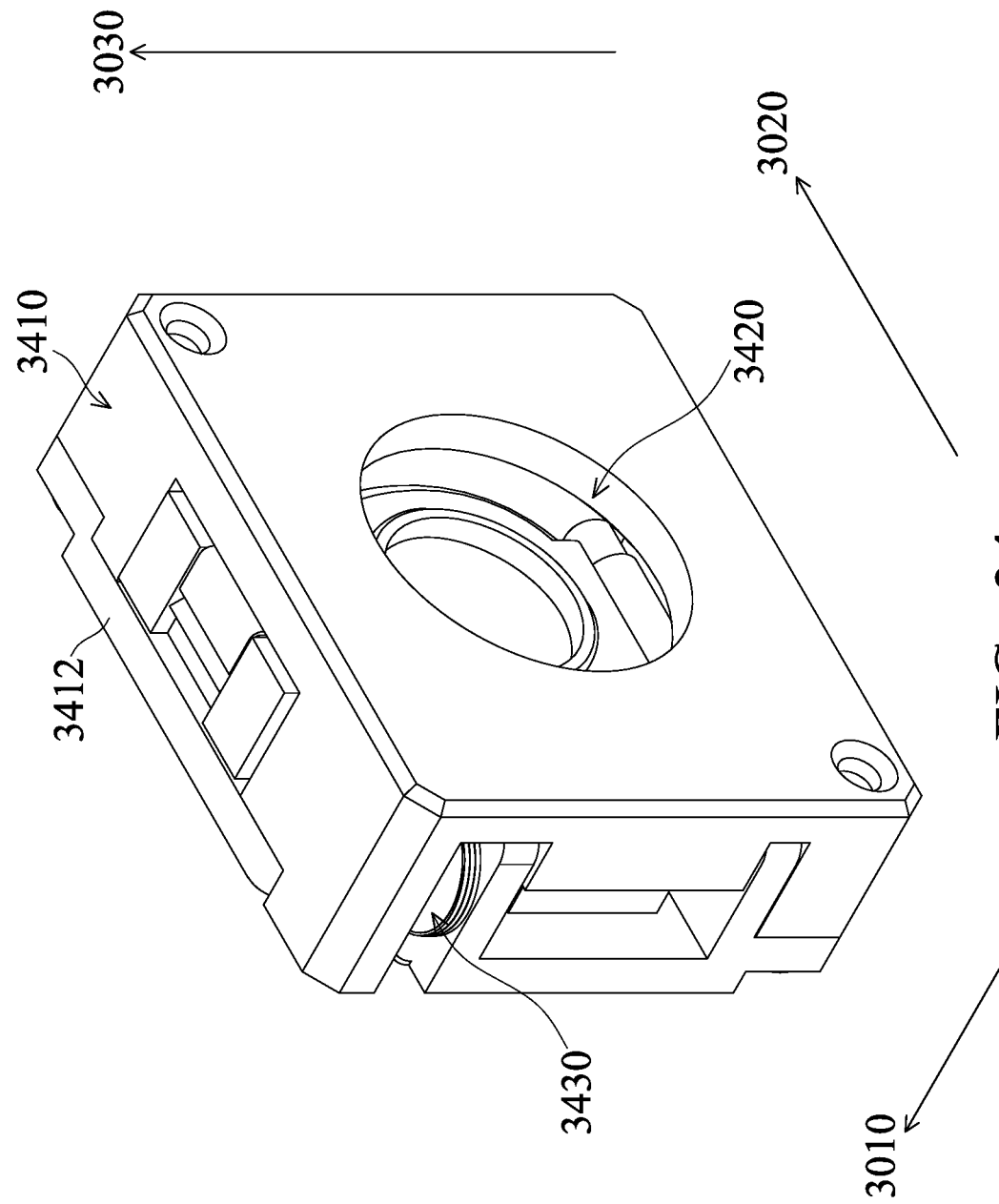
FIG. 34 is a perspective view of the fourth optical module.
Figure 35:
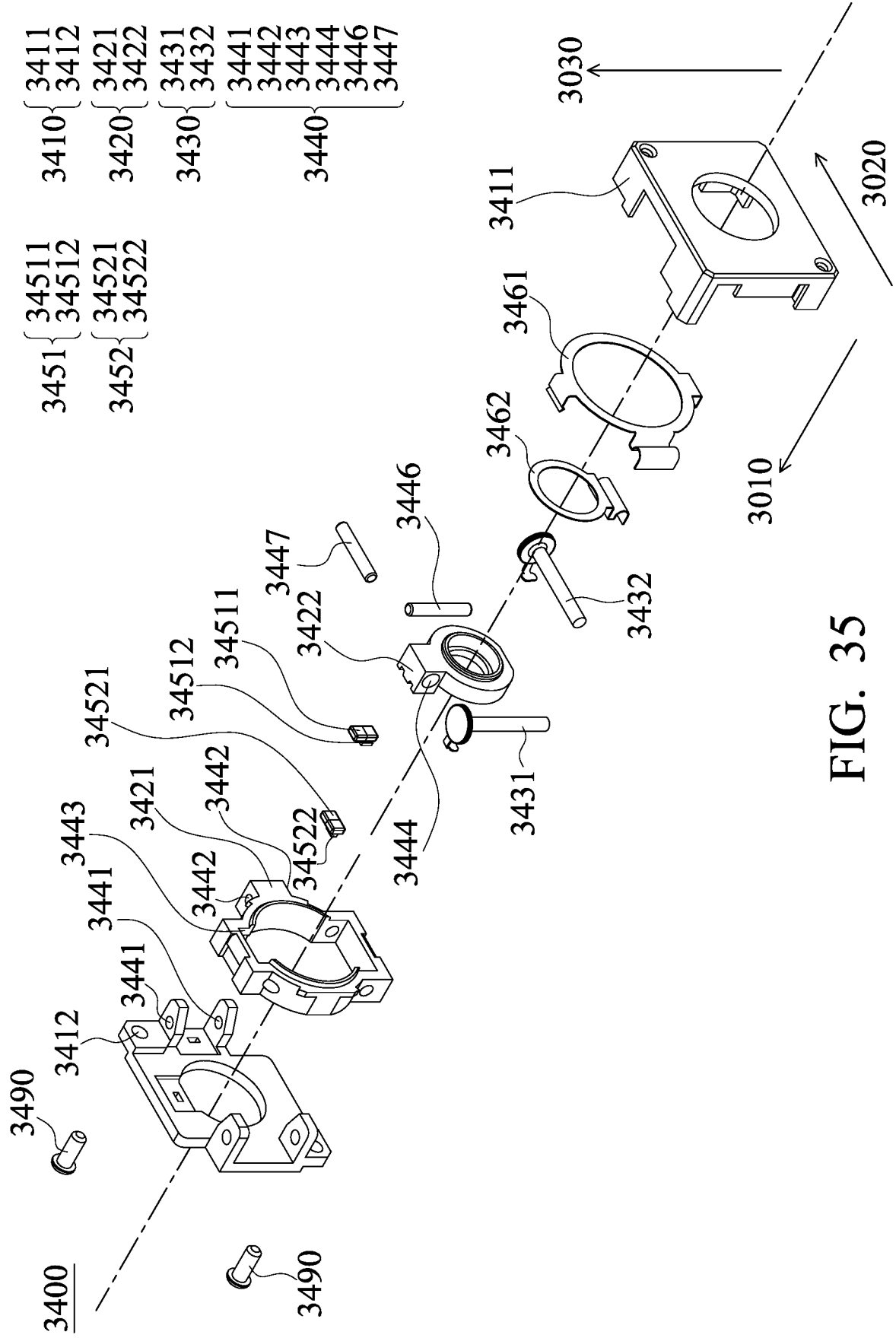
FIG. 35 is an exploded view of the fourth optical module.

In the following, the fourth optical module 3400 will be described in detail. FIG. 34 is a perspective view of the fourth optical module 3400. FIG. 35 is an exploded view of the fourth optical module 3400.

The fourth optical module 3400 includes a fourth immovable part 3410, a fourth movable part 3420, a fourth driving unit 3430, a fourth guiding assembly 3440, a first dimension position sensing assembly 3451, and a second dimension position sensing assembly 3452. The fourth movable part 3420 is connected to the fourth optical element 3401. The fourth movable part 3420 is movable relative to the fourth immovable part 3410. The first fourth driving unit 3430 is used for driving the fourth movable part 3420 to move relative to the fourth immovable part 3410 in a first dimension and/or a second dimension. The fourth guiding assembly 3440 is used for guiding the fourth movable part 3420 to move relative to the fourth immovable part 3410 in the first dimension and/or the second dimension. Specifically, the movement of the fourth movable part 3420 relative to the fourth immovable part 3410 may include linear motion, non-linear motion, and rotation. The first dimension position sensing assembly 3451 is used for sensing the movement of the fourth movable part 3420 relative to the fourth immovable part 3410 in the first dimension. The second dimension position sensing assembly 3452 is used for sensing the movement of the fourth movable part 3420 relative to the fourth immovable part 3410 in the second dimension.

The fourth immovable part 3410 may be a case for protecting the internal elements of the fourth optical module 3400. The fourth immovable part 3410 includes a case 3411 and a bottom 3412. The case 3411 and the bottom 3412 are arranged along the first direction 3010. In some embodiments, the fourth optical module 3400 further includes a fastening element 3490 to fasten the case 3411 to the bottom 3412. When viewed from the first direction 3010, the fourth immovable part 3410 is rectangular. Its long side extends in a second direction 3020 and its short side extends in a third direction 3030. In some embodiments, the first direction 3010, the second direction 3020, and the third direction 3030 are not parallel with each other. In some embodiments, the first direction 3010, the second direction 3020, the third direction 3030 are perpendicular to each other.

The fourth movable part 3420 includes a frame 3421 and a holder 3422. The holder 3422 is connected to the fourth optical element 3401. A threaded structure and its corresponding structure may be formed between the holder 3422 and the fourth optical element 3401, so that the fourth optical element 3401 may be immovable in the holder 3422. The holder 3422 is movable relative to the fourth immovable part 3410 and the frame 3421. In detail, the movement of the holder 3422 relative to the frame 3421 may also be said as moving relative to the bottom 3412.

The fourth driving unit 3430 includes a first dimension driving unit 3431 and a second dimension driving unit 3432. The first dimension driving unit 3431 is used for driving the fourth movable part 3420 to move relative to the fourth immovable part 3410 in the first dimension. The second dimension driving unit 3432 is used for driving the holder 3422 to move relative to the frame 3421 in the second dimension. The first dimension driving unit 3431 includes a first dimension piezoelectric element 34311, a first dimension elastic element 34312, and a first dimension transmission element 34313. The second dimension driving unit 3432 includes a second dimension piezoelectric element 34321, a second dimension elastic element 34322, and a second dimension transmission element 34323.

The fourth guiding assembly 3440 includes at least one fourth immovable part guiding structure 3441, at least one fourth movable part guiding structure 3442, at least one corresponding guiding structure 3443, at least one holder guiding structure 3444, a first intermediate element 3446, and a second intermediate element 3447. The first dimension position sensing assembly 3451 includes a first dimension reference element 34511 and a first dimension position sensing element 34512. The second dimension position sensing assembly 3452 includes a second dimension reference element 34521 and a second dimension position sensing element 34522.

Figure 36:
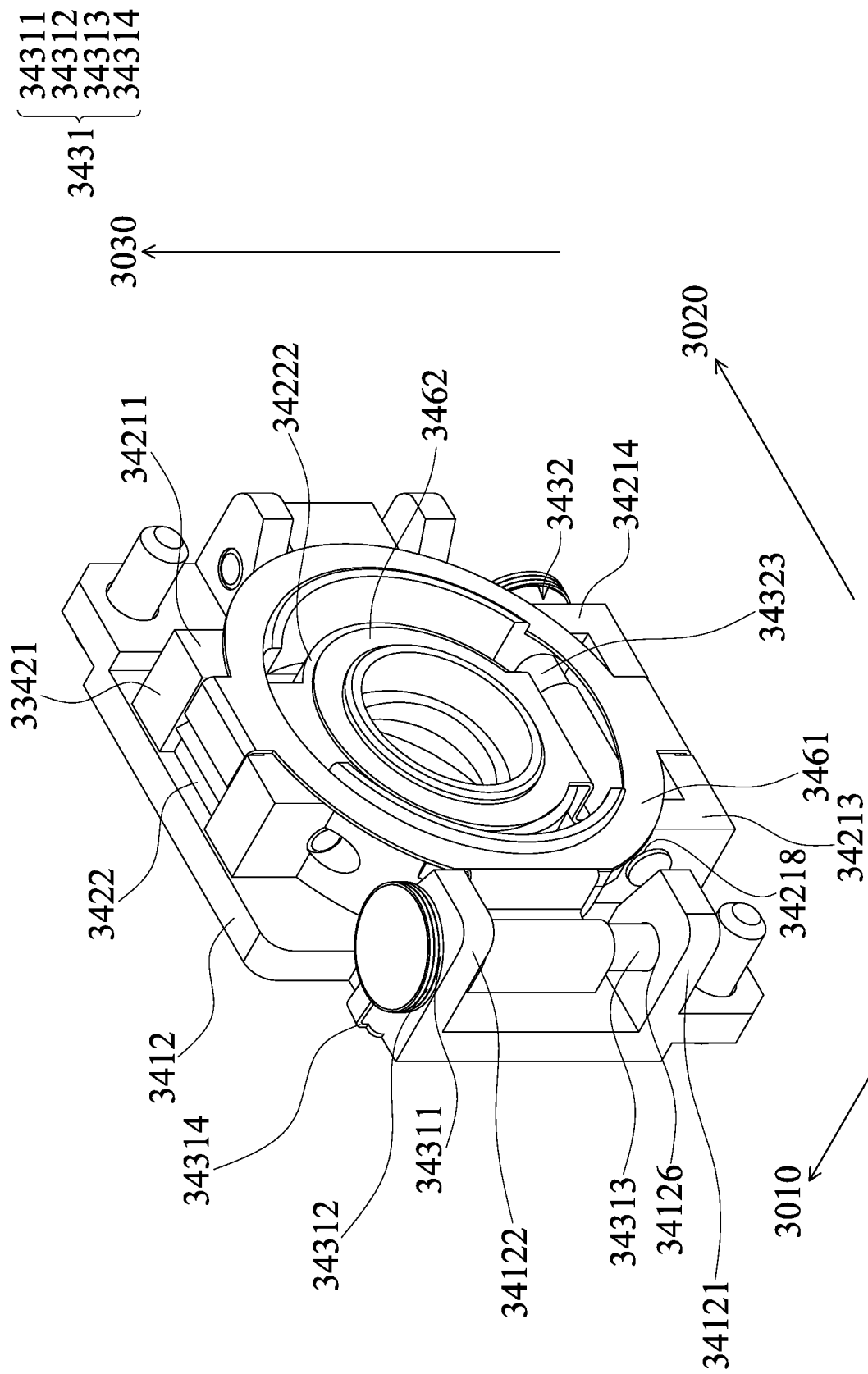
FIG. 36 is a perspective view of the fourth optical module with the case omitted.
Figure 37:
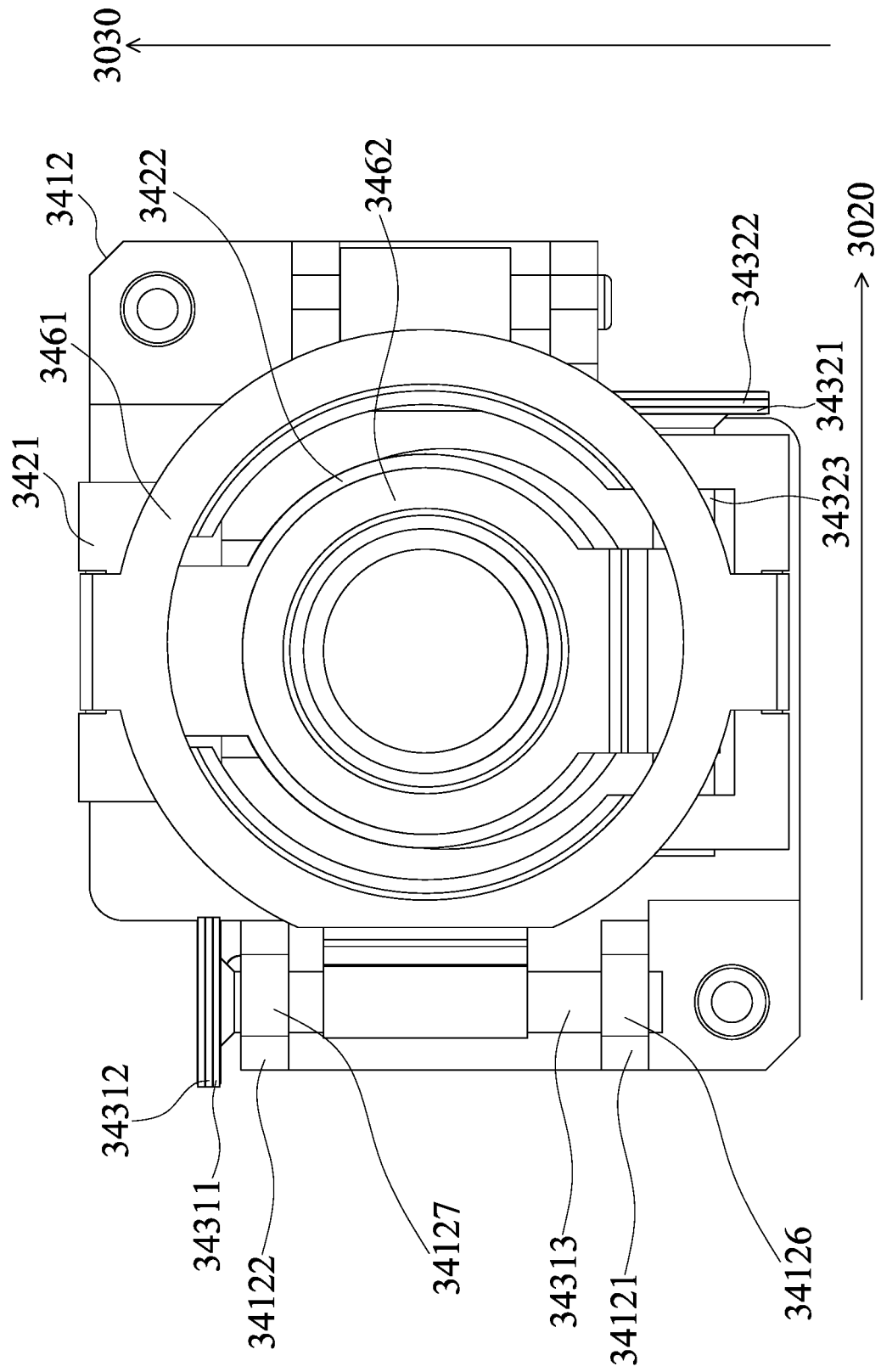
FIG. 37 is a front view of the fourth optical module with the case omitted.
Figure 38:
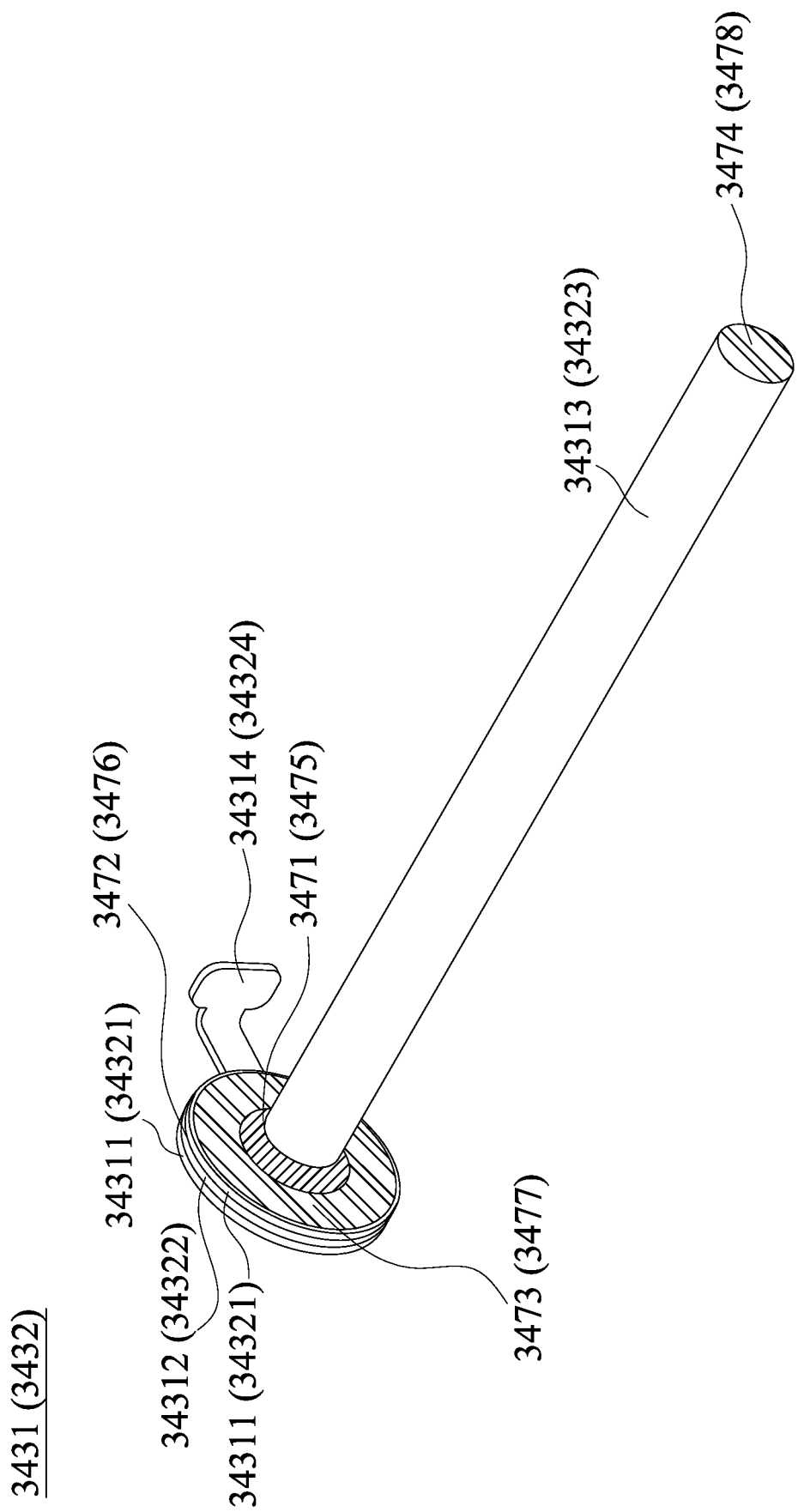
FIG. 38 is a perspective view of the first dimension driving unit (the second dimension driving unit).

Next, please refer to FIG. 36 and FIG. 37 to understand how the first dimension driving unit 3431 drives the fourth movable part 3420 (i.e., the frame 3421) to move relative to the fourth immovable part 3410 (i.e., the bottom 3412) in the first dimension, how the second dimension driving unit 3432 drives the fourth movable part 3420 (i.e., the holder 3422) to move relative to the frame 3421 (it may also be viewed as moving relative to the fourth immovable part 3410). FIG. 36 is a perspective view of the fourth optical module 3400 with the case 3411 omitted. FIG. 37 is a front view of the fourth optical module 3400 with the case 3411 omitted. FIG. 38 is a perspective view of the first dimension driving unit 3431 (the second dimension driving unit 3432).

In some embodiments, the first dimension is substantially parallel with the third direction 3030, and the second dimension is substantially parallel with the second direction 3020.

Therefore, the movement of fourth movable part 3420 relative to the fourth immovable part 3410 is substantially perpendicular to the first direction 3010.

The first dimension piezoelectric element 34311 may be made of a piezoelectric material such as metal or ceramic. The first dimension piezoelectric element 34311 may be deformable for generating a first dimension driving force. For example, the first dimension piezoelectric element 34311 may be bent. The first dimension elastic element 34312 is disposed on the first dimension piezoelectric element 34311. The first dimension elastic element 34312 has a plate structure. The first dimension transmission element 34313 is disposed on the bottom 3412. Also, when viewed from the second direction 3020, the first dimension transmission element 34313 at least partially overlaps the fourth optical element 3401. Therefore, the size of the fourth optical module 3400 in the first direction 3010 may be reduced, the space is effectively utilized, and miniaturization is achieved. The first dimension transmission element 34313 has an elongated structure such as a rod, a stick, and the like. The first dimension transmission element 34313 extends in the third direction 3030. The first dimension transmission element 34313 is used for transmitting the first dimension driving force to drive the frame 3421 to move relative to the bottom 3412 in the first dimension.

Similarly, the second dimension piezoelectric element 34321 may be made of a piezoelectric material such as metal or ceramic. The second dimension piezoelectric element 34321 may be deformable for generating a second dimension driving force. For example, the second dimension piezoelectric element 34321 may be bent. The second dimension elastic element 34322 is disposed on the second dimension piezoelectric element 34321. The second dimension elastic element 34322 has a plate structure. The second dimension transmission element 34323 is disposed on the frame 3421. Also, when viewed from the third direction 3030, the second dimension transmission element 34323 at least partially overlaps the fourth optical element 3401. Therefore, the size of the fourth optical module 3400 in the first direction 3010 may be reduced, the space is effectively utilized, and miniaturization is achieved. The second dimension transmission element 34323 has an elongated structure such as a rod, a stick, and the like. The second dimension transmission element 34323 extends in the second direction 3020. The second dimension transmission element 34323 is used for transmitting the second dimension driving force to drive the holder 3422 to move relative to the frame 3421 in the second dimension.

For the first dimension driving unit 3431 and the second dimension driving unit 3432, the driving force generated by the piezoelectric element is transmitted by the transmission element, which may make the movement of the fourth movable part 3420 (including the frame 3421 and the holder 3422) more stable, and thus may achieve high stability and high accuracy. In the art, the form of the aforementioned first dimension driving unit 3431 and the second dimension driving unit 3432 may be referred as TULA.

In some embodiments, the first dimension driving unit 3431 may further include a circuit assembly 34314, and the first dimension driving unit 3431 may be electrically connected to the fourth immovable part 3410 (e.g. the bottom 3412) via the circuit assembly 34314. Also, the circuit assembly 34314 may be made of an elastic material. For example, the circuit assembly 34314 may be a flex-rigid circuit board. In some embodiments, the second dimension driving unit 3432 may also include a circuit assembly 34324.

The fourth optical module 3400 may further include a first adhesive element 3471, a second adhesive element 3472, a third adhesive element 3473, and a fourth adhesive element 3474. In FIG. 38, the positions where the first adhesive element 3471, the second adhesive element 3472, the third adhesive element 3473, and the fourth adhesive element 3474 are applied are illustrated schematically. The first dimension transmission element 34313 is connected to the first dimension piezoelectric element 34311 via the first adhesive element 3471. The first dimension piezoelectric element 34311 is connected to the first dimension elastic element 34312 via the second adhesive element 3472. The first dimension piezoelectric element 34311 is connected to the fourth immovable part 3410 via the third adhesive element 3473. The first dimension transmission element 34313 is connected to the fourth immovable part 3410 via the fourth adhesive element 3474.

Depending on the different elements to be adhered to each other, the same or different adhesive elements may be selected. In the art, "Young's modulus" may be used to describe the elastic modulus of different adhesive elements. If the Young's modulus of the adhesive elements is different, it means that their elastic modulus is different, or it may be said that their hardness is different. In some embodiments, the Young's modulus of the first adhesive element 3471 is different from that of the second adhesive element 3472, the third adhesive element 3473, and the fourth adhesive element 3474. In some embodiments, the Young's modulus of the first adhesive element 3471 is higher than that of the second adhesive element 3472, the third adhesive element 3473, and the fourth adhesive element 3474. In some embodiments, the Young's modulus of the second adhesive element 3472 is different from the Young's modulus of the third adhesive element 3473. In some embodiments, the Young's modulus of the second adhesive element 3472 is less than the Young's modulus of the third adhesive element 3473. In some embodiments, the Young's modulus of the third adhesive element 3473 is the same as the Young's modulus of the fourth adhesive element 3474.

Since the first dimension transmission element 34313 has to transmit the first dimension driving force generated by the first dimension piezoelectric element 34311, the hardness of the first adhesive element 3471 that connects the first dimension transmission element 34313 and the first dimension piezoelectric element 34311 has to be relatively high (i.e., it has a relatively high Young's modulus). If the Young's modulus of the first adhesive element 3471 is not high enough, the first dimension driving force may be absorbed by the first adhesive element 3471, and thus the driving efficiency is reduced. Since the first dimension piezoelectric element 34311 has to deform, the hardness of the second adhesive element 3472 that connects the first dimension piezoelectric element 34311 to the first dimension elastic element 34312 has to be relatively low (i.e., it has a relatively low Young's modulus) to provide space for the first dimension piezoelectric element 34311 to deform. If the Young's modulus of the second adhesive element 3472 is not low enough, the first dimension piezoelectric element 34311 may not deform smoothly. Since the third adhesive element 3473 and the fourth adhesive element 3474 are mainly used for connecting the first dimension driving unit 3431 to the fourth immovable part 3410 and the fourth immovable part 3410, the third adhesive element 3473 may be substantially the same as the fourth adhesive element 3474.

Similarly, the fourth optical module 3400 may further include a fifth adhesive element 3475, a sixth adhesive element 3476, a seventh adhesive element 3477, and an eighth adhesive element 3478. In FIG. 38, the positions where the fifth adhesive element 3475, the sixth adhesive element 3476, the seventh adhesive element 3477, and the eighth adhesive element 3478 are applied are illustrated schematically. The second dimension transmission element 34323 is connected to the second dimension piezoelectric element 34321 via the fifth adhesive element 3475. The second dimension piezoelectric element 34321 is connected to the second dimension elastic element 34322 via the sixth adhesive element 3476. The second dimension piezoelectric element 34321 is connected to the fourth immovable part 3410 via the seventh adhesive element 3477. The second dimension transmission element 34323 is connected to the fourth immovable part 3410 via the eighth adhesive element 3478. The fifth adhesive element 3475 may be substantially the same as the first adhesive element 3471. The sixth adhesive element 3476 may be substantially the same as the second adhesive element 3472. The seventh adhesive element 3477 may be substantially the same as the third adhesive element 3473. The eighth adhesive element 3478 may be substantially the same as the fourth adhesive element 3474.

Therefore, the relationship of the Young's modulus of the fifth adhesive element 3475, the sixth adhesive element 3476, the seventh adhesive element 3477, and the eighth adhesive element 3478 may be similar to that of the first adhesive element 3471, the second adhesive element 3472, the third adhesive element 3473, and the fourth adhesive element 3474. Particularly, in some embodiments, the Young's modulus of the fifth adhesive element 3475 is different from that of the sixth adhesive element 3476, the seventh adhesive element 3477, and the eighth adhesive element 3478. In some embodiments, the Young's modulus of the fifth adhesive element 3475 is higher than that of the sixth adhesive element 3476, the seventh adhesive element 3477, and the eighth adhesive element 3478. In some embodiments, the Young's modulus of the sixth adhesive element 3476 is different from the Young's modulus of the seventh adhesive element 3477. In some embodiments, the Young's modulus of the sixth adhesive element 3476 is lower than the Young's modulus of the seventh adhesive element 3477. In some embodiments, the Young's modulus of the seventh adhesive element 3477 is the same as the Young's modulus of the eighth adhesive element 3478.

In some embodiments, the fourth immovable part 3410 (e.g. the bottom 3412) includes a first retaining wall 34121 and a second retaining wall 34122. A first opening 34126 is formed on the first retaining wall 34121, and a second opening 34127 is formed on the second retaining wall 34122. The first opening 34126 and the second opening 34127 are used for accommodating at least part of the first dimension transmission element 34313. The third adhesive element 3473 is in direct contact with the second retaining wall 34122, and the fourth adhesive element 3474 is in direct contact with the first opening 34126. The frame 3421 includes a third retaining wall 34213 and a fourth retaining wall 34214. A third opening 34218 is formed on the third retaining wall 34213, and a fourth opening 34219 is formed on the fourth retaining wall 34214. The third opening 34218 and the fourth opening 34219 are used for accommodating at least part of the second dimension transmission element 34323. The seventh adhesive element 3477 is in direct contact with the fourth retaining wall 34214, and the eighth adhesive element 3478 is in direct contact with the third opening 34218.

The first retaining wall 34121 is parallel with the second retaining wall 34122. The first retaining wall 34121 is not parallel with the third retaining wall 34213. In the first direction 3010, the maximum size of the first retaining wall 34121 is substantially the same as the maximum size of the second retaining wall 34122. In the first direction 3010, the maximum size of the third retaining wall 34213 is substantially the same as the maximum size of the fourth retaining wall 34214. However, in the first direction 3010, the maximum size of the first retaining wall 34121 is larger than the maximum size of the third retaining wall 34213.

In some embodiments, the fourth optical module 3400 further includes a first dimension clamping element 3461 and a second dimension clamping element 3462. The first dimension clamping element 3461 and the second dimension clamping element 3462 may be made of an elastic material such as metal. The first dimension clamping element 3461 and the second dimension clamping element 3462 may include a plate structure.

The first dimension clamping element 3461 is disposed on the frame 3421. The first dimension clamping element 3461 is in direct contact with the first dimension transmission element 34313, generating a first dimension pressure to make the frame 3421 contact the first dimension transmission element 34313. The second dimension clamping element 3462 is disposed on the holder 3422. The second dimension clamping element 3462 is in direct contact with the second dimension transmission element 34323, generating a second dimension pressure to make the holder 3422 contact the second dimension transmission element 34323. Therefore, the transmission efficiency of the first dimension driving force and the second dimension driving force is enhanced by the first dimension clamping element 3461 and the second dimension clamping element 3462.

When viewed from the first direction 3010 or the second direction 3020 or the third direction 3030, the first dimension clamping element 3461 at least partially overlaps the second dimension clamping element 3462. Additionally, the size of the first dimension clamping element 3461 is larger than the size of the second dimension clamping element 3462. When viewed from the first direction 3010, the first dimension clamping element 3461 at least partially overlaps the second dimension transmission element 34323. When viewed from the first direction 3010, the second dimension clamping element 3462 at least partially overlaps the second dimension transmission element 34323.

The frame 3421 has a first placement surface 34211 facing the first dimension clamping element 3461, and the first dimension clamping element 3461 is disposed on the first placement surface 34211. The holder 3422 has a second placement surface 34222 facing the second dimension clamping element 3462, and the second dimension clamping element 3462 is disposed on the second placement surface 34222. The first placement surface 34211 and the second placement surface 34222 are parallel with each other, but the first placement surface 34211 and the second placement surface 34222 are not on the same plane. Specifically, the second dimension clamping element 3462 is closer to the bottom 3412 than the first dimension clamping element 3461. In other words, the second placement surface 34222 is closer to the bottom 3412 than the first placement surface 34211.

When the fourth driving unit 3430 drives the fourth movable part 3420 to move relative to the fourth immovable part 3410, the fourth guiding assembly 3440 may guide the fourth movable part 3420 to move relative to the fourth immovable part 3410, including guiding the frame 3421 to move relative to the bottom 3412 in the first dimension and guiding the holder 3422 to move relative to the frame 3421 in the second dimension. Also, when the fourth driving unit 3430 drives the fourth movable part 3420 to move relative to the fourth immovable part 3410, the first dimension position sensing assembly 3451 and the second dimension position sensing assembly 3452 may sense the movement of the fourth movable part 3420 relative to the fourth immovable part 3410, including sensing the movement of the frame 3421 relative to the bottom 3412 in the first dimension and sensing the movement of the holder 3422 relative to the frame 3421 in the second dimension.

Figure 39:
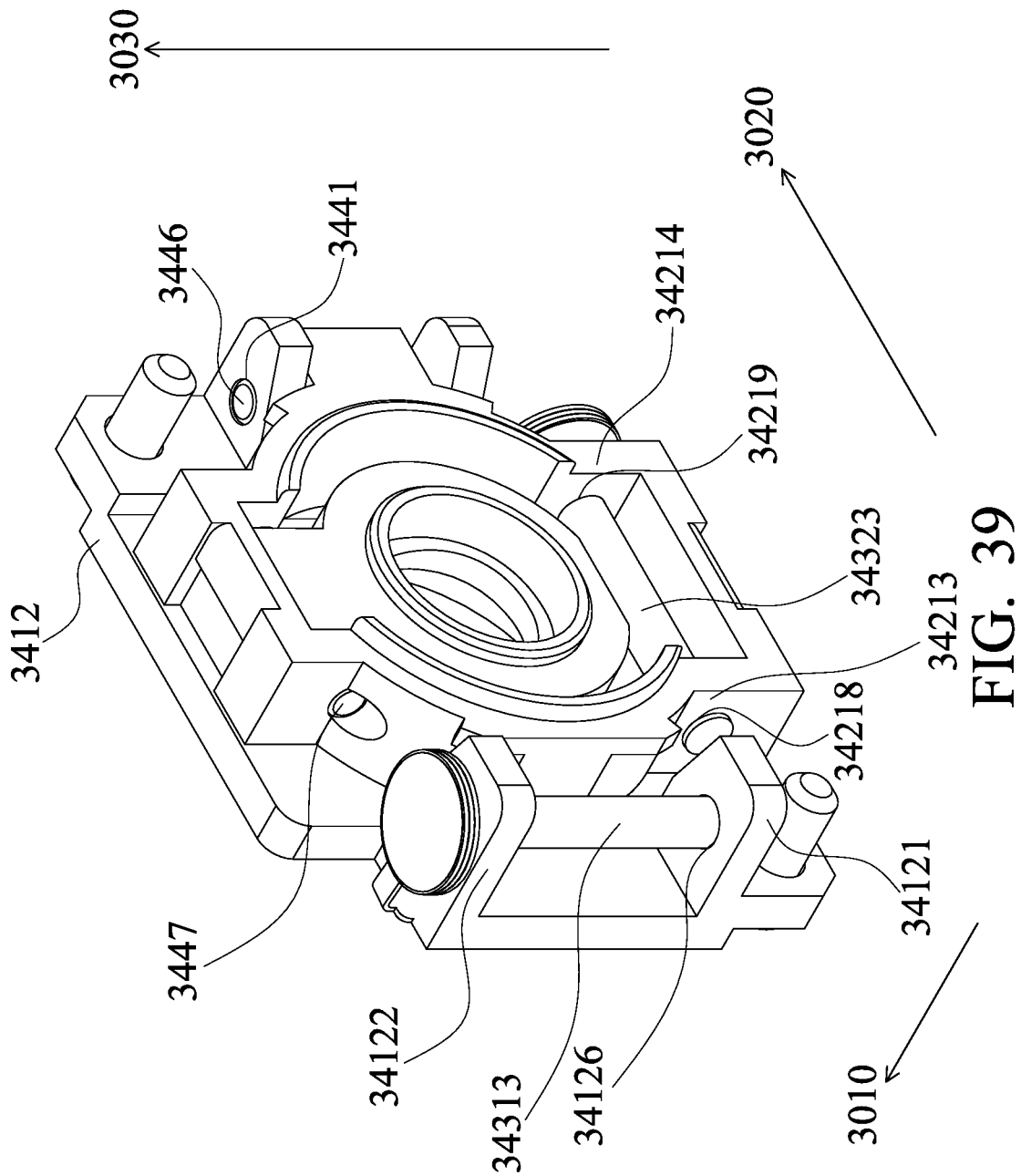
FIG. 39 is a perspective view of the fourth optical module with the first dimension clamping element and the second dimension clamping element further omitted.
Figure 40:
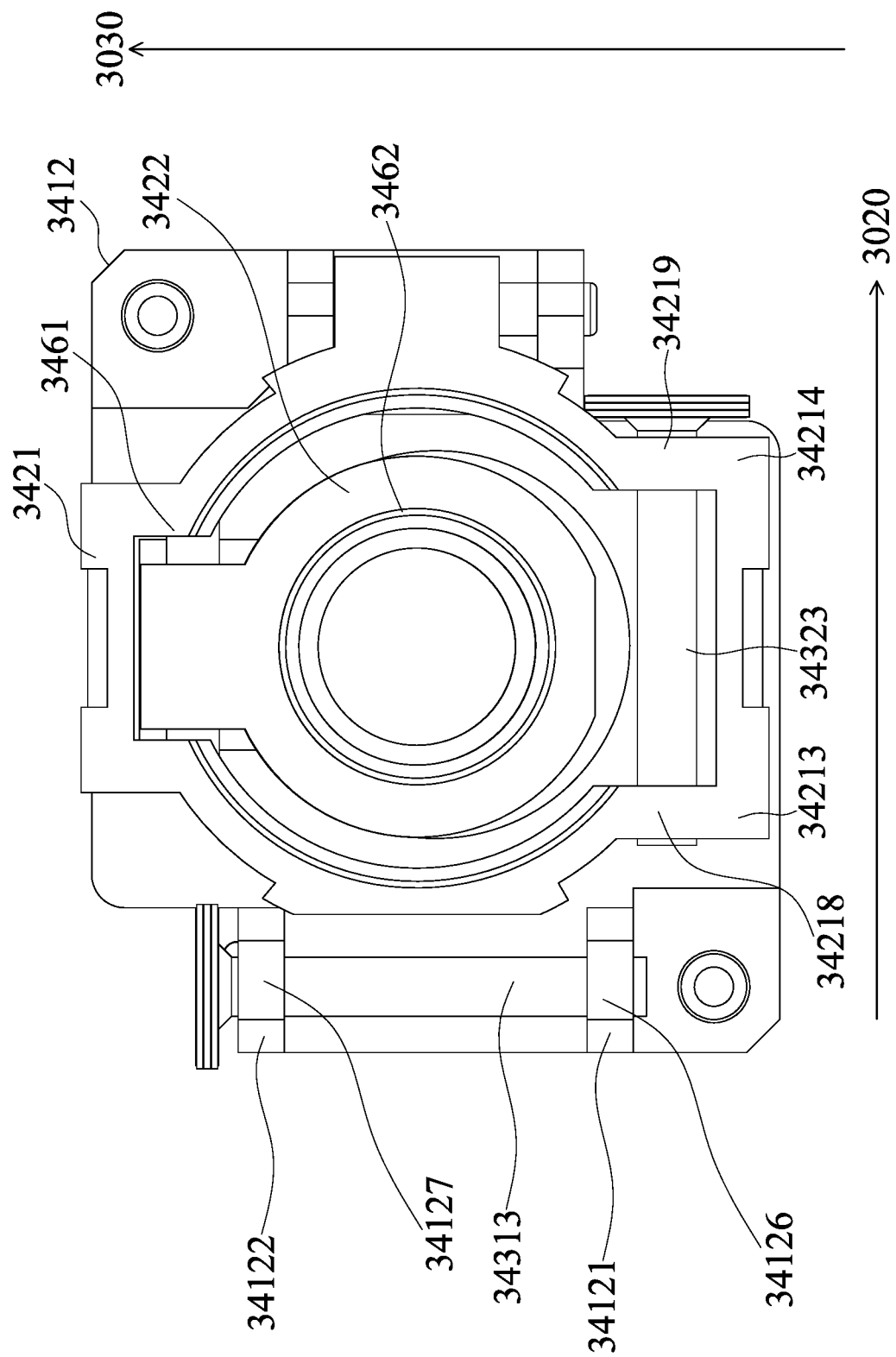
FIG. 40 is a front view of the fourth optical module with the first dimension clamping element and the second dimension clamping element further omitted.
Figure 41:
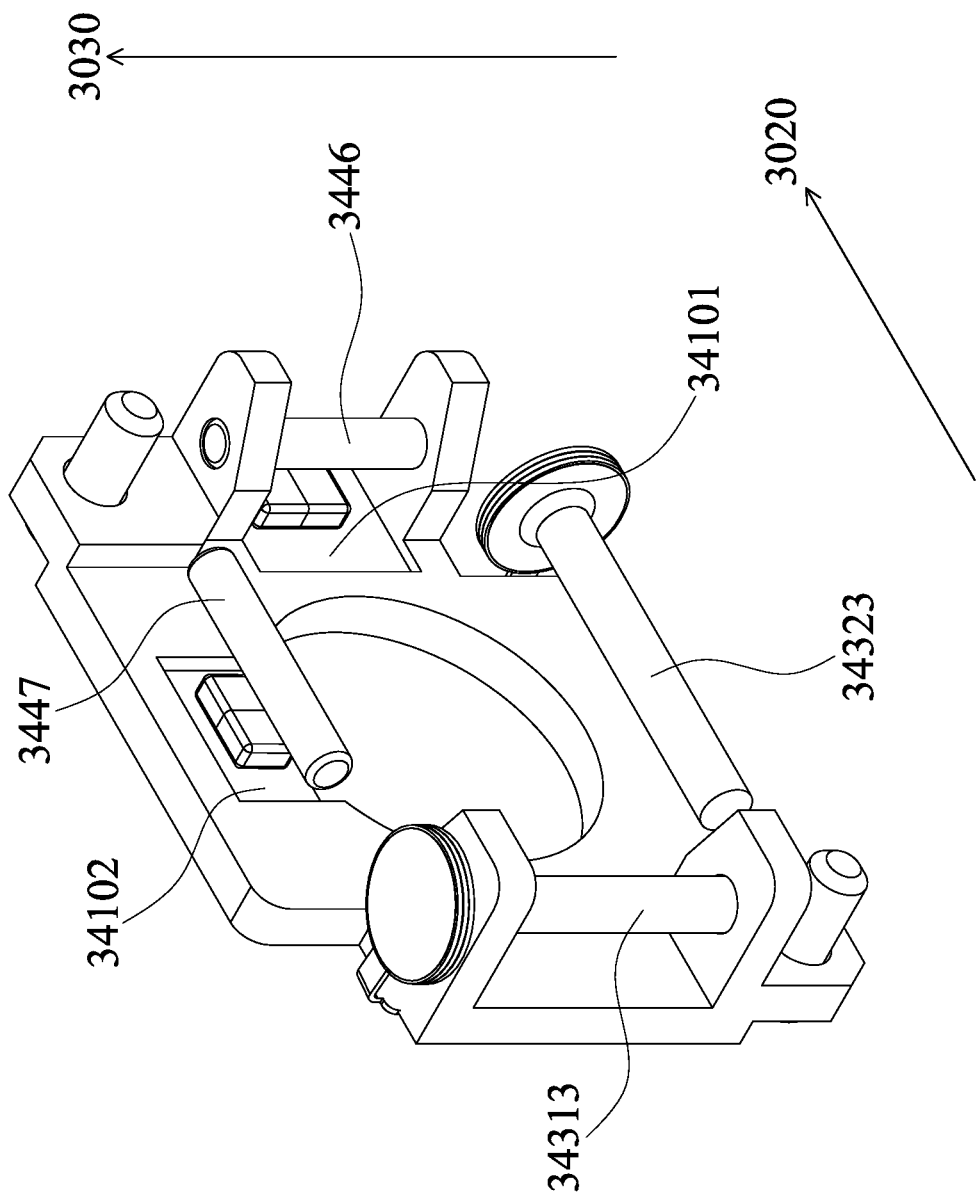
FIG. 41 is a perspective view of the fourth optical module with the frame and the holder further omitted.
Figure 42:
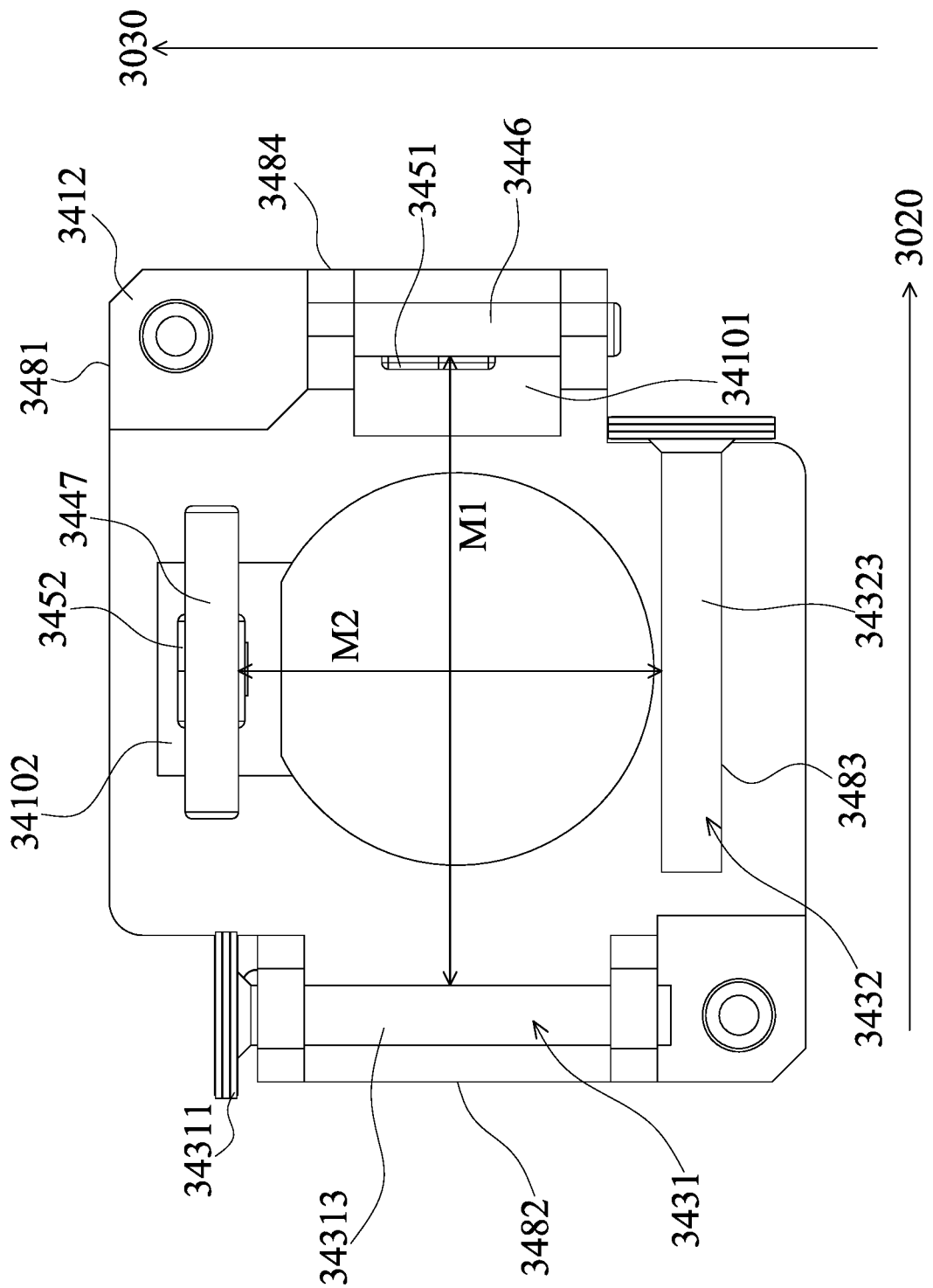
FIG. 42 is a front view of the fourth optical module with the frame and the holder further omitted.

Next, please refer to FIG. 39 to FIG. 42 to understand the fourth guiding assembly 3440, the first dimension position sensing assembly 3451, and the second dimension position sensing assembly 3452. FIG. 39 is a perspective view of the fourth optical module 3400 with the first dimension clamping element 3461 and the second dimension clamping element 3462 further omitted. FIG. 40 is a front view of the fourth optical module 3400 with the first dimension clamping element 3461 and the second dimension clamping element 3462 further omitted. FIG. 41 is a perspective view of the fourth optical module 3400 with the frame 3421 and the holder 3422 further omitted. FIG. 42 is a front view of the fourth optical module 3400 with the frame 3421 and the holder 3422 further omitted.

The first intermediate element 3446 and the second intermediate element 3447 may be any element that may guide the fourth movable part 3420 to move relative to the fourth immovable part 3410. For example, the first intermediate element 3446 and the second intermediate element 3447 may include a guiding rod, a ball, or a slidable fulcrum. In this embodiment, the first intermediate element 3446 and the second intermediate element 3447 are guiding rods. The extending direction of the first intermediate element 3446 is the same as the extending direction of the first dimension transmission element 34313. That is, the first intermediate element 3446 extends in the third direction 3030. The extending direction of the second intermediate element 3447 is the same as the extending direction of the second dimension transmission element 34323. That is, the second intermediate element 3447 extends in the second direction 3020.

The fourth immovable part guiding structure 3441 may be a hole formed on the fourth immovable part 3410, such as a hole formed on the bottom 3412. In other words, the fourth immovable part guiding structure 3441 is fixedly disposed on the fourth immovable part 3410. The fourth immovable part guiding structure 3441 corresponds to the first intermediate element 3446 and is fixedly connected to the first intermediate element 3446. The method for fixedly connecting the first intermediate element 3446 to the fourth immovable part guiding structure 3441 may include welding or gluing. The fourth immovable part guiding structure 3441 may include a metal material, which is advantageous for being welded or preventing generating unwanted particles during the contact with the first intermediate element 3446. The fourth movable part guiding structure 3442 may be a hole formed on the fourth movable part 3420, such as a hole formed on the frame 3421. In other words, the fourth movable part guiding structure 3442 is fixedly disposed on the fourth movable part 3420. The fourth movable part guiding structure 3442 corresponds to the first intermediate element 3446 and is movable relative to the first intermediate element 3446. The fourth movable part guiding structure 3442 may include a metal material, for example, formed by plating or embedding a metal material. In short, the fourth immovable part guiding structure 3441, the fourth movable part guiding structure 3442, and the first intermediate element 3446 may ensure the movement of the frame 3421 relative to the bottom 3412 in the first dimension.

The corresponding guiding structure 3443 corresponds to the holder guiding structure 3444. The corresponding guiding structure 3443 may be a hole formed on the fourth immovable part 3410 or the fourth movable part 3420, such as a hole formed on the bottom 3412 or the frame 3421. In other words, the corresponding guiding structure 3443 is fixedly disposed on the fourth immovable part 3410 or the fourth movable part 3420. The corresponding guiding structure 3443 corresponds to the second intermediate element 3447 and is fixedly connected to the second intermediate element 3447. The method for fixedly connecting the second intermediate element 3447 to the corresponding guiding structure 3443 may include welding or gluing. The corresponding guiding structure 3443 may include a metal material, which is advantageous for being welded or preventing generating unwanted particles during the contact with the second intermediate element 3447. The holder guiding structure 3444 may be a hole formed on the holder 3422. In other words, the holder guiding structure 3444 is fixedly disposed on the holder 3422. The holder guiding structure 3444 corresponds to the second intermediate element 3447 and is movable relative to the second intermediate element 3447. The holder guiding structure 3444 may include a metal material, for example, formed by plating or embedding a metal material. In short, the corresponding guiding structure 3443, the holder guiding structure 3444, and the second intermediate element 3447 may ensure the movement of the holder 3422 relative to the frame 3421 in the second dimension.

Therefore, the movement of the fourth movable part 3420 is ensured by the fourth guiding assembly 3440. The range of movement of the fourth movable part 3420 in the first dimension and/or the range of movement of the fourth movable part 3420 in the second dimension are ensured, and unwanted shaking, vibration, rotation, tilting, and the like of the fourth movable part 3420 are prevented.

The first dimension reference element 34511 and the second dimension reference element 34521 include a magnetic material. For example, the first dimension reference element 34511 and the second dimension reference element 34521 may be a magnet, a permanent magnet, and the like. The first dimension position sensing element 34512 and the third position sensing element 2253 may be a sensor, including a Hall sensor, a magnetoresistance (MR) effect sensor, a giant magnetoresistive (GMR) effect sensor, a tunneling magnetoresistive (TMR) effect sensor, and the like.

The position of the first dimension reference element 34511 corresponds to the position of the first dimension position sensing element 34512, and the position of the first dimension reference element 34511 and the position of the first dimension position sensing element 34512 may be exchanged. When the fourth movable part 3420 (e.g. the frame 3421) moves relative to the fourth immovable part 3410 (e.g. the bottom 3412), the first dimension position sensing element 34512 may sense the change of the magnetic lines of force of the first dimension reference element 34511, so as to know the position of the fourth movable part 3420 (e.g. the frame 3421). Similarly, the position of the second dimension reference element 34521 corresponds to the position of the second dimension position sensing element 34522, and the position of the second dimension reference element 34521 and the second dimension position sensing element 34522 may be exchanged. When the fourth movable part 3420 (e.g. the holder 3422) moves relative to the fourth immovable part 3410 (e.g. the bottom 3412), the second dimension position sensing element 34522 may sense the change of the magnetic lines of force of the second dimension reference element 34521, so as to know the position of the fourth movable part 3420 (e.g. the holder 3422).

As shown in FIG. 41 and FIG. 42, in some embodiments, the fourth immovable part 3410 (e.g. the bottom 3412) may include a first receiving structure 34101 and a second receiving structure 34102. The first receiving structure 34101 and the second receiving structure 34102 may be a groove and the like. The first receiving structure 34101 is used for receiving at least part of the first dimension reference element 34511 or at least part of the first dimension position sensing element 34512. The second receiving structure 34102 is used for receiving at least part of the second dimension reference element 34521 or at least part of the second dimension position sensing element 34522.

In some embodiments, the first receiving structure 34101 may completely accommodate the first dimension reference element 34511 or the first dimension position sensing element 34512, so that when viewed from a direction that is perpendicular to the first direction 3010 (e.g. the second direction 3020 or the third direction 3030), the first dimension reference element 34511 or the first dimension position sensing element 34512 is exposed from the first receiving structure 34101. In some embodiments, the second receiving structure 34102 may completely accommodate the second dimension reference element 34521 or the second dimension position sensing element 34522, so that when viewed from a direction that is perpendicular to the first direction 3010 (e.g. the second direction 3020 or the third direction 3030), the second dimension reference element 34521 or the second dimension position sensing element 34522 is not exposed from the second receiving structure 34102.

In some embodiments, when viewed from a direction that is perpendicular to the first direction 3010 (e.g. the second direction 3020 or the third direction 3030), at least part of the first dimension reference element 34511 or at least part of the first dimension position sensing element 34512 is exposed from the first receiving structure 34101. In some embodiments, when viewed from a direction that is perpendicular to the first direction 3010 (e.g. the second direction 3020 or the third direction 3030), at least part of the second dimension reference element 34521 or at least part of the second dimension position sensing element 34522 is exposed from the second receiving structure 34102.

In some embodiments, the first receiving structure 34101 is not parallel with the first direction 3010. In some embodiments, the first receiving structure 34101 is perpendicular to the first direction 3010. In some embodiments, the second receiving structure 34102 is not parallel with the first direction 3010. In some embodiments, the second receiving structure 34102 is perpendicular to the first direction 3010. In some embodiments, in the first direction 3010, the depth of the first receiving structure 34101 is different from the depth of the second receiving structure 34102. In some embodiments, in the first direction 3010, the depth of the first receiving structure 34101 is less than the depth of the second receiving structure 34102.

Next, please refer to FIG. 42. When viewed from the first direction 3010, the fourth immovable part 3410 is polygonal, such as rectangular, including a first side 3481 that extends in the second direction 3020, a second side 3482 that extends in the third direction 3030 and is not parallel with the first side 3481, a third side 3483 that is not parallel with the second side 3482, a fourth side 3484 that is not parallel with the third side 3483. The first side 3481 and the third side 3483 are the long sides of the rectangle, and the second side 3482 and the fourth side 3484 are the short sides of the rectangle. Therefore, the first side 3481 is longer than the second side 3482, and the third side 3483 is longer than the fourth side 3484.

As shown in FIG. 42, the first dimension driving unit 3431 is located on the second side 3482, and the second dimension driving unit 3432 is located on the third side 3483. The first intermediate element 3446 is located on the fourth side 3484, and the second intermediate element 3447 is located on the first side 3481. The different elements are placed on different sides of the fourth optical module 3400, so that space may be effectively utilized and miniaturization may be achieved.

As shown in FIG. 42, when viewed from the first direction 3010, the first dimension piezoelectric element 34311 and the second dimension piezoelectric element 34321 are located at opposite corners of the fourth immovable part 3410, respectively. Also, since the fourth immovable part 3410 is substantially rectangular when viewed from the first direction 3010, as shown in FIG. 42, the minimum distance M1 between the first dimension transmission element 34313 and the first intermediate element 3446 is greater than the minimum distance M2 between the second dimension transmission element 34323 and the second intermediate element 3447. That is, the minimum distance M1 between the first dimension transmission element 34313 and the first intermediate element 3446 is different from the minimum distance M2 between the second dimension transmission element 34323 and the second intermediate element 3447.

It should be noted that the center of the first dimension piezoelectric element 34311 and the center of the second dimension piezoelectric element 34321 are located on the same plane. That is, the distance between the first dimension piezoelectric element 34311 and the bottom 3412 is substantially the same as the distance between the second dimension piezoelectric element 34321 and the bottom 3412. Moreover, the center of the first intermediate element 3446 and the center of the second intermediate element 3447 are located on the same plane. In other words, the distance between the first intermediate element 3446 and the bottom 3412 is substantially the same as the distance between the second intermediate element 3447 and the bottom 3412. In some embodiments, the center of the first dimension piezoelectric element 34311 and the center of the first intermediate element 3446 are located on the same plane. In some embodiments, the center of the first dimension piezoelectric element 34311 and the center of the first intermediate element 3446 are not on the same plane.

In addition, as shown in FIG. 42, when viewed from the first direction 3010, the first intermediate element 3446 at least partially overlaps the first dimension position sensing assembly 3451, and the second intermediate element 3447 at least partially overlaps the second dimension position sensing assembly 3452. Therefore, the size of the fourth optical module 3400 in the second direction 3020 and the third direction 3030 is reduced, so that space may be effectively utilized and miniaturization may be achieved.

The present disclosure provides an optical system. The optical system includes optical modules for performing different functions, including yawing, pitching, zooming, auto focus, optical image stabilization, and the like. In addition, the driving assembly of the present disclosure transmitting the driving force generated by the piezoelectric element by the transmission element, so that the movement of the movable part (including linear motion, non-linear motion, rotation, etc.) is more stable, and high stability and high accuracy may be achieved. Furthermore, the movement of the movable part in a certain dimension is ensured via the guiding assembly, and unwanted shaking, vibration, rotation, tilting, and the like of the movable part are prevented.

The foregoing outlines features of several embodiments so that those skilled in the art may better understand the aspects of this disclosure. Those skilled in the art should appreciate that they may readily use this disclosure as a basis for designing or modifying other processes and structures for carrying out the same purposes and/or achieving the same advantages of the embodiments introduced herein. Those skilled in the art should also realize that such equivalent constructions do not depart from the spirit and scope of this disclosure, and that they may make various changes, substitutions, and alterations herein without departing from the spirit and scope of this disclosure.

What is claimed is:

1. An optical system comprising:
a second optical module for driving a second optical element, comprising:
a second immovable part;
a second movable part connected to the second optical element, wherein the second movable part is movable relative to the second immovable part;
a second driving assembly for driving the second movable part to move relative to the second immovable part; and
a second guiding assembly for guiding the second movable part to move relative to the second immovable part in a first dimension;
wherein the second driving assembly comprises:
a second piezoelectric element for generating a second driving force;
a second elastic element disposed on the second piezoelectric element, wherein the second elastic element has a plate structure; and
a second transmission element for transmitting the second driving force, wherein the second transmission element has an elongated structure and extends in a first direction;
wherein the second optical module further comprises:
a first adhesive element, wherein the second transmission element is connected to the second piezoelectric element via the first adhesive element;
a second adhesive element, wherein the second piezoelectric element is connected to the second elastic element via the second adhesive element; and
a third adhesive element, wherein the second transmission element is connected to the second immovable part via the third adhesive element;
wherein a Young's modulus of the first adhesive element is different from a Young's modulus of the second adhesive element and a Young's modulus of the third adhesive element, and the Young's modulus of the second adhesive element is different from the Young's modulus of the third adhesive element.

2. The optical system as claimed in claim 1, further comprising a third optical module, wherein the third optical module comprises:
a third immovable part immovably connected to the second immovable part;
a third movable part connected to a third optical element, wherein the third movable part is movable relative to the third immovable part; and
a third driving assembly for driving the third movable part to move relative to the third immovable part, wherein the third driving assembly comprises:
a third piezoelectric element for generating a third driving force;
a third elastic element disposed on the third piezoelectric element, wherein the third elastic element has a plate structure; and
a third transmission element for transmitting the third driving force, wherein the third transmission element has an elongated structure and extends in the first direction;
wherein the second optical module further comprises a fourth adhesive element, and the second piezoelectric element is connected to the third immovable part via the fourth adhesive element;
wherein a Young's modulus of the fourth adhesive element is different from the Young's modulus of the first adhesive element, and the Young's modulus of the fourth adhesive element is the same as the Young's modulus of the third adhesive element,
wherein the third optical module further comprises:
a fifth adhesive element, wherein the third transmission element is connected to the third piezoelectric element via the fifth adhesive element;
a sixth adhesive element, wherein the third piezoelectric element is connected to the third elastic element via the sixth adhesive element;
a seventh adhesive element, wherein the third transmission element is connected to the third immovable part via the seventh adhesive element; and
an eighth adhesive element, wherein the third piezoelectric element is connected to the second immovable part via the eighth adhesive element;
wherein a Young's modulus of the fifth adhesive element is different from a Young's modulus of the sixth adhesive element, a Young's modulus of the seventh adhesive element, and a Young's modulus of the eighth adhesive element, the Young's modulus of the sixth adhesive element is different from the Young's modulus of the seventh adhesive element, and the Young's modulus of the seventh adhesive element is the same as the Young's modulus of the eighth adhesive element.

3. The optical system as claimed in claim 2, wherein the Young's modulus of the first adhesive element is higher than the Young's modulus of the second adhesive element, the Young's modulus of the third adhesive element, and the Young's modulus of the fourth adhesive element, and the Young's modulus of the second adhesive element is lower than the Young's modulus of the third adhesive element.

4. The optical system as claimed in claim 2, wherein the Young's modulus of the fifth adhesive element is higher than the Young's modulus of the sixth adhesive element, the Young's modulus of the seventh adhesive element, and the Young's modulus of the eighth adhesive element, and the Young's modulus of the sixth adhesive element is lower than the Young's modulus of the seventh adhesive element.

5. The optical system as claimed in claim 2, wherein the second optical module further comprises a second clamping element in direct contact with the second transmission element and for generating a second pressure to make the second movable part in contact with the second transmission element.

6. The optical system as claimed in claim 2, wherein the third optical module further comprises a third clamping element in direct contact with the third transmission element and for generating a third pressure to make the third movable part in contact with the third transmission element.

7. The optical system as claimed in claim 2, wherein the second optical module further comprises a second position sensing assembly for sensing a movement of the second movable part relative to the second immovable part, and the third optical module further comprises a third position sensing assembly for sensing a movement of the third movable part relative to the third immovable part, wherein the second position sensing assembly comprises:
- a second reference element comprising a magnetic material; and
- a second position sensing element corresponding to the second reference element,
- wherein the third position sensing assembly comprises:
- a third reference element comprising a magnetic material; and
- a third position sensing element corresponding to the third reference element,
- wherein in the first direction, a maximum size of the second reference element is different from a maximum size of the third reference element.

8. The optical system as claimed in claim 7, wherein in the first direction, the maximum size of the second reference element is greater than the maximum size of the third reference element.

9. The optical system as claimed in claim 7, wherein the second immovable part includes a second immovable part wall that is perpendicular to the first direction, the third immovable part includes a third immovable part wall perpendicular to the first direction, and the second immovable part and the third immovable part are referred to as an immovable part, wherein when viewed from the first direction, the immovable part is rectangular and comprises:
- a first side extending along a second direction;
- a second side not parallel with the first side and extending along a third direction;
- a third side not parallel with the second side; and
- a fourth side not parallel with the third side,
- wherein the first side is greater than the second side, and the third side is greater than the fourth side,
- wherein when viewed from the first direction, the second transmission element and the third transmission element are located on different corners of the immovable part.

10. The optical system as claimed in claim 9, wherein the immovable part comprises a first opening, a second opening corresponding to the first opening, a third opening, and a fourth opening corresponding to the third opening, wherein the first opening and the third opening are formed on the second immovable part wall, and the second opening and the fourth opening are formed on the third immovable part wall,
- wherein the second immovable part wall comprises a recessed structure for receiving at least part of the third piezoelectric element, and the third immovable part wall comprises a recessed structure for receiving at least part of the second piezoelectric element,
- wherein the second piezoelectric element and the second movable part are located on opposite sides of the third immovable part wall, and the third piezoelectric element and the third movable part are located on opposite sides of the second immovable part wall,
- wherein the first opening and the second opening are used for receiving part of the second transmission element, and the third opening and the fourth opening are used for receiving part of the third transmission element,
- wherein the third adhesive element is in direct contact with the first opening, the fourth adhesive element is in direct contact with the second opening, the seventh adhesive element is in direct contact with the fourth opening, and the eighth adhesive element is in direct contact with the third opening.

11. The optical system as claimed in claim 10, wherein the first direction, the second direction, and the third direction are not parallel with each other.

12. The optical system as claimed in claim 11, wherein the first direction, the second direction, and the third direction are perpendicular to each other.

13. The optical system as claimed in claim 9, wherein the second movable part is movable within a second limit range in the first direction, the third movable part is movable within a third limit range in the first direction, the second limit range is different from the third limit range, wherein in the first direction, a maximum size of the second optical element is different from a maximum size of the third optical element, wherein when viewed from the second direction, the second position sensing element at least partially overlaps the second optical element, and the second position sensing element does not overlap the third optical element, wherein when viewed from the second direction, the third position sensing element does not overlap the second optical element, and the third position sensing element at least partially overlaps the third optical element, wherein when viewed from the first direction, the second position sensing assembly and the third position sensing assembly are located on different sides of the immovable part, wherein when viewed from the first direction, the second position sensing assembly is at the second side, and the third position sensing assembly is at the fourth side.

14. The optical system as claimed in claim 13, wherein the second limit range is greater than the third limit range, and in the first direction, the maximum size of the second optical element is greater than the maximum size of the third optical element.

15. The optical system as claimed in claim 9, wherein the second guiding assembly comprises:
- an intermediate element;
- a second movable part guiding structure fixedly disposed on the second movable part and comprising a metal material, wherein the second movable part guiding structure corresponds to the intermediate element, and the second movable part guiding structure is movable relative to the intermediate element; and
- a second immovable part guiding structure fixedly disposed on the second immovable part and comprising a metal material, wherein the second immovable part guiding structure corresponds to the intermediate element, and the second immovable part guiding structure is fixedly connected to the intermediate element,
- wherein there are two intermediate elements, the two intermediate elements are arranged along the second direction, and one of the two intermediate elements and the second transmission element are located on the fourth side, and the other one of the two intermediate elements and the third transmission element are located on the second side,
- wherein the second transmission element and the third transmission element are arranged along the second direction,
- wherein when viewed from the first direction, a distance between centers of the two intermediate elements is different from a distance between a center of the second transmission element and a center of the third transmission element.

16. The optical system as claimed in claim 15, wherein when viewed from the first direction, the distance between the centers of the two intermediate elements is less than the distance between the center of the second transmission element and the center of the third transmission element.

17. The optical system as claimed in claim 15, when viewed from the first direction, the distance between the centers of the two intermediate elements is different from a distance between the center of the intermediate element that is at the fourth side and the center of the second transmission element, wherein when viewed from the first direction, a distance between the center of the second transmission element and the center of the third transmission element is different from a distance between the center of the intermediate element that is at the fourth side and the center of the second transmission element.

18. The optical system as claimed in claim 17, when viewed from the first direction, the distance between the centers of the two intermediate elements is greater than the distance between the center of the intermediate element that is at the fourth side and the center of the second transmission element, wherein when viewed from the first direction, the distance between the center of the second transmission element and the center of the third transmission element is greater than the distance between the center of the intermediate element that is at the fourth side and the center of the second transmission element.

19. The optical system as claimed in claim 18, wherein when viewed from the first direction, the distance between the centers of the intermediate elements is at least 1.5 times the distance between the center of the intermediate element that is at the fourth side and the center of the second transmission element, and wherein when viewed from the first direction, the distance between the center of the second transmission element and the center of the third transmission element is at least 1.5 times the distance between the center of the intermediate element that is at the fourth side and the center of the second transmission element.

* * * * *